US012549917B2

(12) United States Patent

Blais et al.

(10) Patent No.: US 12,549,917 B2
(45) Date of Patent: Feb. 10, 2026

(54) SYSTEM FOR DYNAMICALLY FORMING A VIRTUAL MICROPHONE COVERAGE MAP FROM A COMBINED ARRAY TO ANY DIMENSION, SIZE AND SHAPE BASED ON INDIVIDUAL MICROPHONE ELEMENT LOCATIONS

(71) Applicant: NUREVA, INC., Calgary (CA)

(72) Inventors: Kael Blais, Englewood, CO (US); Richard Dale Ferguson, Okotoks (CA); Aleksander Radisavljevic, Victoria (CA); David Gregory Popovich, Ottawa (CA); Linshan Li, Calgary (CA)

(73) Assignee: NUREVA, INC., Calgary (CA)

( * ) Notice: Subject to any disclaimer, the term of this patent is extended or adjusted under 35 U.S.C. 154(b) by 232 days.

(21) Appl. No.: 18/124,344

(22) Filed: Mar. 21, 2023

(65) Prior Publication Data

US 2023/0308820 A1 Sep. 28, 2023

Related U.S. Application Data

(60) Provisional application No. 63/322,504, filed on Mar. 22, 2022.

(51) Int. Cl.

| | |
|---|---|
| ***H04S 7/00*** | (2006.01) |
| ***H04R 3/00*** | (2006.01) |
| ***H04R 5/027*** | (2006.01) |

(52) U.S. Cl.

CPC ............... *H04S 7/30* (2013.01); *H04R 3/005* (2013.01); *H04R 5/027* (2013.01); *H04R 2201/401* (2013.01); *H04S 2400/15* (2013.01)

(58) Field of Classification Search

CPC .. H04R 1/406; H04R 2201/401; H04R 3/005; H04R 2227/009; H04R 2420/01;

(Continued)

(56) References Cited

U.S. PATENT DOCUMENTS

| | | | |
|---|---|---|---|
| 4,499,578 | A | 2/1985 | Marouf et al. |
| 4,536,887 | A | 8/1985 | Kaneda et al. |

(Continued)

FOREIGN PATENT DOCUMENTS

| | | | |
|---|---|---|---|
| EP | 0903055 | B1 | 10/2007 |
| EP | 2975609 | A1 | 1/2016 |

(Continued)

OTHER PUBLICATIONS

International Search Report and Written Opinion mailed Aug. 9, 2024, for International Patent Application No. PCT/CA2024/050615, 9 sheets.

(Continued)

*Primary Examiner* — Lun-See Lao

(74) *Attorney, Agent, or Firm* — KATTEN MUCHIN ROSENMAN LLP

(57) ABSTRACT

A system for automatically dynamically forming a virtual microphone coverage map using a combined microphone array in a shared 3D space is provided. The system includes a combined microphone array comprising a plurality of microphones and a system processor communicating with the combined microphone array. The microphones in the combined microphone array are arranged along various microphone arrangements. The system processor is configured to perform operations including obtaining locations of the microphones within the combined microphone array throughout the shared 3D space, generating coverage zone dimensions based on the locations of the microphones, and populating the coverage zone dimensions with virtual microphones.

27 Claims, 79 Drawing Sheets

(58) Field of Classification Search
CPC .. H04R 2430/03; H04R 27/00; H04R 29/005; H04R 3/02; H04R 3/04; H04R 5/027; H04S 2400/15; H04S 7/30
USPC .......................................... 381/1, 92; 700/94
See application file for complete search history.

(56) References Cited

U.S. PATENT DOCUMENTS

| | | | |
|---|---|---|---|
| 5,477,270 A | 12/1995 | Park | |
| 5,699,437 A | 12/1997 | Finn | |
| 6,469,732 B1 | 10/2002 | Chang et al. | |
| 6,593,956 B1 | 7/2003 | Potts et al. | |
| 6,912,178 B2 | 6/2005 | Chu et al. | |
| 6,912,718 B1 | 6/2005 | Chang et al. | |
| 7,130,705 B2 | 10/2006 | Amir et al. | |
| 7,254,241 B2 | 8/2007 | Rui et al. | |
| 7,489,788 B2 | 2/2009 | Leung et al. | |
| 7,587,054 B2 * | 9/2009 | Elko | H04R 5/027 381/92 |
| 7,720,232 B2 | 5/2010 | Oxford et al. | |
| 7,848,531 B1 | 12/2010 | Vickers et al. | |
| 7,995,768 B2 | 8/2011 | Miki et al. | |
| 8,185,387 B1 | 5/2012 | Lachapelle | |
| 8,861,537 B1 | 10/2014 | Braithwaite et al. | |
| 8,953,819 B2 | 2/2015 | Ko et al. | |
| 9,706,292 B2 | 7/2017 | Duraiswami et al. | |
| 9,800,964 B2 | 10/2017 | McIntosh et al. | |
| 10,003,900 B2 | 6/2018 | Cartwright et al. | |
| 10,042,038 B1 | 8/2018 | Lord et al. | |
| 10,063,987 B2 * | 8/2018 | McGibney | H04S 7/303 |
| 10,229,697 B2 | 3/2019 | Bastyr et al. | |
| 10,237,639 B2 | 3/2019 | McIntosh et al. | |
| 10,387,108 B2 | 8/2019 | McGibney | |
| 10,397,726 B2 | 8/2019 | McGibney | |
| 10,848,896 B2 | 11/2020 | McGibney | |
| 10,972,835 B2 | 4/2021 | Rollow, IV | |
| 11,127,415 B2 | 9/2021 | Magnusson et al. | |
| 11,190,871 B2 | 11/2021 | Yorga et al. | |
| 12,047,753 B1 * | 7/2024 | Buoni | G10L 15/08 |
| 2005/0280701 A1 | 12/2005 | Wardell | |
| 2006/0034469 A1 | 2/2006 | Tamiya et al. | |
| 2006/0165242 A1 | 7/2006 | Miki et al. | |
| 2008/0085014 A1 | 4/2008 | Chen et al. | |
| 2008/0107277 A1 | 5/2008 | Somasundaram et al. | |
| 2008/0285771 A1 | 11/2008 | Tanaka et al. | |
| 2009/0129609 A1 | 5/2009 | Oh et al. | |
| 2010/0034397 A1 | 2/2010 | Nakadai et al. | |
| 2010/0135118 A1 | 6/2010 | Van Leest et al. | |
| 2011/0135125 A1 | 6/2011 | Zhan et al. | |
| 2012/0093344 A1 | 4/2012 | Sun et al. | |
| 2012/0245933 A1 | 9/2012 | Flaks et al. | |
| 2013/0083934 A1 | 4/2013 | Ahgren | |
| 2013/0101134 A1 | 4/2013 | Betts-Lacroix | |
| 2013/0142342 A1 | 6/2013 | Del Galdo et al. | |
| 2013/0258813 A1 | 10/2013 | Herre et al. | |
| 2014/0050328 A1 | 2/2014 | Fischer | |
| 2014/0098964 A1 | 4/2014 | Rosca et al. | |
| 2014/0119552 A1 | 5/2014 | Beaucoup | |
| 2014/0133666 A1 | 5/2014 | Tanaka et al. | |
| 2014/0185824 A1 | 7/2014 | Burnett | |
| 2014/0314251 A1 | 10/2014 | Rosca et al. | |
| 2014/0348342 A1 | 11/2014 | Laaksonen et al. | |
| 2015/0185312 A1 | 7/2015 | Gaubitch et al. | |
| 2015/0222996 A1 | 8/2015 | Chu et al. | |
| 2015/0230026 A1 | 8/2015 | Eichfeld et al. | |
| 2016/0071526 A1 | 3/2016 | Wingate et al. | |
| 2016/0112469 A1 | 4/2016 | Liu | |
| 2016/0173976 A1 | 6/2016 | Podhradsky | |
| 2017/0178628 A1 | 6/2017 | Macours et al. | |
| 2017/0347217 A1 | 11/2017 | McGibney | |
| 2017/0366896 A1 | 12/2017 | Adsumilli et al. | |
| 2017/0374454 A1 | 12/2017 | Bernardini et al. | |
| 2018/0074782 A1 | 3/2018 | McGibney | |
| 2018/0098174 A1 | 4/2018 | Goodwin et al. | |
| 2018/0249267 A1 | 8/2018 | Klingler et al. | |
| 2019/0349471 A1 | 11/2019 | Ferguson et al. | |
| 2021/0035563 A1 | 2/2021 | Cartwright et al. | |
| 2022/0004355 A1 | 1/2022 | McGibney | |

FOREIGN PATENT DOCUMENTS

| | | |
|---|---|---|
| JP | 3154468 B2 | 4/2001 |
| JP | 2018026701 A | 2/2018 |
| WO | 03010995 A2 | 2/2003 |
| WO | 2022/118072 A1 | 6/2022 |

OTHER PUBLICATIONS

Communication pursuant to Article 94(3) EPC dated Oct. 14, 2024, from European Patent Application No. 20749339.6-1207, 10 sheets.
International Search Report and Written Opinion mailed Sep. 15, 2017, from International Application No. PCT/CA2017/050642, 12 sheets.
Joseph Hector Dibiase, Thesis entitled, "A High-Accuracy, Low-Latency Technique for Talker Localization in Reverberant Environments Using Microphone Arrays", Brown University, May 2000.
Notice of Allowance dated Apr. 30, 2018, from U.S. Appl. No. 15/597,646, 18 sheets.
International Search Report and Written Opinion mailed Jun. 7, 2023, from International Application No. PCT/CA2023/50412, 11 sheets.
Extended European Search Report mailed May 7, 2019, from European Patent Application No. 17805437.5, 23 sheets.
Notice of Allowance dated May 24, 2019, from U.S. Appl. No. 16/110,393, 6 sheets.
Non-Final Rejection dated Sep. 17, 2018, from U.S. Appl. No. 16/110,393, 14 sheets.
International Search Report and Written Opinion mailed Oct. 12, 2017, from International Application No. PCT/CA2017/050676, 8 sheets.
Notice of Allowance dated Apr. 2, 2019, from U.S. Appl. No. 15/603,986, 42 sheets.
Final Rejection dated May 25, 2018, from U.S. Appl. No. 15/603,986, 13 sheets.
Non-Final Rejection dated Jan. 24, 2018, from U.S. Appl. No. 15/603,986, 26 sheets.
Communication pursuant to Article 94(3) EPC dated Feb. 17, 2020, from European Patent Application No. 17805437.5, 6 sheets.
Notice of Allowance dated Jul. 16, 2020, from U.S. Appl. No. 16/518,013, 19 sheets.
Non-Final Rejection dated Feb. 28, 2020, from U.S. Appl. No. 16/518,013, 21 sheets.
Notice of Allowance dated Apr. 11, 2019, from U.S. Appl. No. 16/110,393, 18 sheets.
Notice of Allowance dated Jan. 19, 2018, from U.S. Appl. No. 15/597,646, 22 sheets.
Notice of Allowance dated Aug. 16, 2021, from U.S. Appl. No. 17/097,560, 33 sheets.
Extended European search report from European Application No. 20194651.4 with a mailing date of Jan. 21, 2021, 11 sheets.
Extended European search report from European Application No. 17847841.8 with a mailing date of Jun. 28, 2019, 12 sheets.
Communication pursuant to Rules 70(2) and 70a(2) EPC from European Application No. 17847841.8 with a mailing date of Jul. 16, 2019, 1 sheet.
U.S. Appl. No. 62/343,512, filed May 31, 2016, 41 sheets.
U.S. Appl. No. 62/162,091, filed May 15, 2015, 52 sheets.
U.S. Appl. No. 62/345,208, filed Jun. 3, 2016, 44 sheets.
Non-Final Rejection dated Feb. 9, 2021, from U.S. Appl. No. 16/434,725, 72 sheets.
Notice of Allowance dated Jan. 25, 2023, from U.S. Appl. No. 17/374,585, 11 sheets.
Notice of Allowance dated Jan. 19, 2023, from U.S. Appl. No. 17/374,585, 41 sheets.
Non-Final Rejection dated Aug. 8, 2022, from U.S. Appl. No. 17/374,585, 57 sheets.

(56) References Cited

OTHER PUBLICATIONS

The extended European search report completed Feb. 2, 2022 (dated Feb. 10, 2022), from European Application No. 19808293.5, 8 sheets.
Emanuël A. P. Habets and Jacob Benesty, “A Two-Stage Beamforming Approach for Noise Reduction and Dereverberation”, IEEE Transactions on Audio, Speeach, and Language Processing, vol. 21, No. 5, May 2013, pp. 945-958.
Gerhard Doblinger, “An Adaptive Microphone Array for Optimum Beamforming and Noise Reduction”, 14th European Signal Processing Conference (EUSIPCO 2006), Florence, Italy, Sep. 4-8, 2006, 5 sheets.
Taylor B. Spalt, Christopher R. Fuller, Thomas F. Brooks, William M. Humphreys, Jr., “A Background Noise Reduction Technique using Adaptive Noise Cancellation for Microphone Arrays”, p. 1-16, available at: https://ntrs.nasa.gov/ search.jsp?R=20110012472 2018-05-16T17:29:07+00:00Z.
International Search Report and Written Opinion dated Oct. 3, 2019, from PCT/CA2019/050708, 9 sheets.
Notice of Allowance dated Feb. 10, 2023, from US Application No. U.S. Appl. No. 16/421,908, 24 sheets.
Final Rejection dated Oct. 11, 2022, from U.S. Appl. No. 16/421,908, 26 sheets.
Non-Final Rejection dated Apr. 20, 2022, from U.S. Appl. No. 16/421,908, 38 sheets.
International Search Report and Written Opinion dated Jun. 15, 2023, from International Application No. PCT/CA2023/050371, 7 sheets.
International Search Report and Written Opinion dated May 30, 2023, from International Application No. PCT/CA2023/050277, 7 sheets.
The extended European search report dated Sep. 27, 2022, from European Patent Application No. 20749339.6, 15 sheets.
International Search Report and Written Opinion mailed May 22, 2020, from International Application No. PCT/CA2020/050100, 11 sheets.
Non-Final Rejection dated Dec. 10, 2020, from US Application No. U.S. Appl. No. 16/774,258, 28 sheets.
Non-Final Rejection dated Dec. 10, 2020, from U.S. Appl. No. 16/774,258, 28 sheets.
Lightspeed Technologies, “Audio Solutions for Classroom Reopening Challenges”, Duplicom Presentation Systems, https://www.duplicom.com/products/lightspeed-audio-solutions/, Aug. 27, 2020, 7 sheets.
Luis Guerra, Troy Jensen, “How to Use The Shure MXA910 Ceiling Array Microphone for Voice Lift”, Shure Incorporated, USA, Created Sep. 2016, upated Jul. 2018, Shure Incorporated, 11 sheets.
Alberta Infrastructure, “Sound-Field Systems Guide for Classrooms”, published in May 2004, 19 sheets.
The extended European Search Report dated Feb. 11, 2022, from European Patent Application No. 21204322.8, 7 sheets.
International Search and Written Opinion dated Jul. 18, 2022, from PCT/CA2022/050731, 8 sheets.
Non-Final Office Action dated Oct. 11, 2023, from U.S. Appl. No. 17/516,480, 40 sheets.
Notice of Allowance dated Feb. 7, 2024, from U.S. Appl. No. 17/516,480, 10 sheets.
Communication pursuant to Article 94(3) EPC dated Feb. 29, 2024, from European Patent Application No. 21204322.8, 9 sheets.
Communication pursuant to Article 94(3) EPC dated Mar. 12, 2024, from European Patent Application No. 19808293.5, 6 sheets.
Theodoropoulos D et al.: “A reconfigurable beamformer for audio applications”, 7th Symposium on Application Specific Processors, 2009. SASP ’09. IEEE,, Jul. 27, 2009, pp. 80-87, XP031522047, ISBN: 978-1-4244-4939-2.
Final Office Action dated Dec. 5, 2024, from U.S. Appl. No. 17/739,926, 29 sheets.
Non-Final Office Action dated Apr. 25, 2024, from U.S. Appl. No. 17/739,926, 57 sheets.
The extended European search report dated Dec. 17, 2025, from European Patent Application No. 23762644.5, 9 sheets.
Kozintsev I et al: “Position Calibration of Microphones and Loudspeakers in Distributed Computing Platforms”, IEEE Transactions on Speech and Audio Processing, IEEE Service Center, New York, NY, US, vol. 13, No. 1, Jan. 1, 2005 (Jan. 1, 2005), pp. 70-83, XP011123587, ISSN: 1063-6676, DOI: 10.1109/TSA.2004.838540, * the whole document *.
Pasi Pertila et al: “Closed-form self-localization of asynchronous microphone arrays”, Hands-Free Speech Communication and Microphone Arrays (HSCMA), 2011 Joint Workshop on, IEEE, May 30, 2011 (May 30, 2011), pp. 139-144, XP031957280, DOI: 10.1109/HSCMA.2011.5942380 ISBN: 978-1-4577-0997-5, * the whole document *.
Kovalyov Anton et al: “Joint Calibration and Synchronization of Two Arrays of Microphones and Loudspeakers Using Particle Swarm Optimization”, IEEE Open Journal of Signal Processing, IEEE, vol. 2, Oct. 11, 2021 (Oct. 11, 2021), pp. 535-544, XP011885550, DOI: 10.1109/OJSP.2021.3118574 [retrieved on Oct. 27, 2021], * the whole document *.
Notice of Allowance dated Jan. 2, 2026, from U.S. Appl. No. 18/644,745, 24 sheets.

* cited by examiner

FIG. 1a Prior Art – Typical audio conference system variations
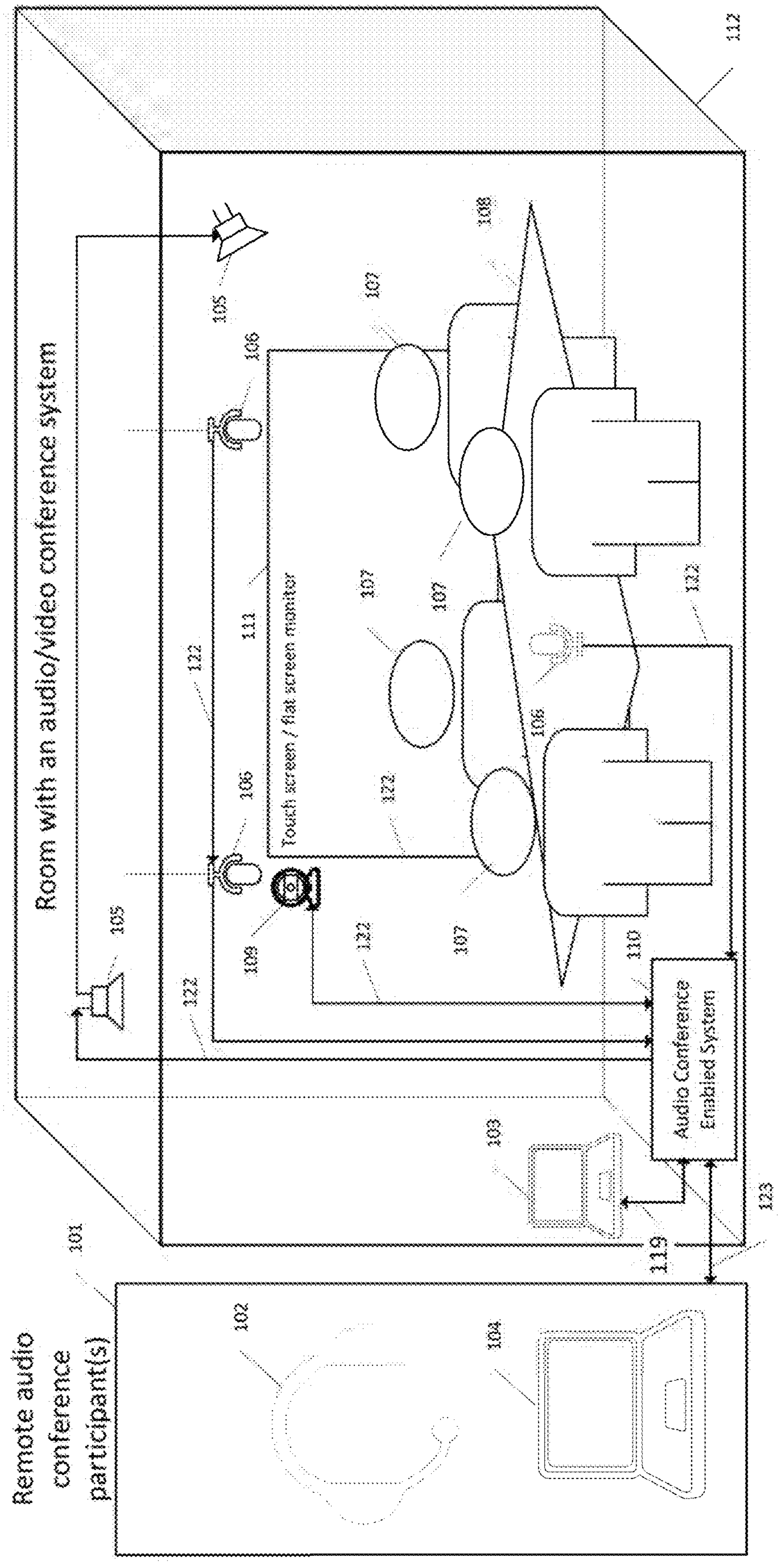

FIG. 1b Prior Art - Microphone Array and Speaker System
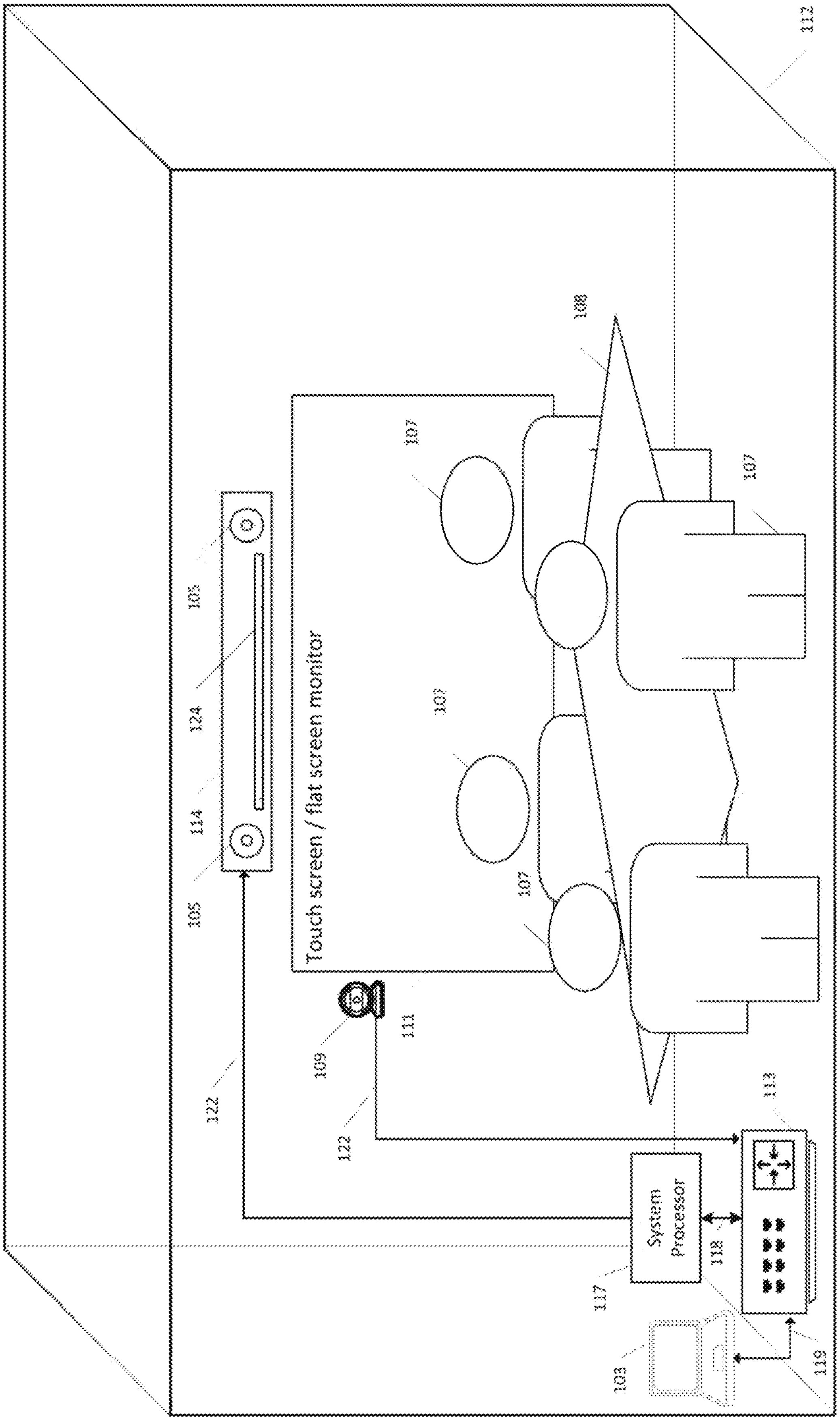

FIG. 1c Prior Art - Microphone Array and Speaker System
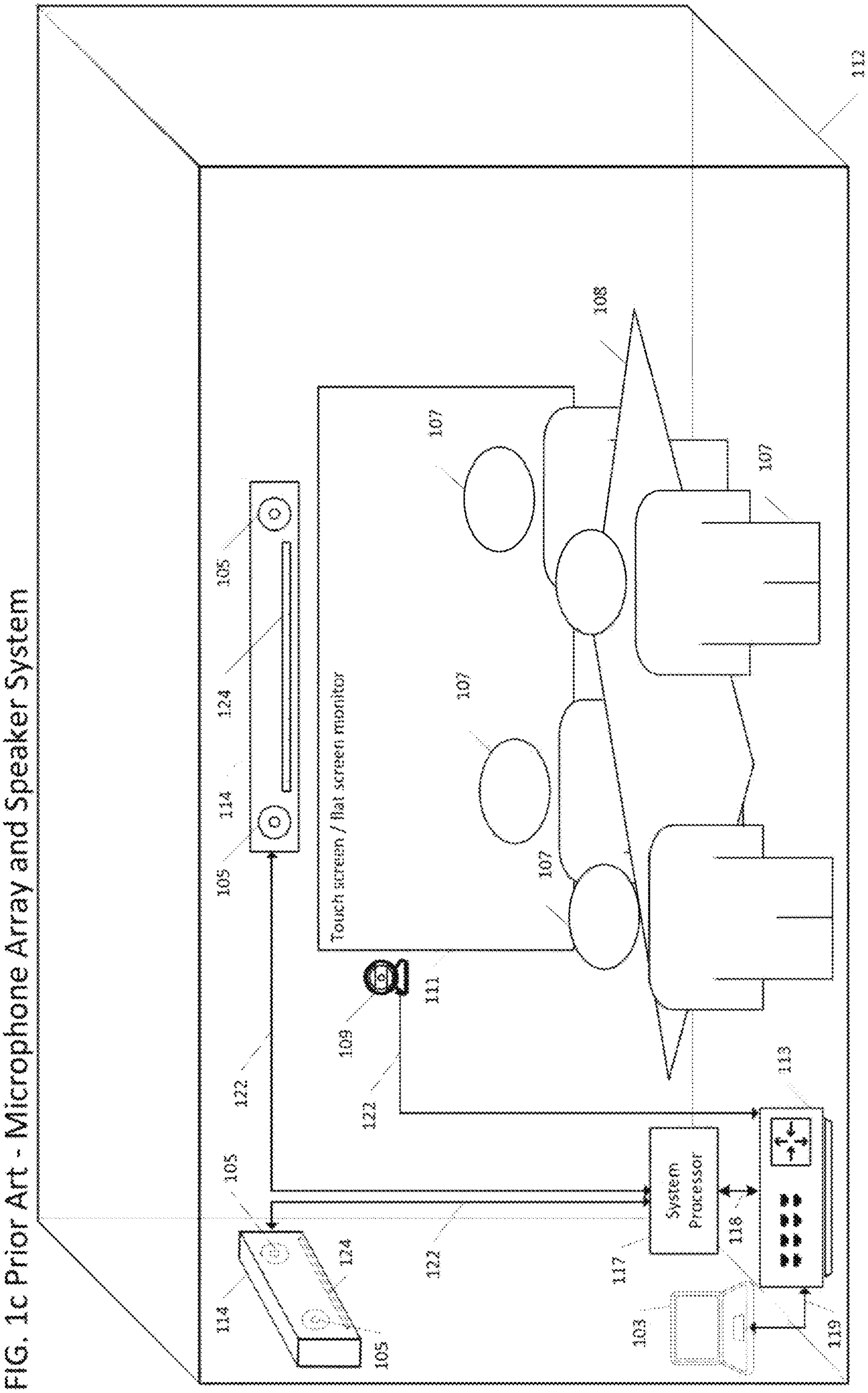

FIG. 2a Examples of Possible Microphone Arrangements
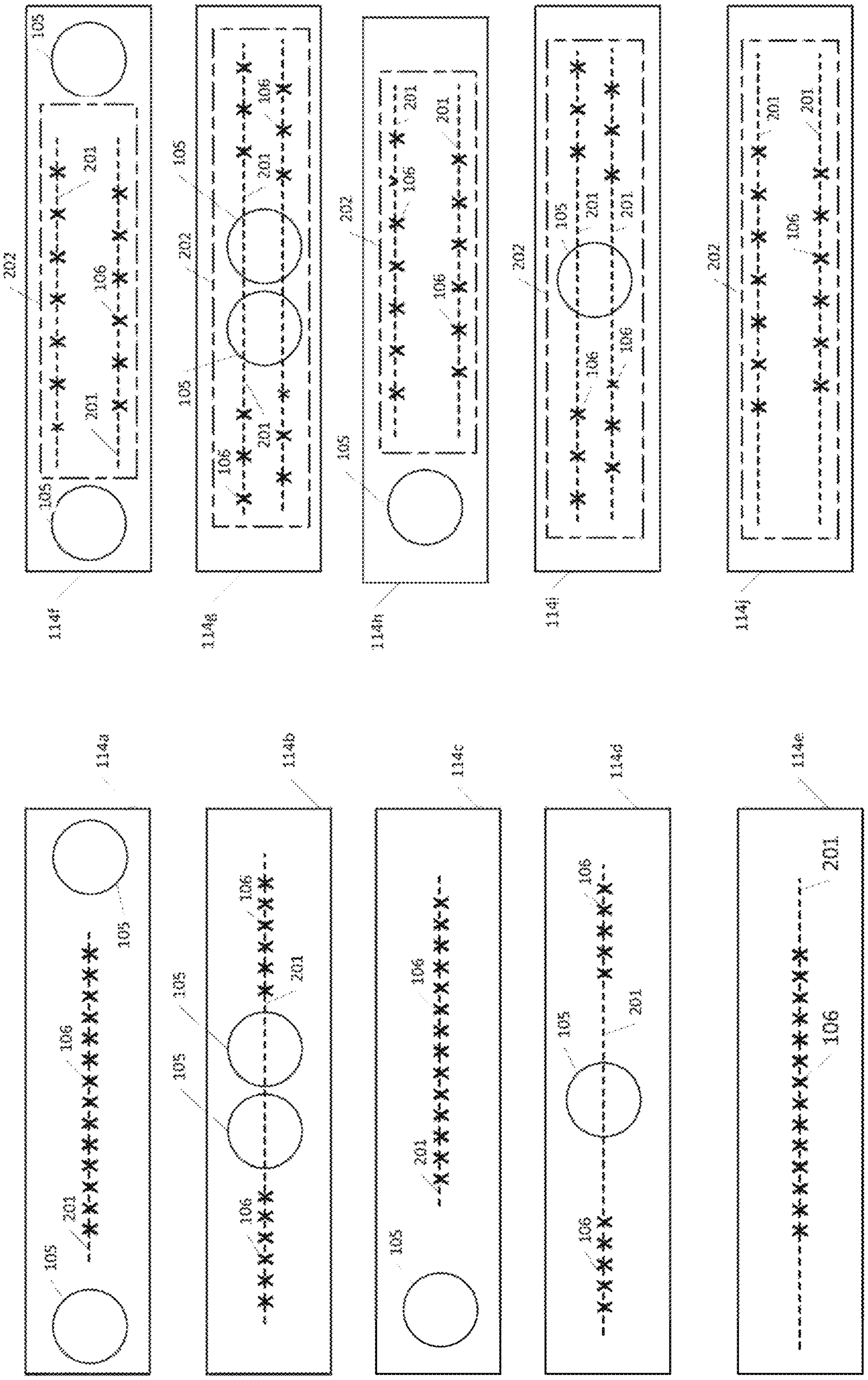

Examples of Microphone Axis (M-Axis) Arrangement

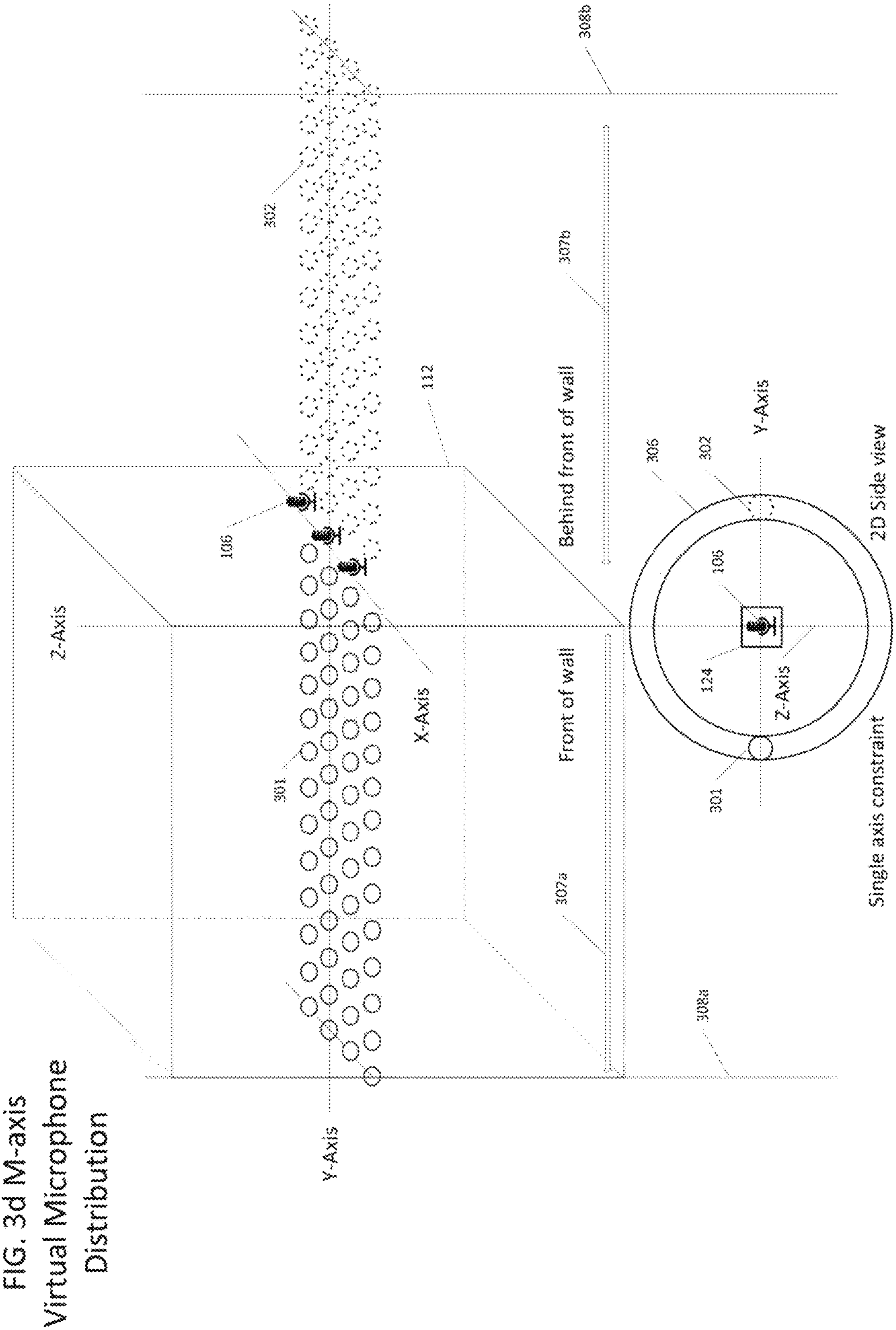
FIG. 3d M-axis Virtual Microphone Distribution

Examples of Microphone Plane (M-Plane) Arrangements
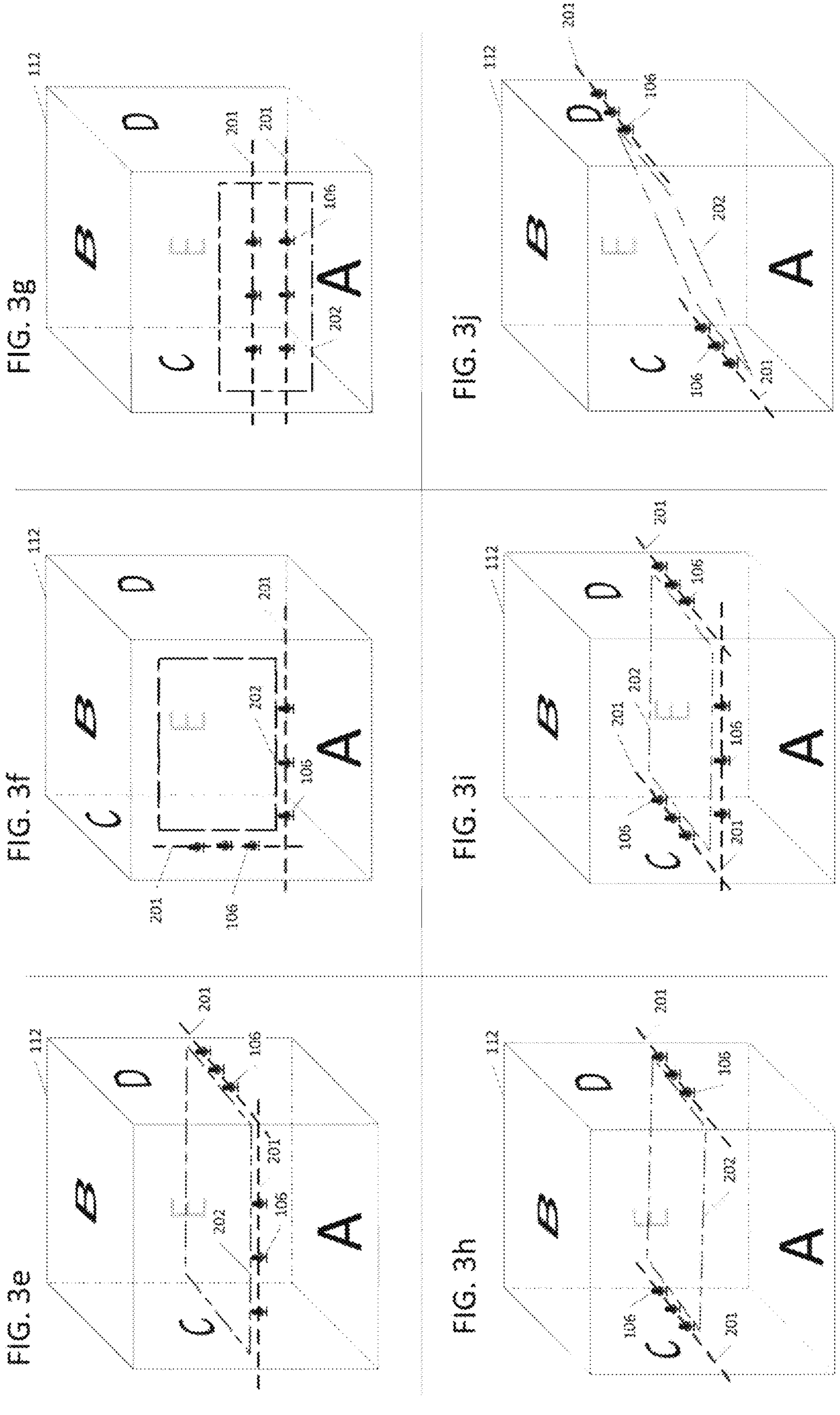

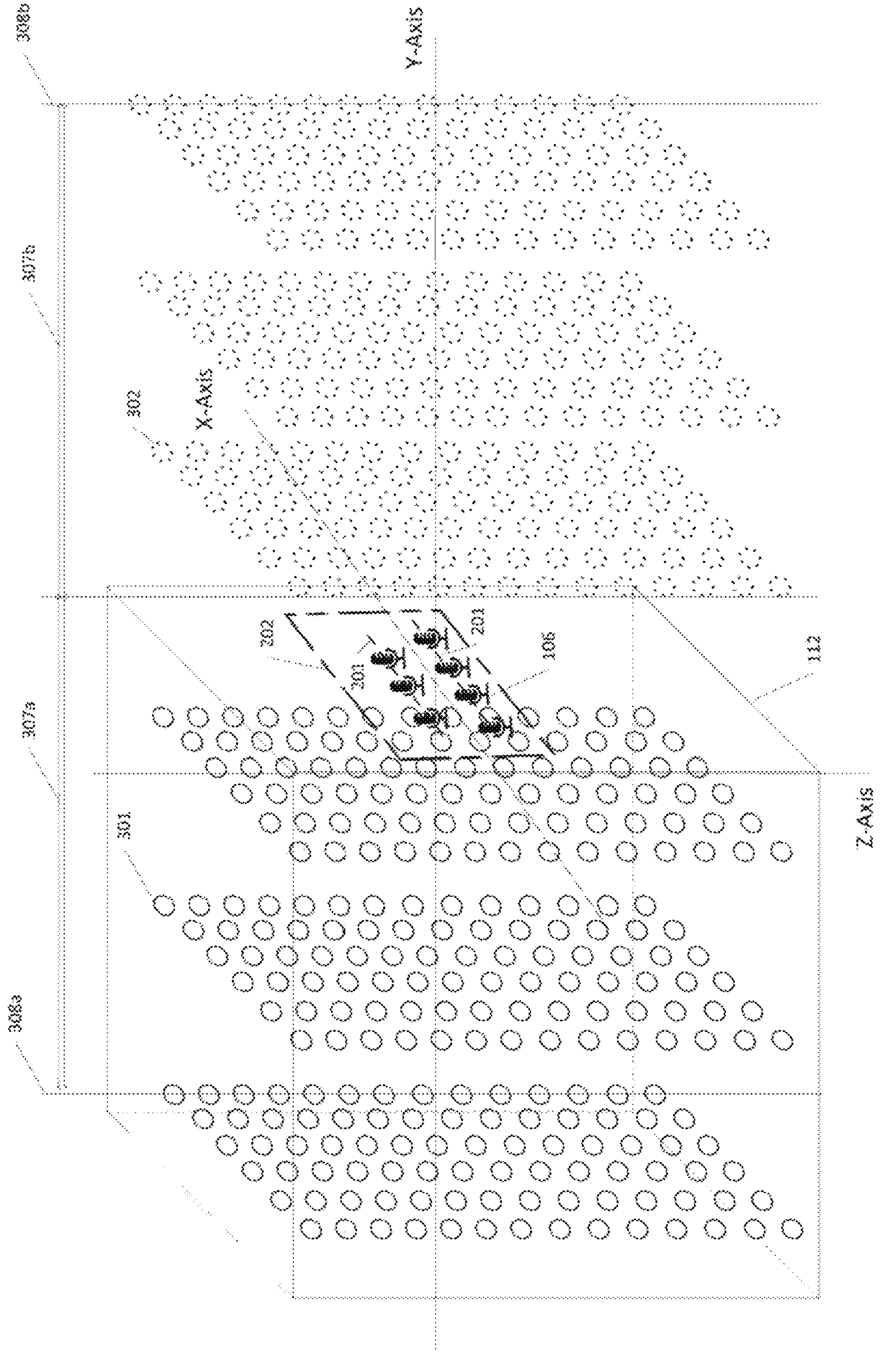
FIG. 3k M-Plane Virtual Microphone Distribution

Examples of Microphone Hyperplane (M-Hyperplane) Arrangements

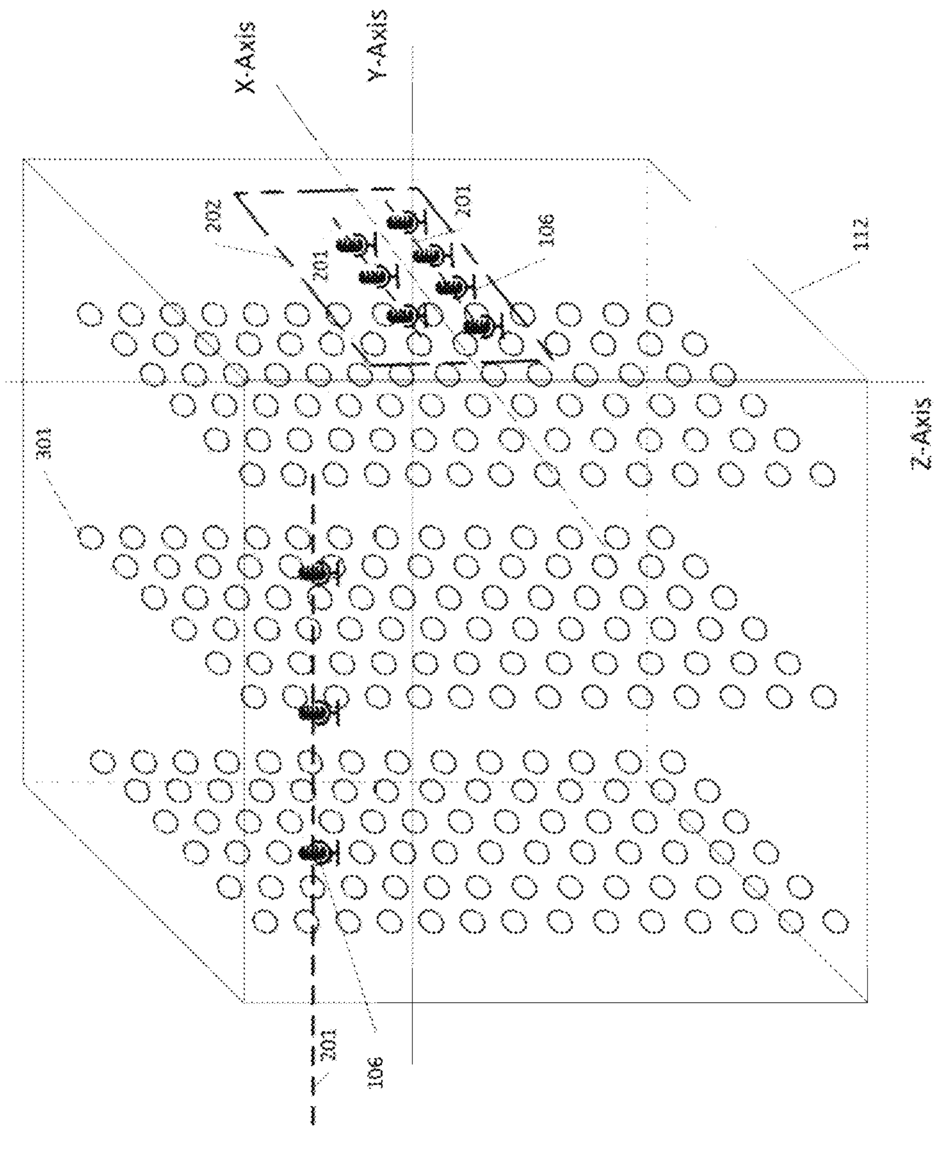
FIG. 3r M-Hyperplane Virtual Microphone Distribution

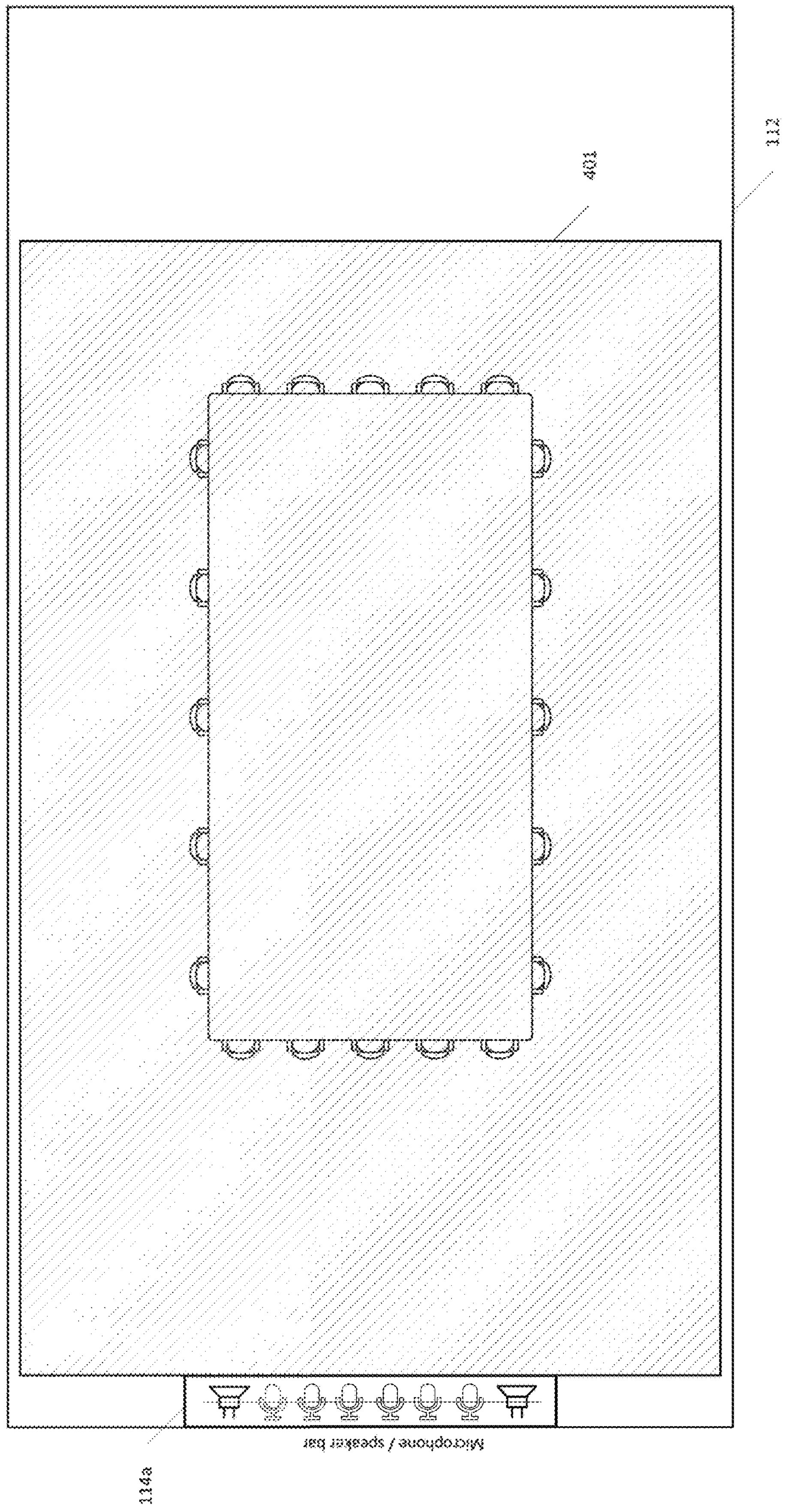
FIG. 4a Current Art – Array coverage patterns

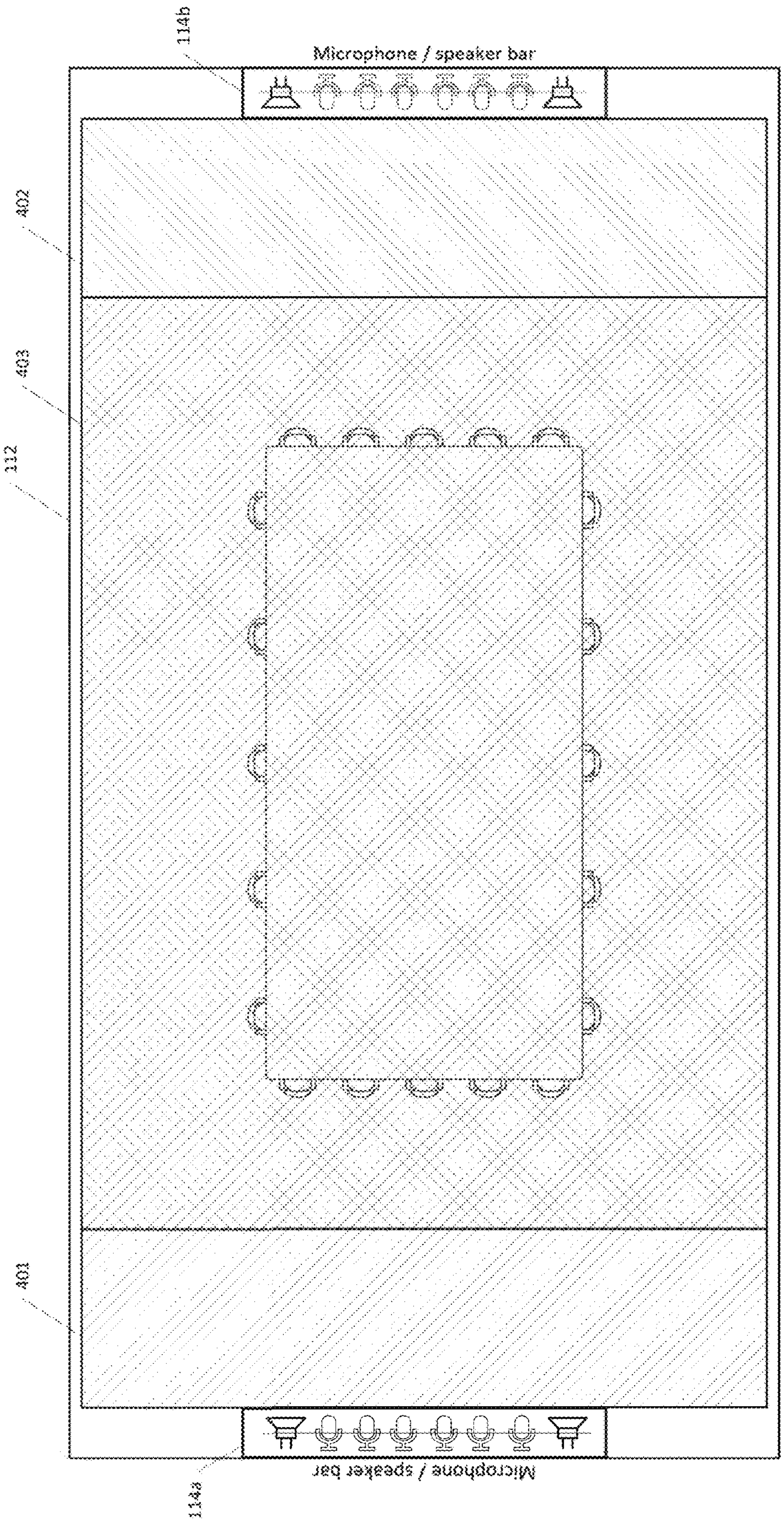
FIG. 4b Current Art – Array coverage patterns

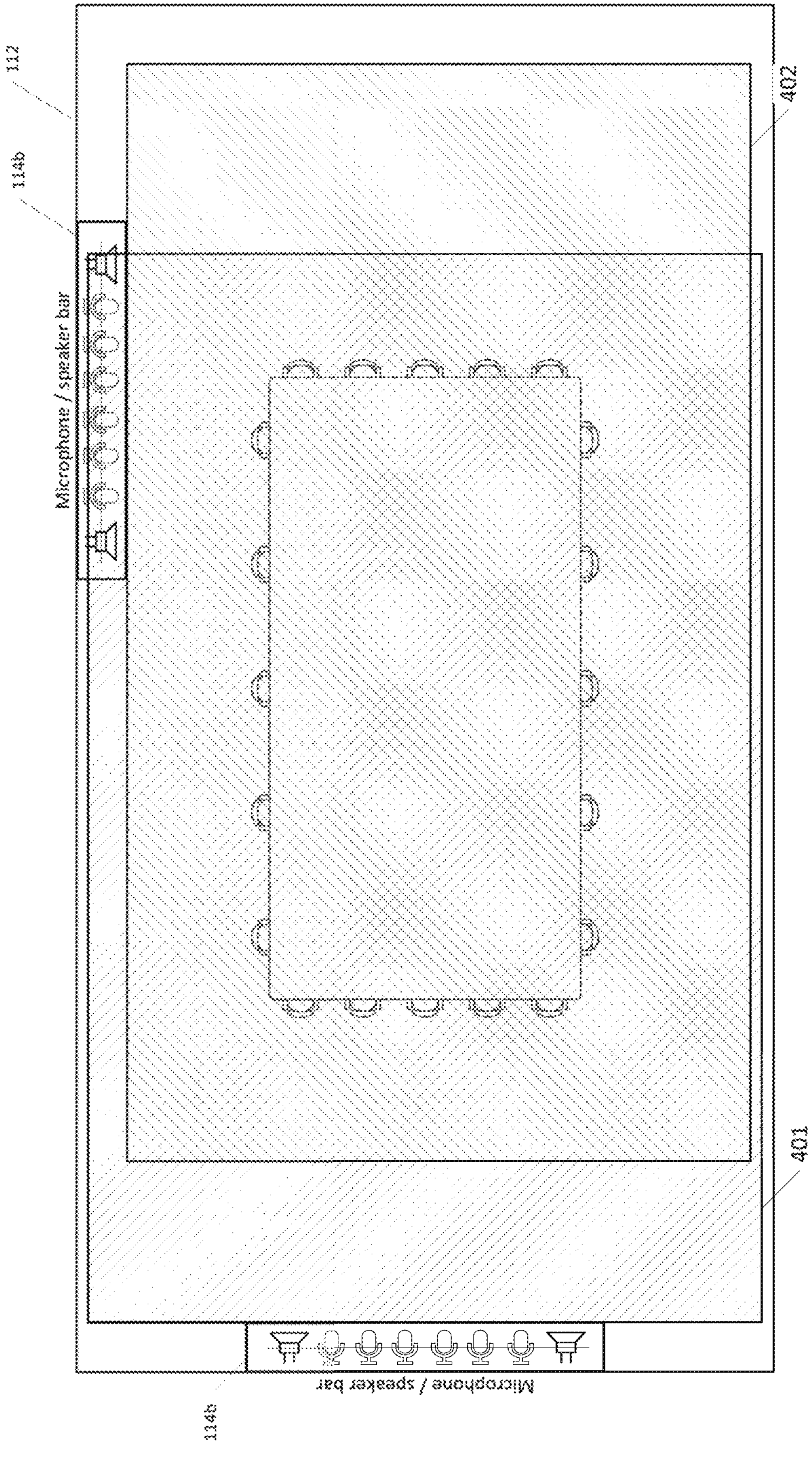
FIG. 4c Current Art – Array coverage patterns

FIG. 4d Current Art – Array coverage patterns
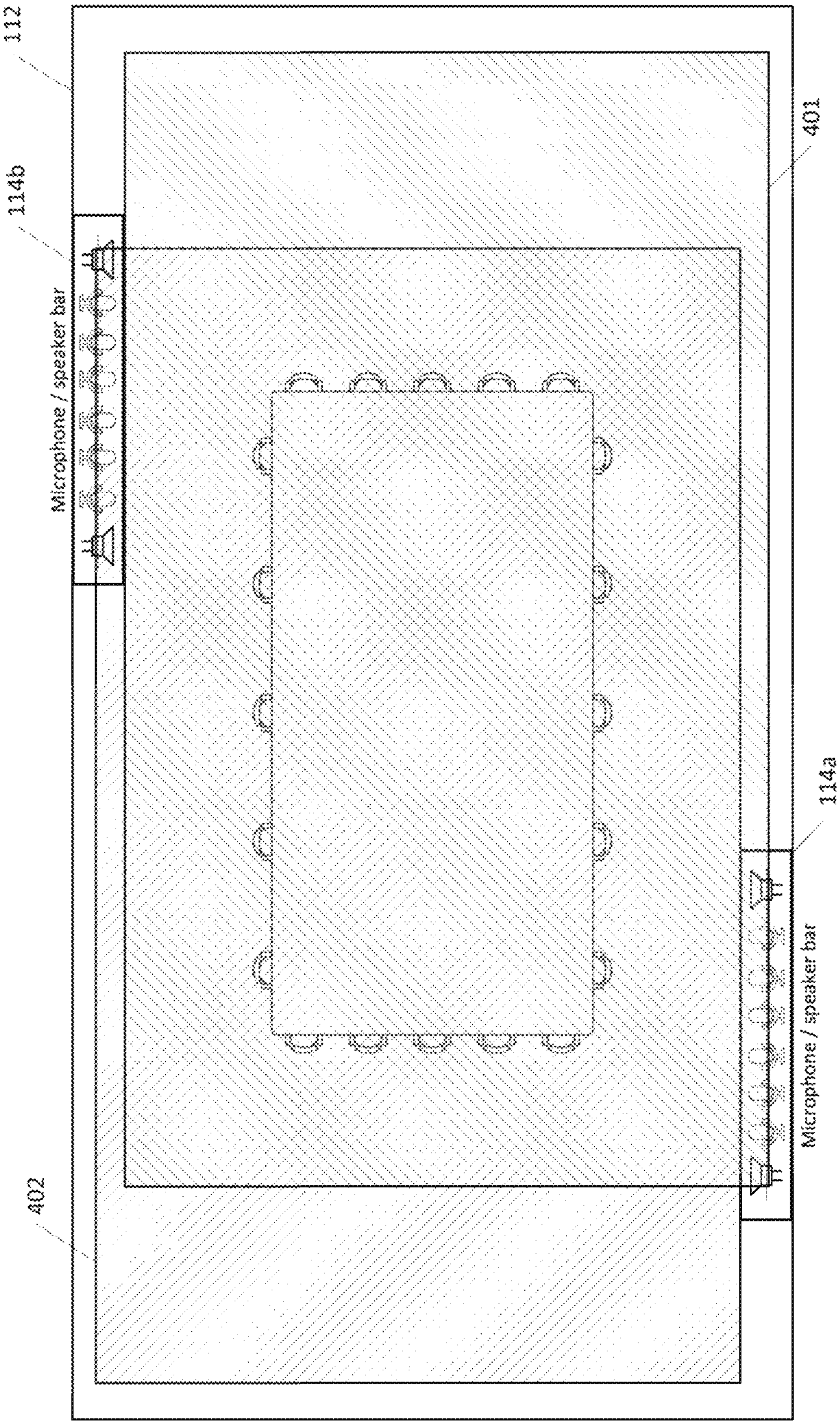

FIG. 4e Current Art – Array coverage patterns
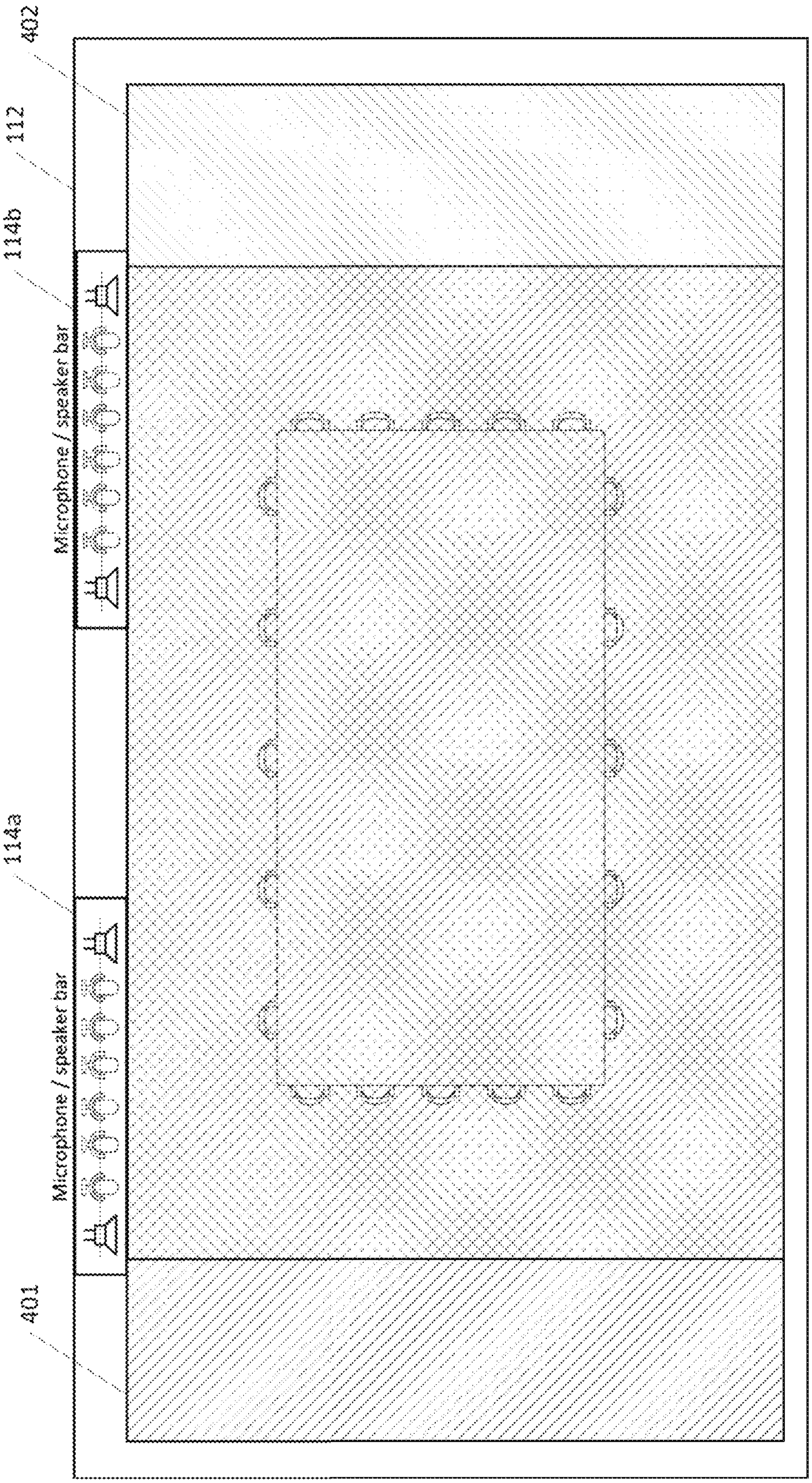

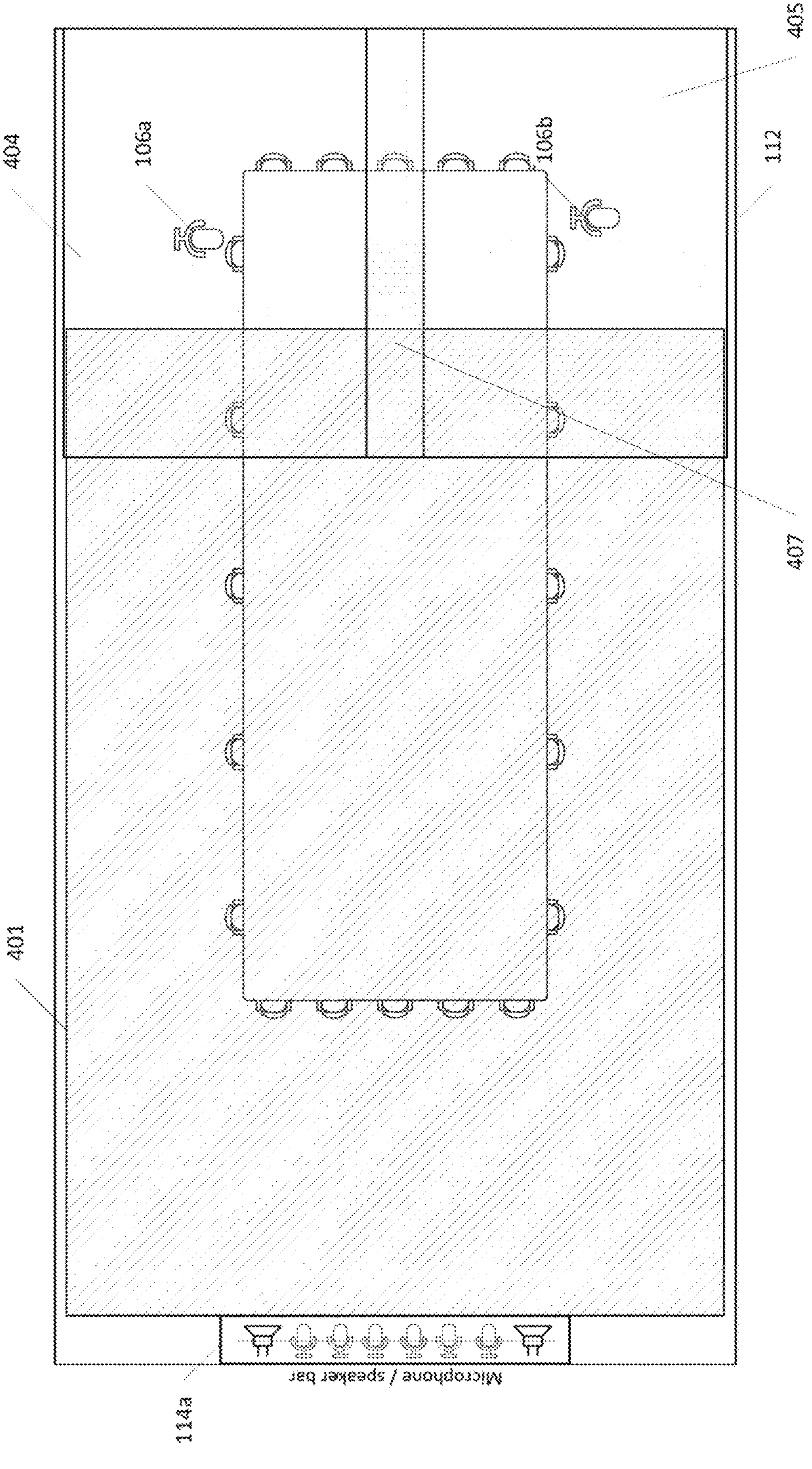
FIG. 4f Current Art – Array coverage patterns

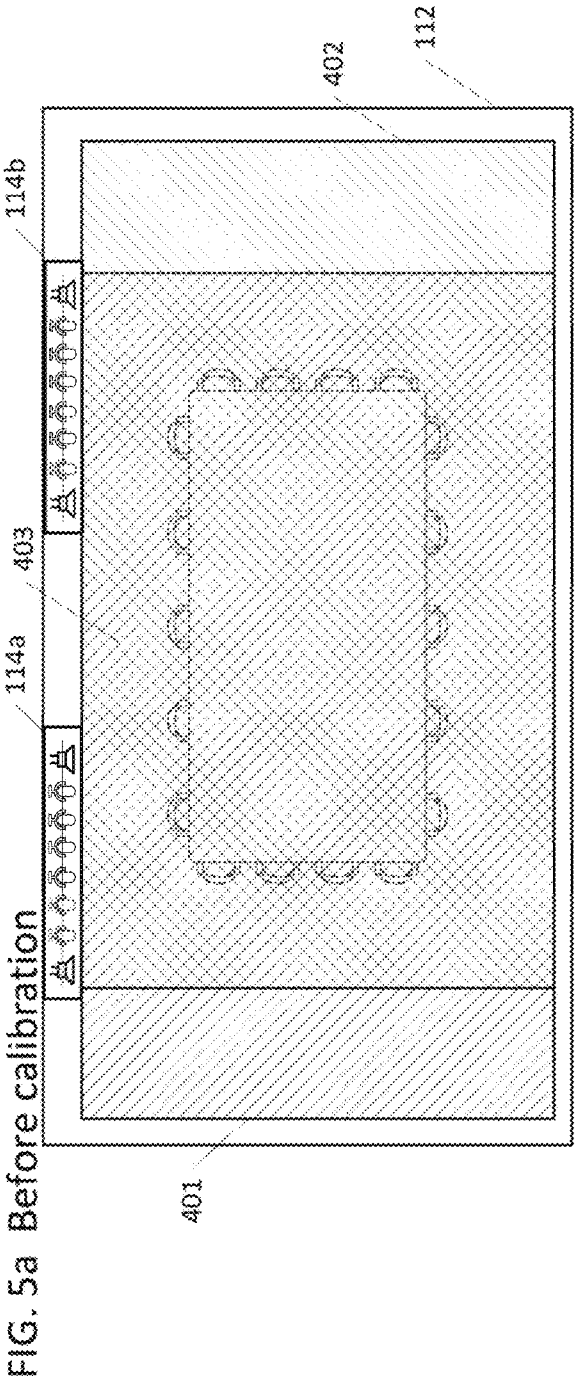
FIG. 5a Before calibration
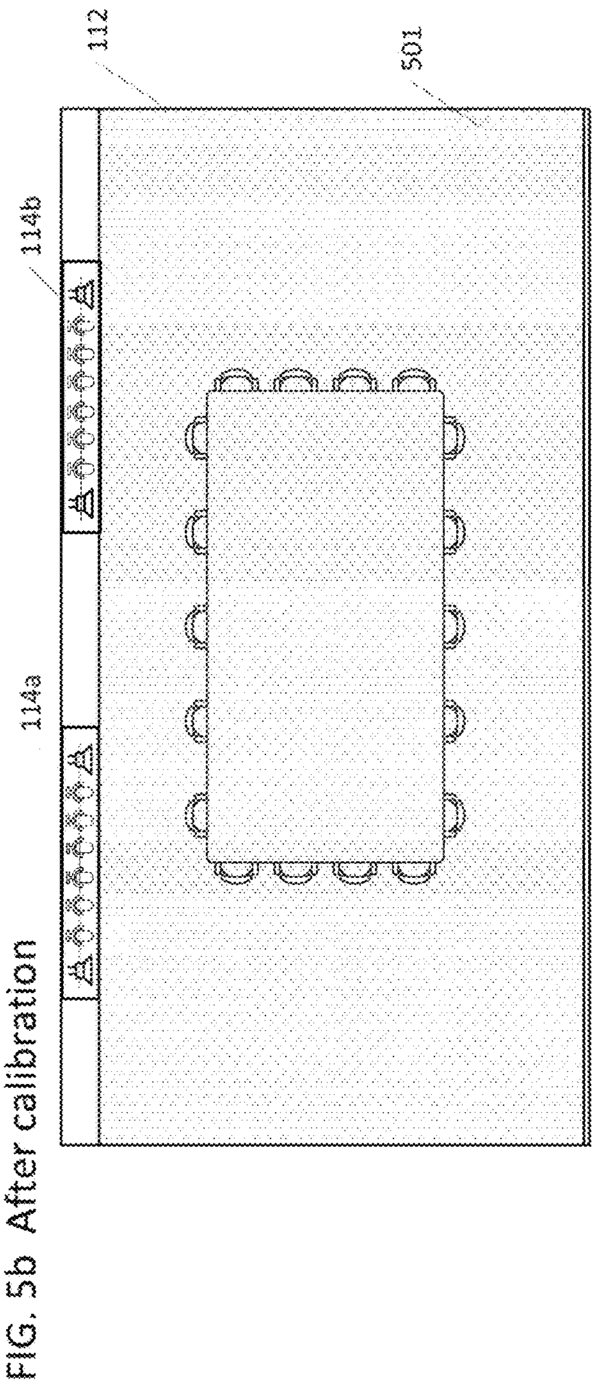
FIG. 5b After calibration

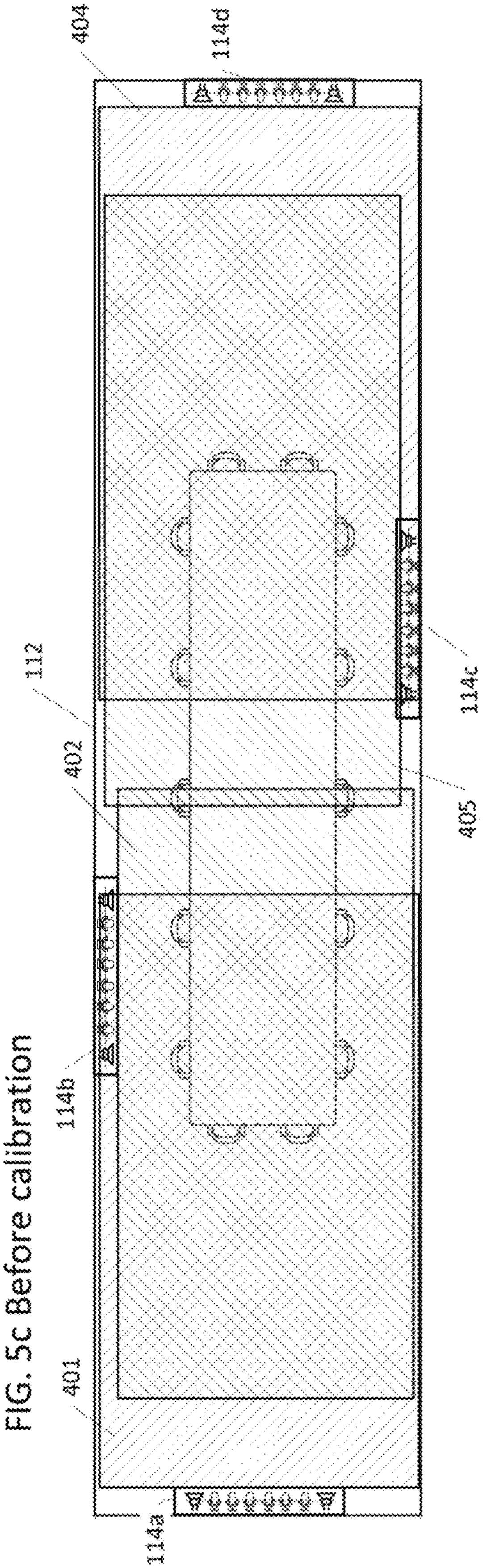
FIG. 5c Before calibration
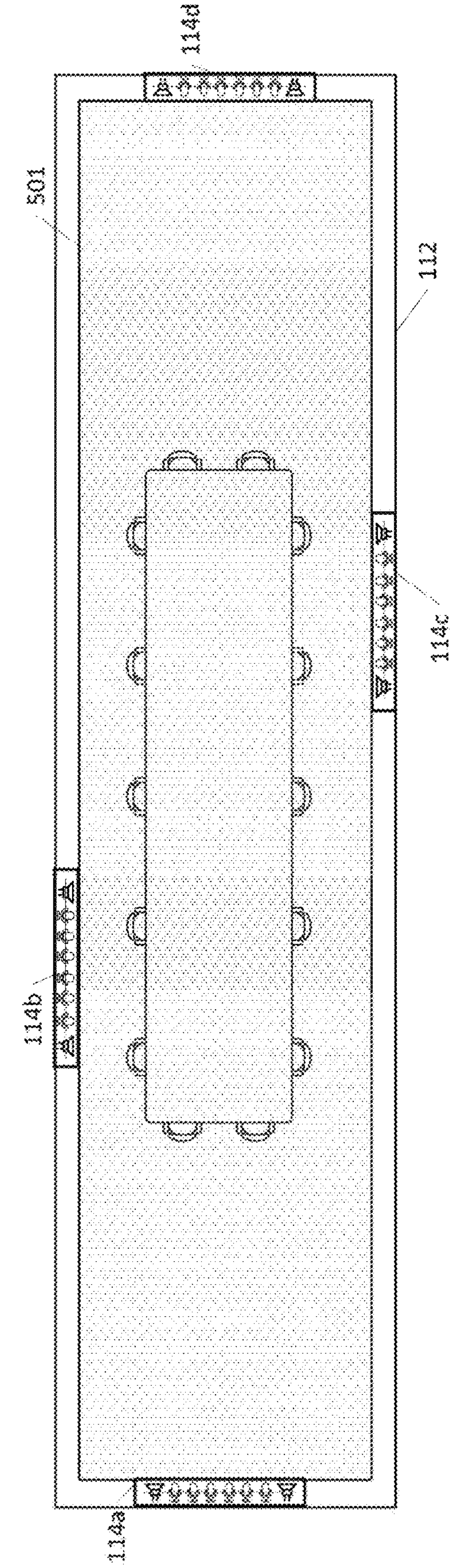
FIG. 5d After calibration

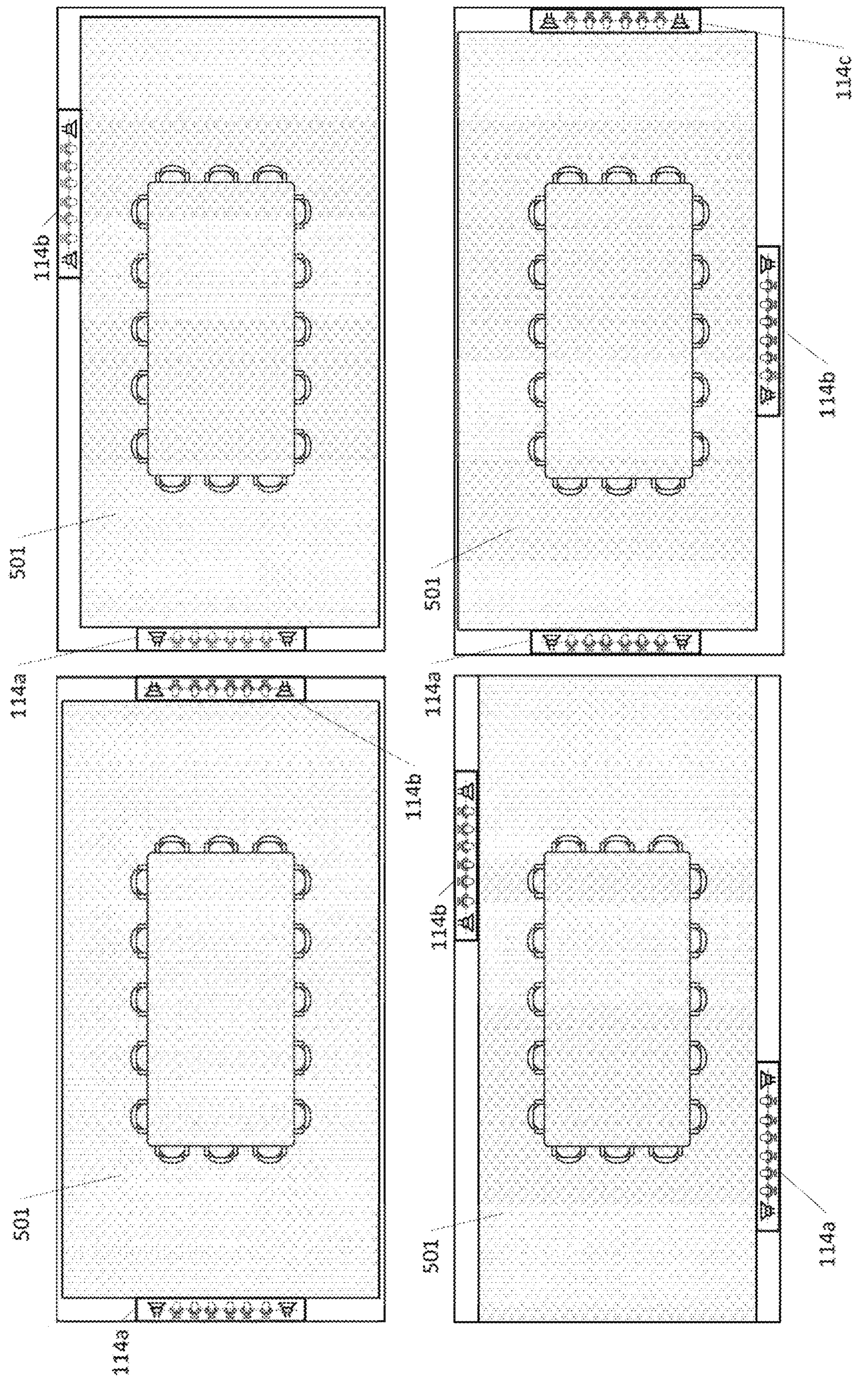
FIG. 5e – Build a single combined array

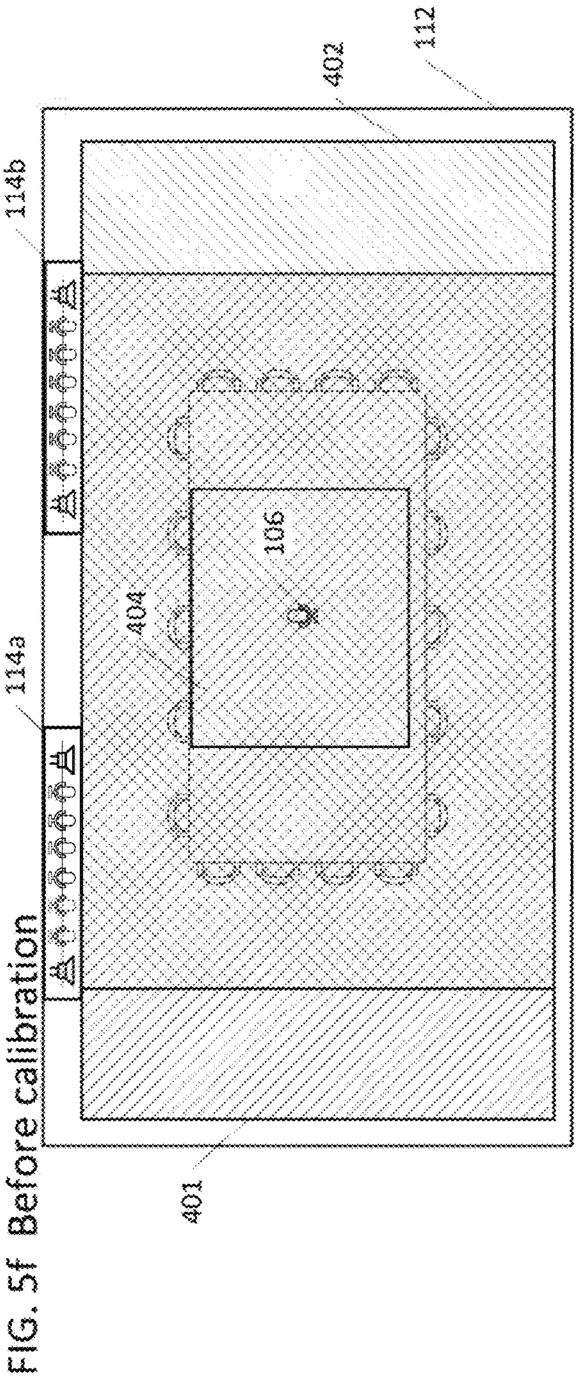
FIG. 5f Before calibration
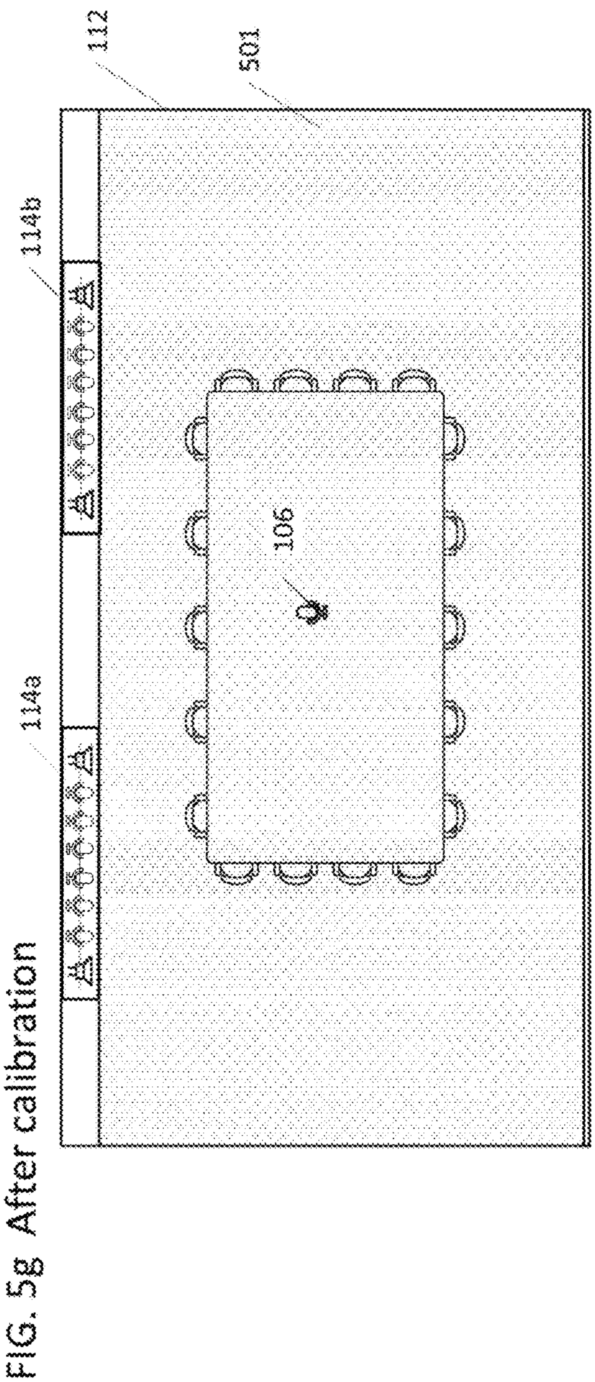
FIG. 5g After calibration

FIG. 6 Room Boundary Axis definitions
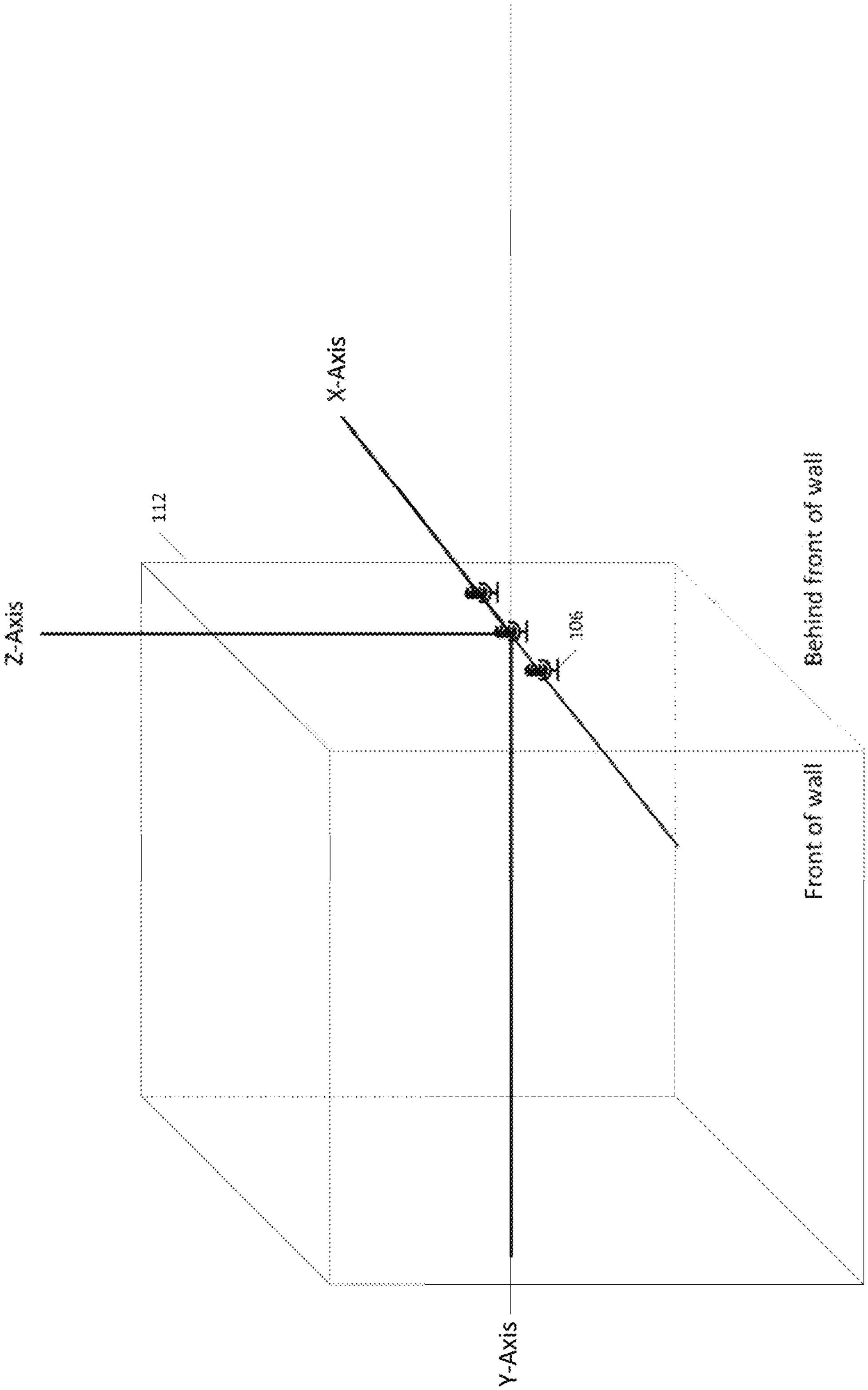

FIG. 7b Side view
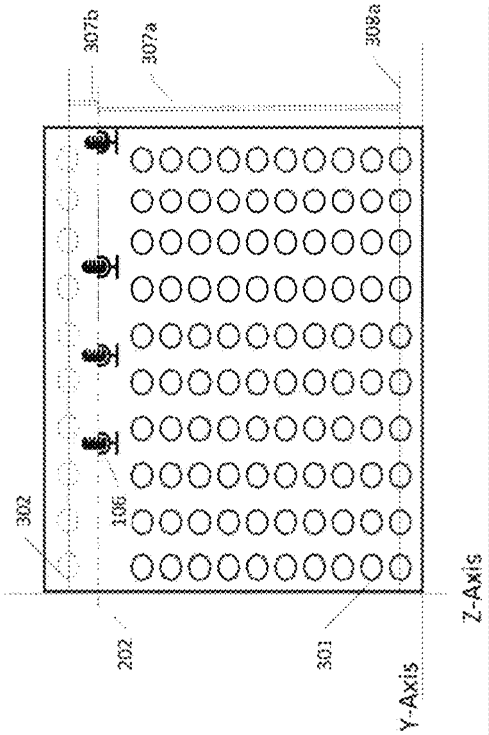
FIG. 7c Side view
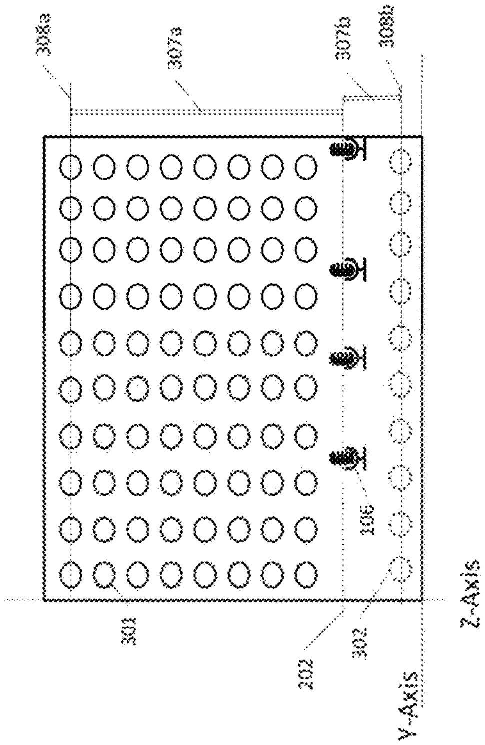
FIG. 7a Multi-M-Axis - M-Plane
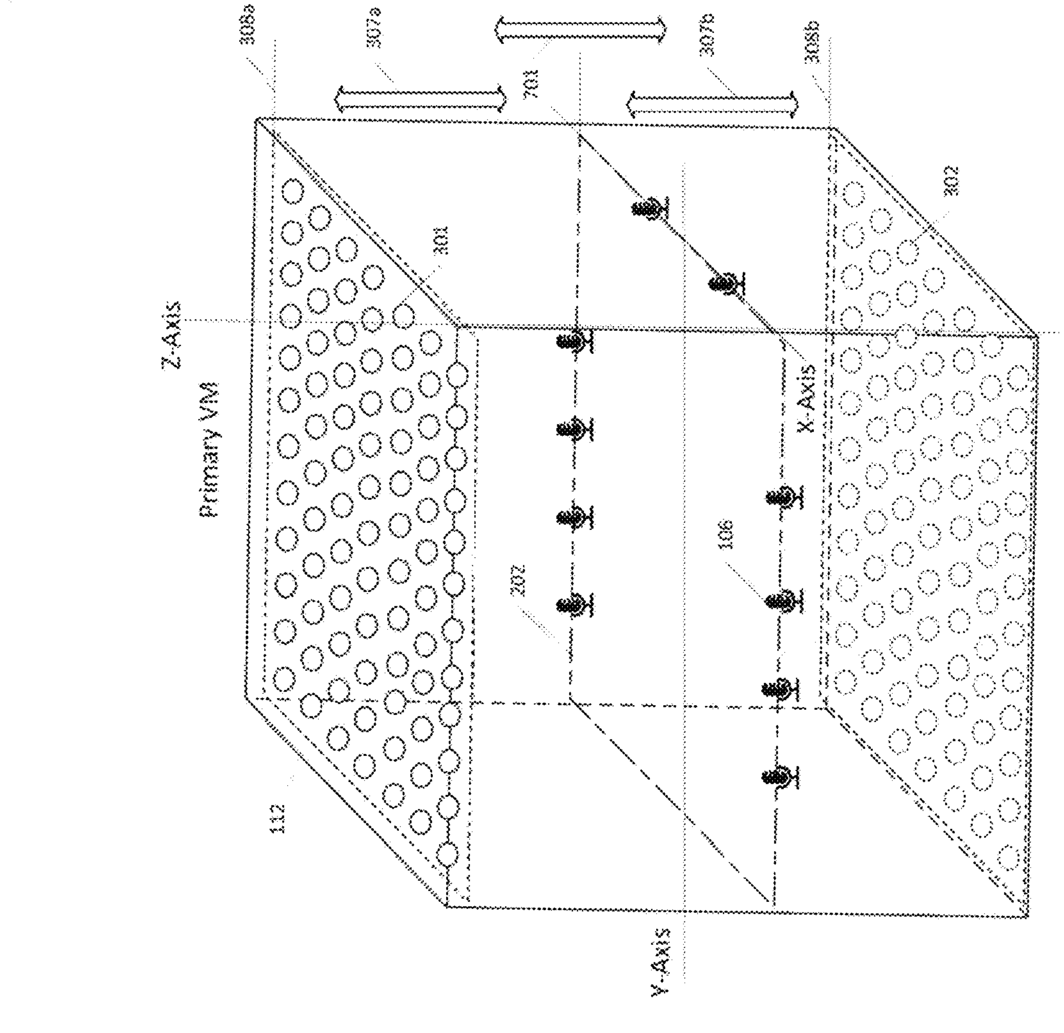

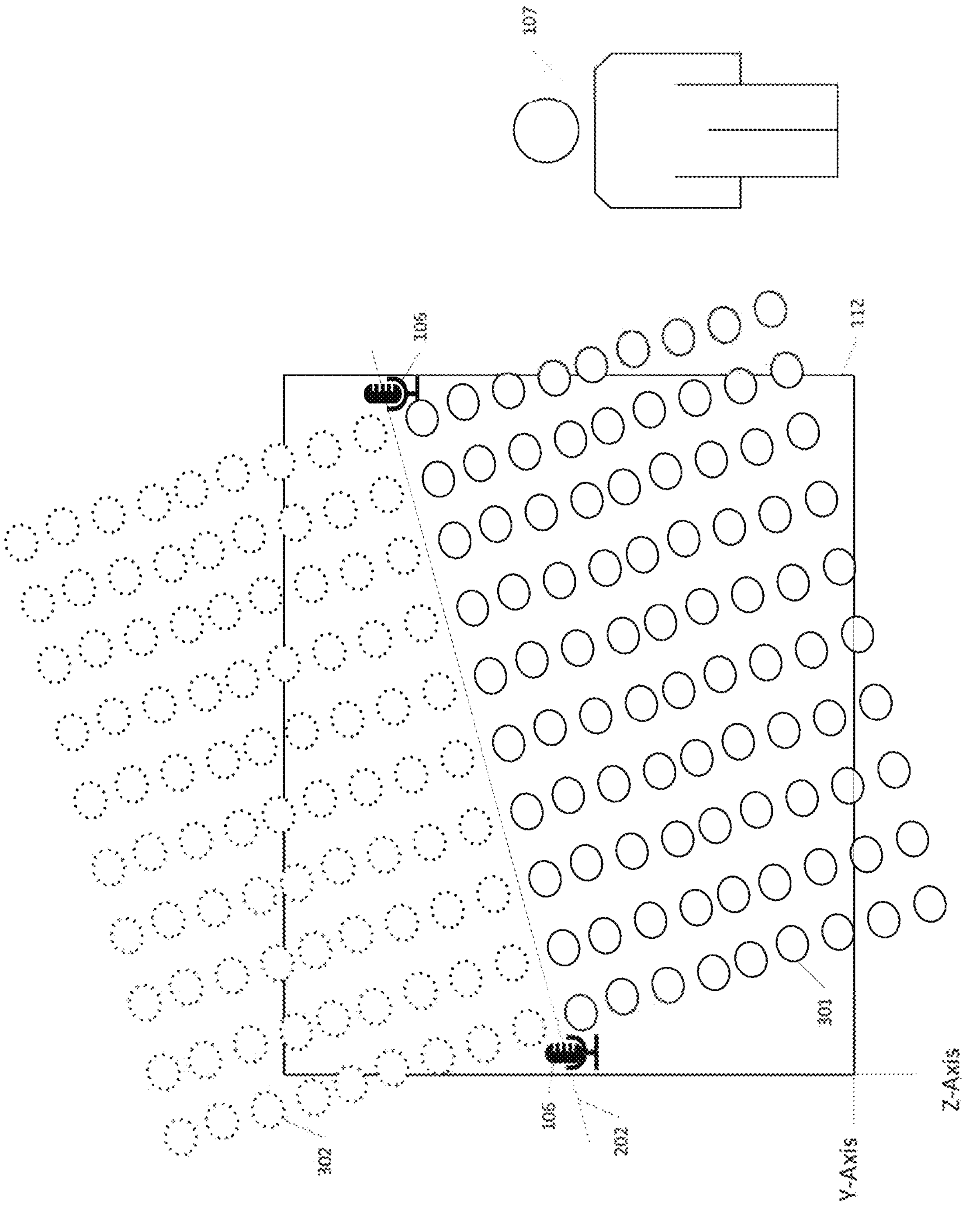
FIG. 8a M-Plane on a diagonal side view

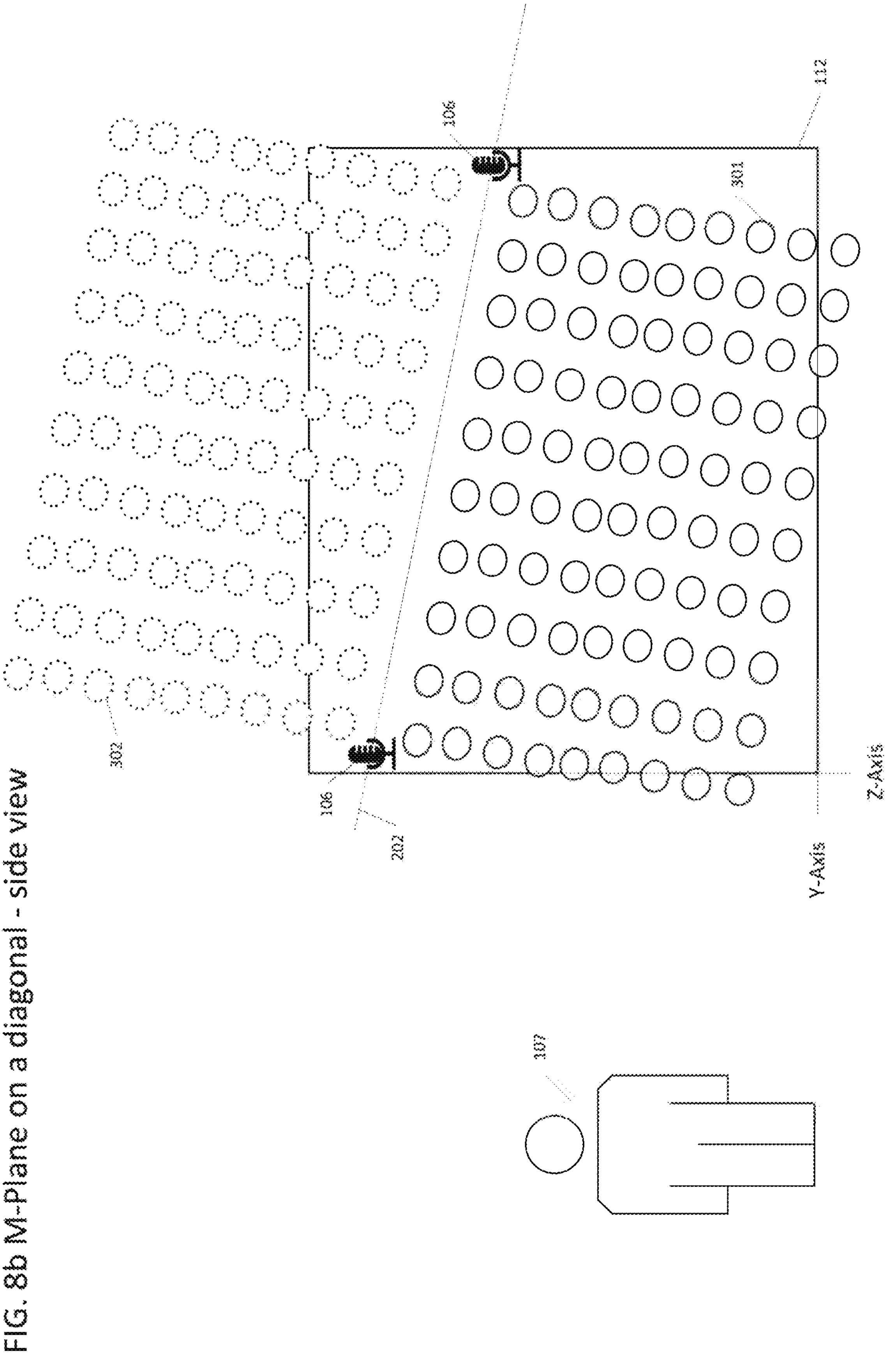
FIG. 8b M-Plane on a diagonal - side view

FIG. 8c Mutli M-Axis, M-Hyperplane side view
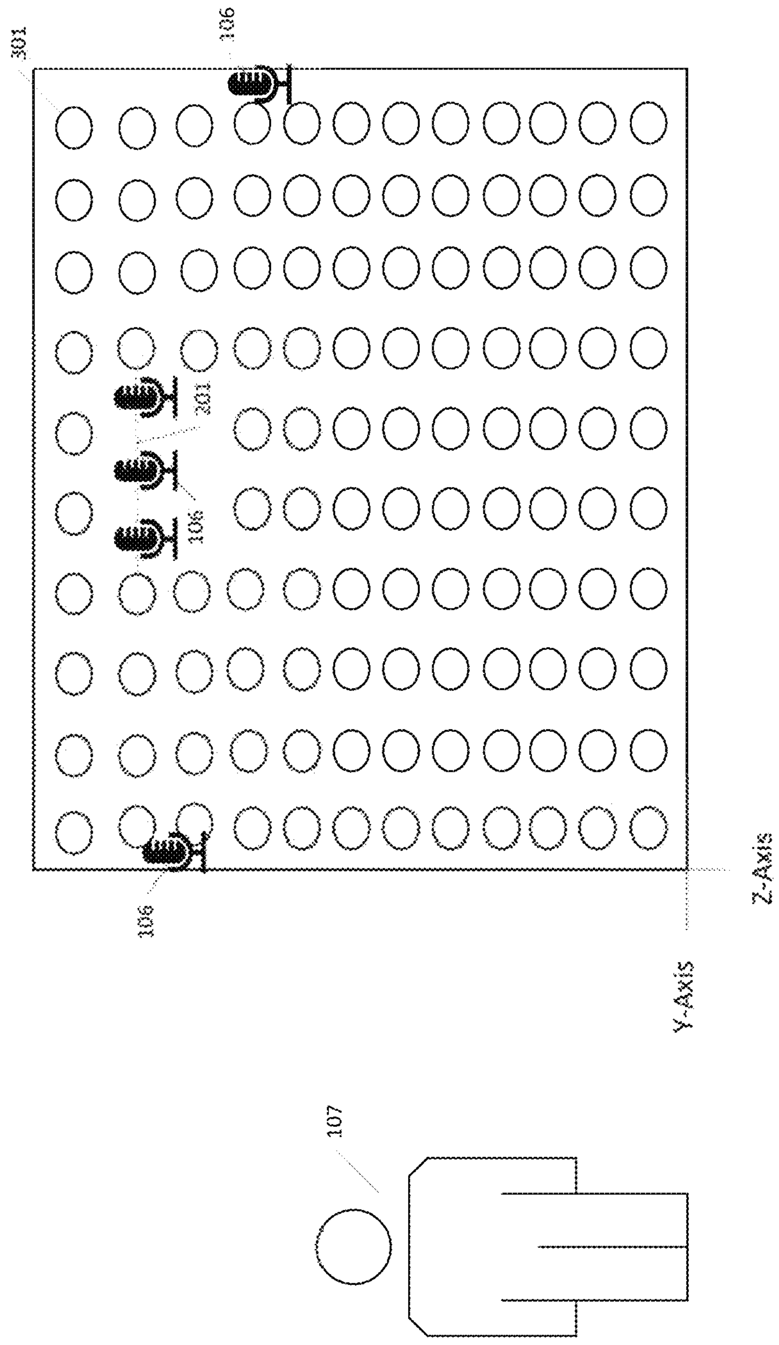

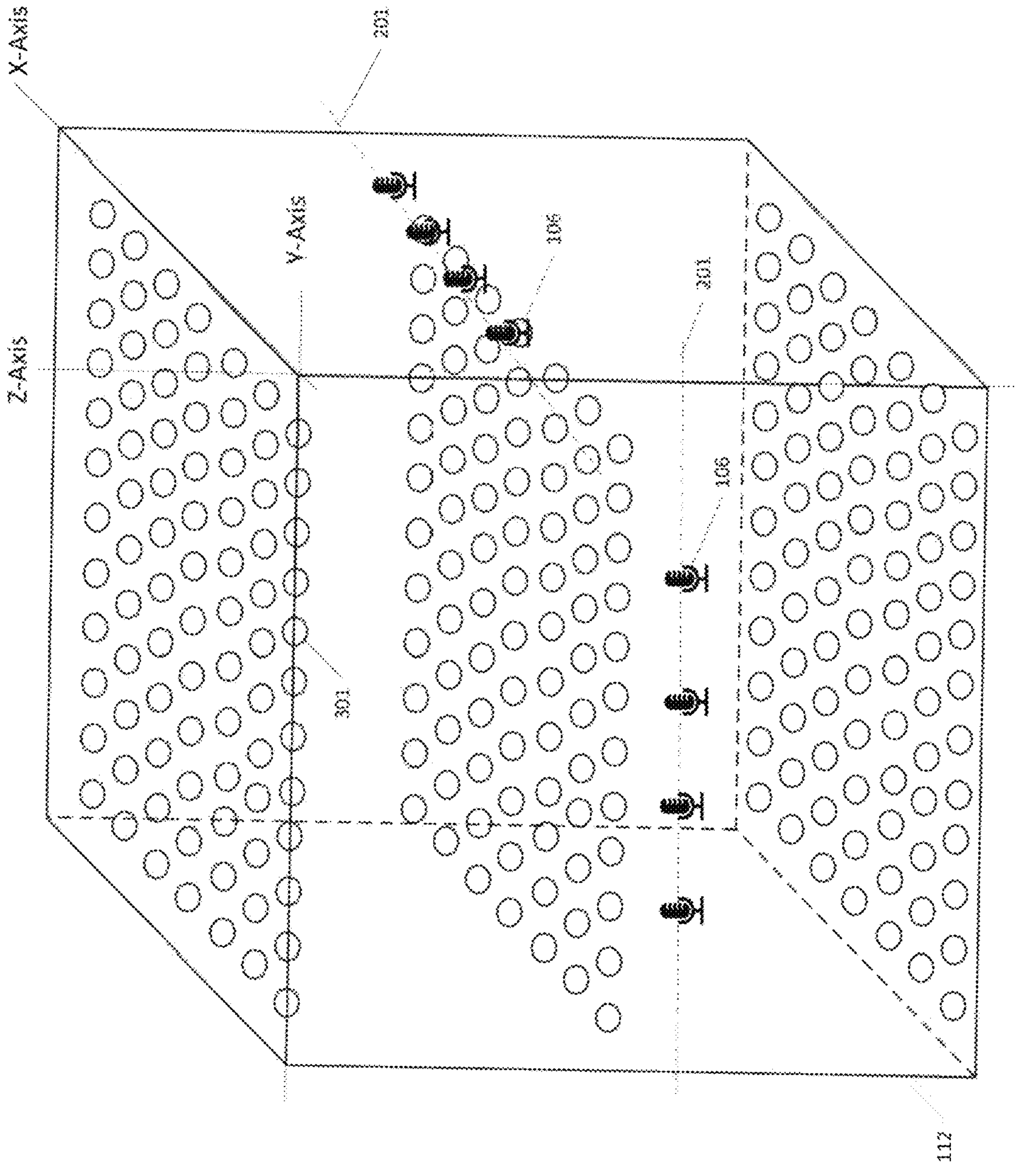
FIG. 9a Multi-M-Axis, M-Hyperplane

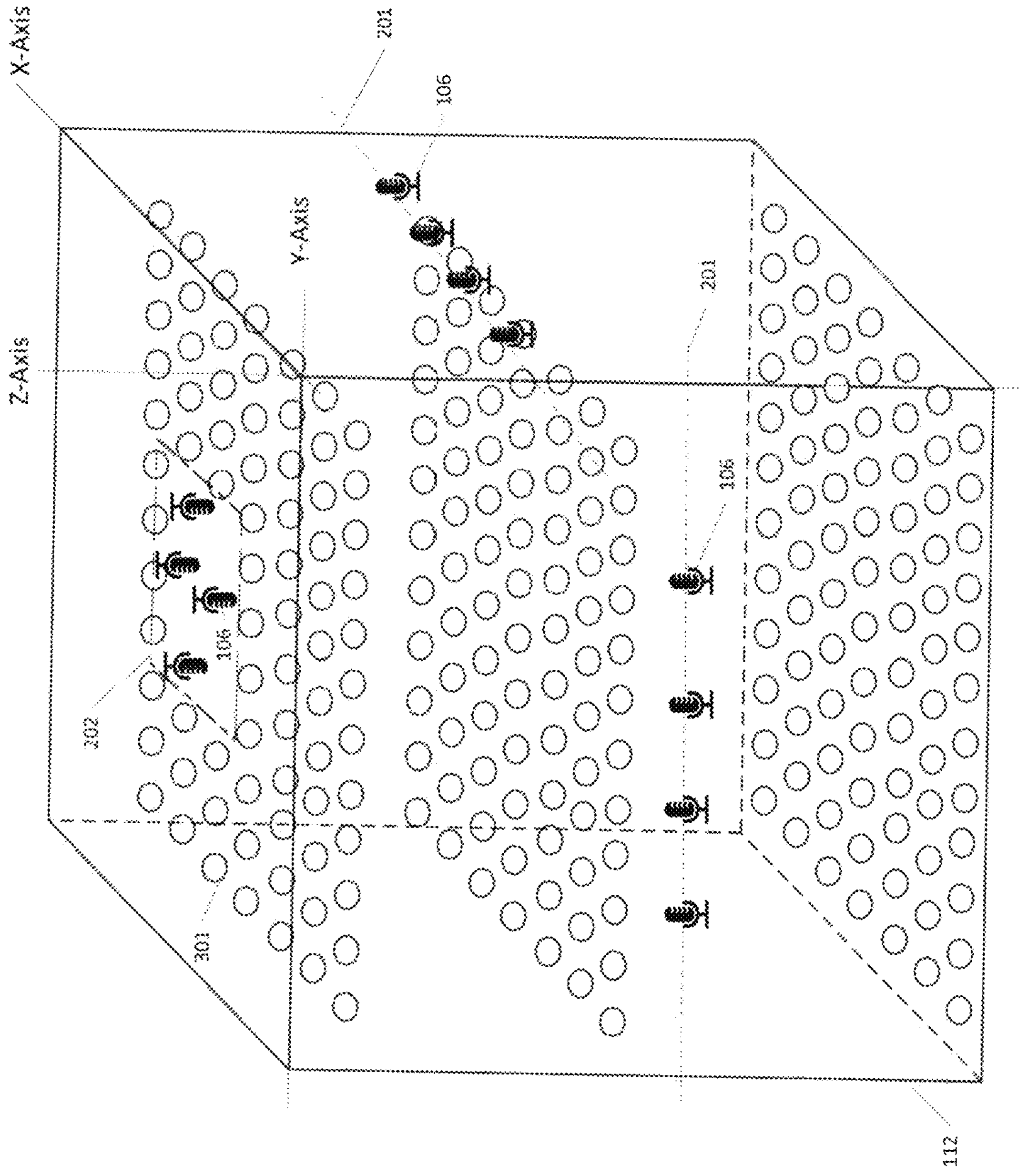
FIG. 9b Multi M-Axis, M-Hyperplane

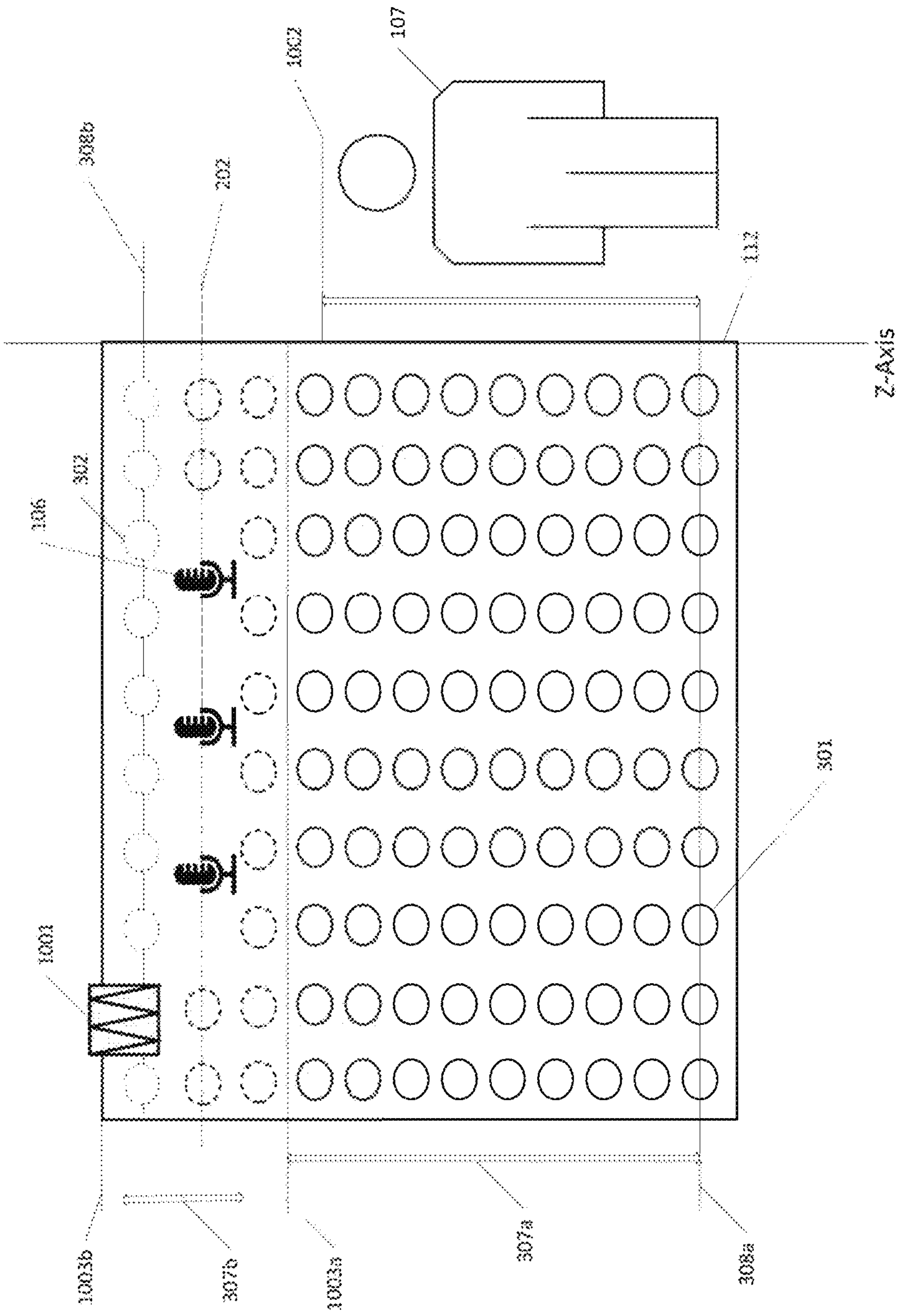
FIG. 10a M-Plane with noise source

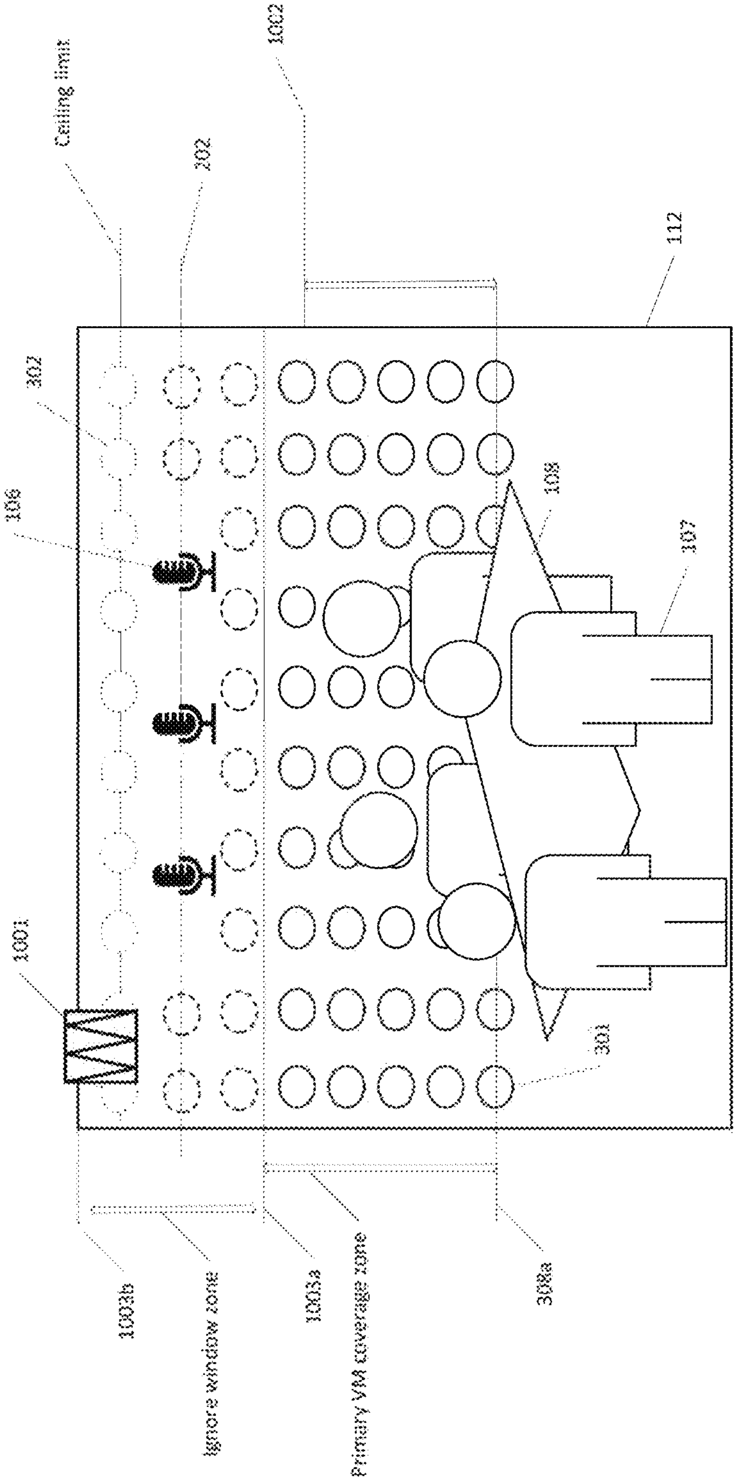
FIG. 10b M-Plane with noise source and table

FIG. 10c M-Hyperplane – with noise source and table
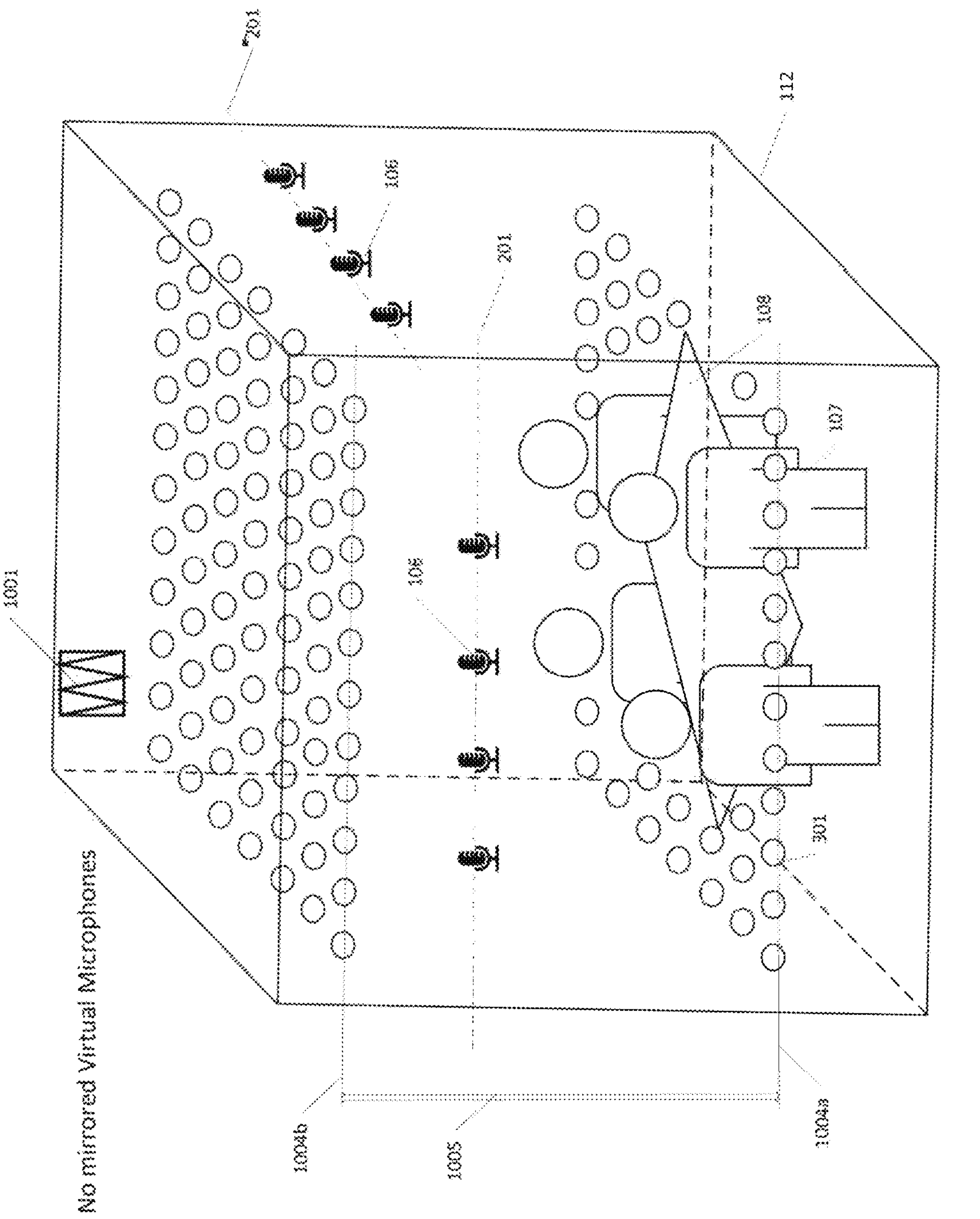

FIG. 11a Invention – Primary Processing Components – System Diagram
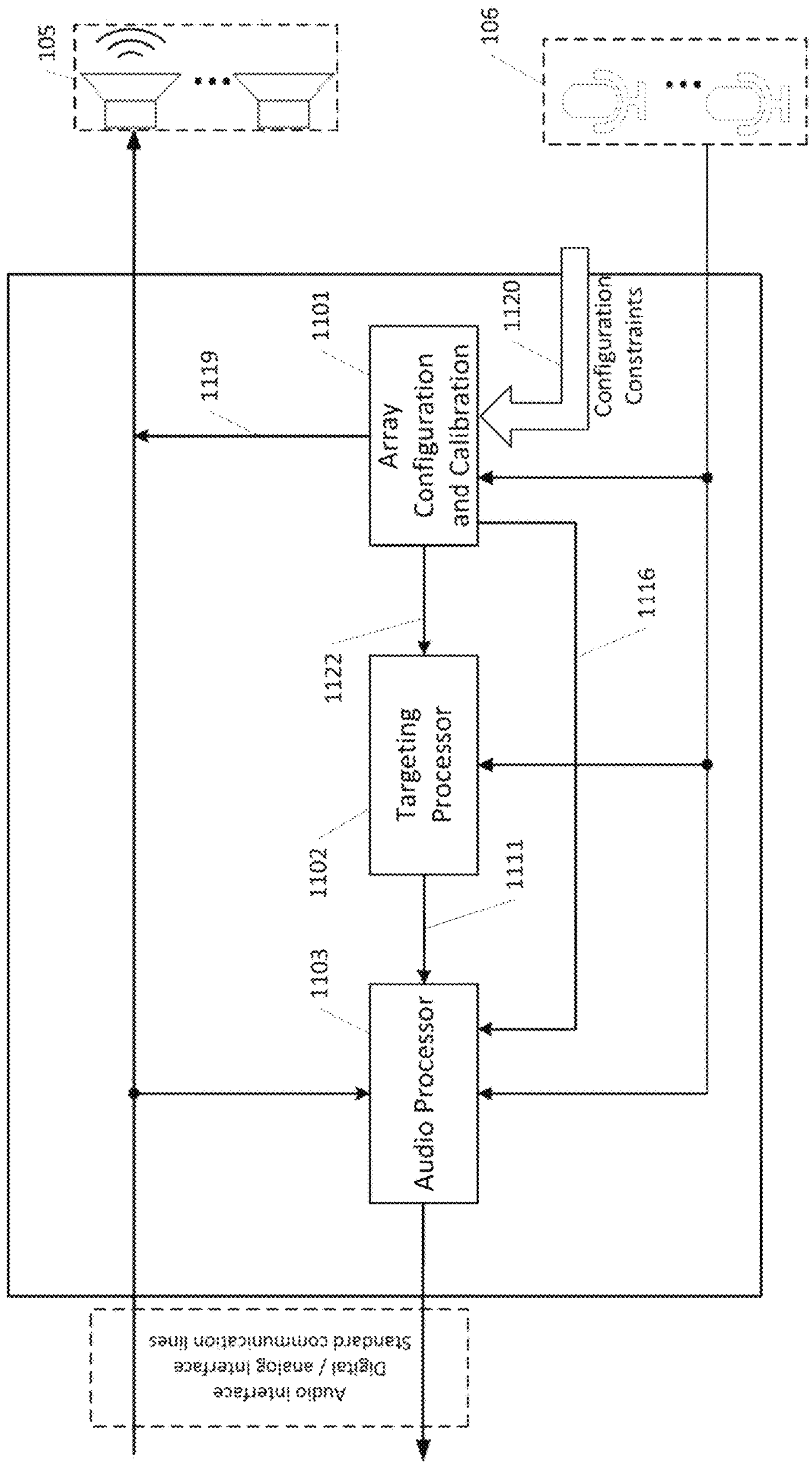

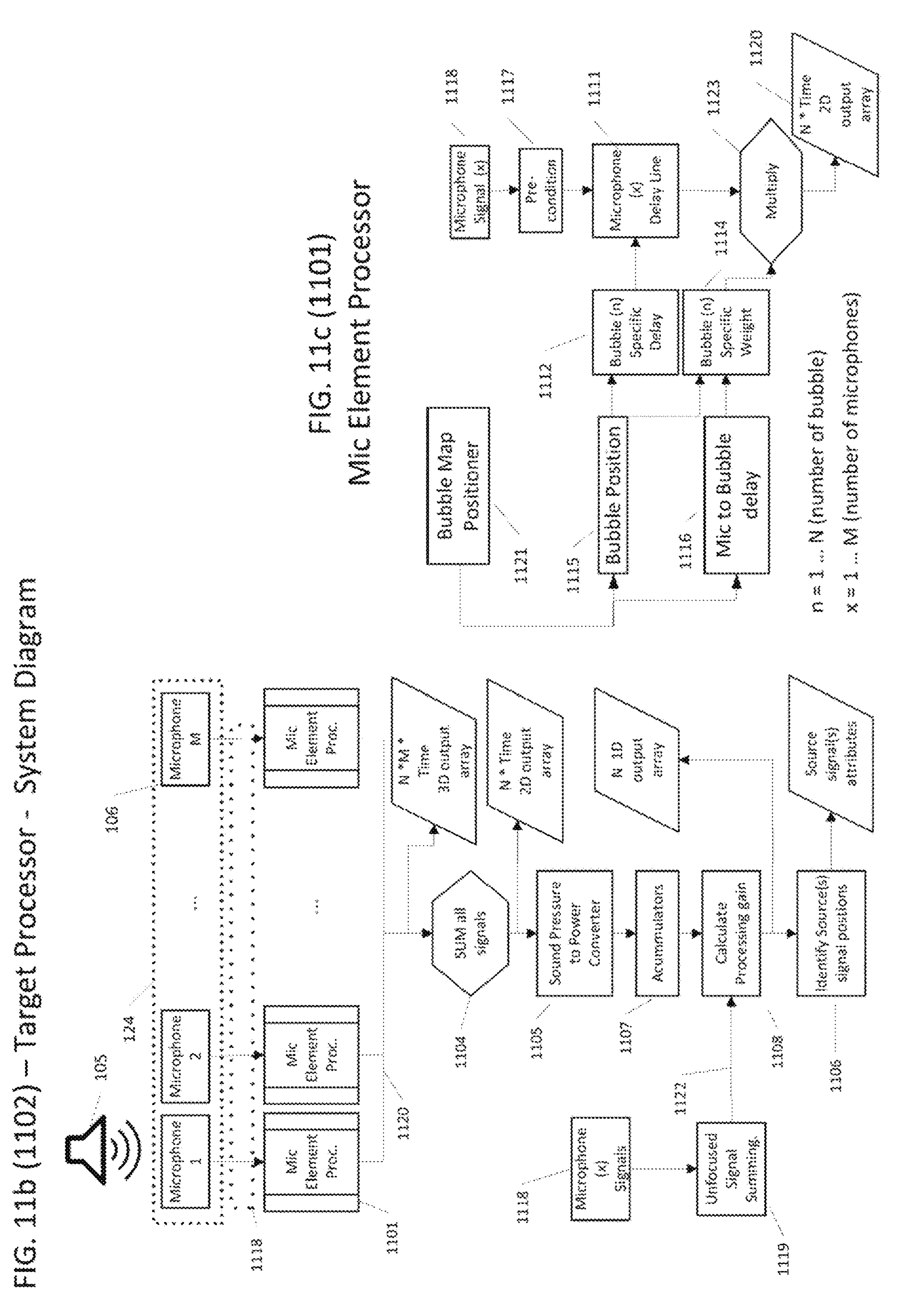
FIG. 11b (1102) – Target Processor - System Diagram
FIG. 11c (1101) Mic Element Processor FIG. 12a (1121) Invention – Bubble Map Positioner Processor Flowchart
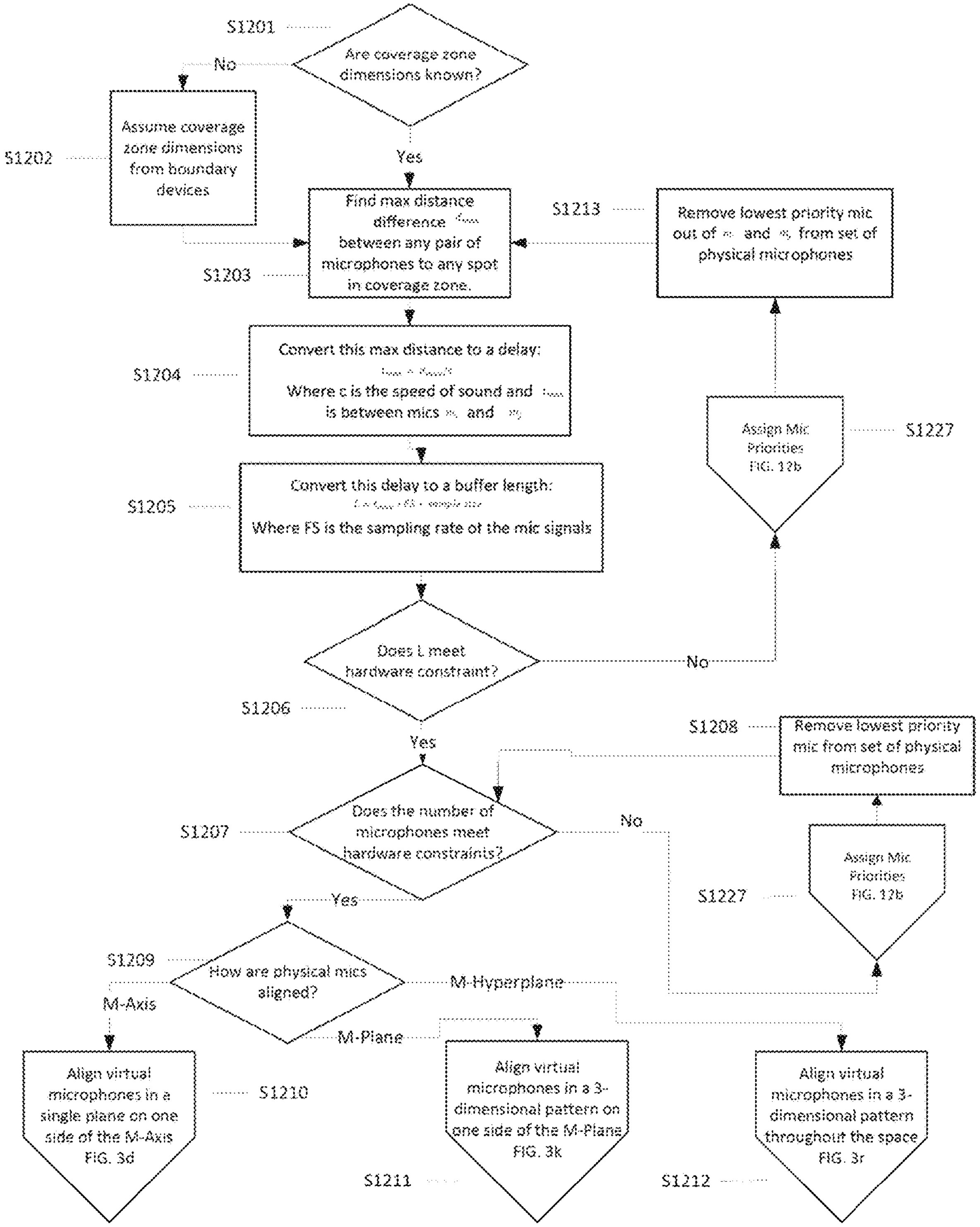

FIG. 12b (S1227) Invention – Flowchart for Assigning Mic Priorities
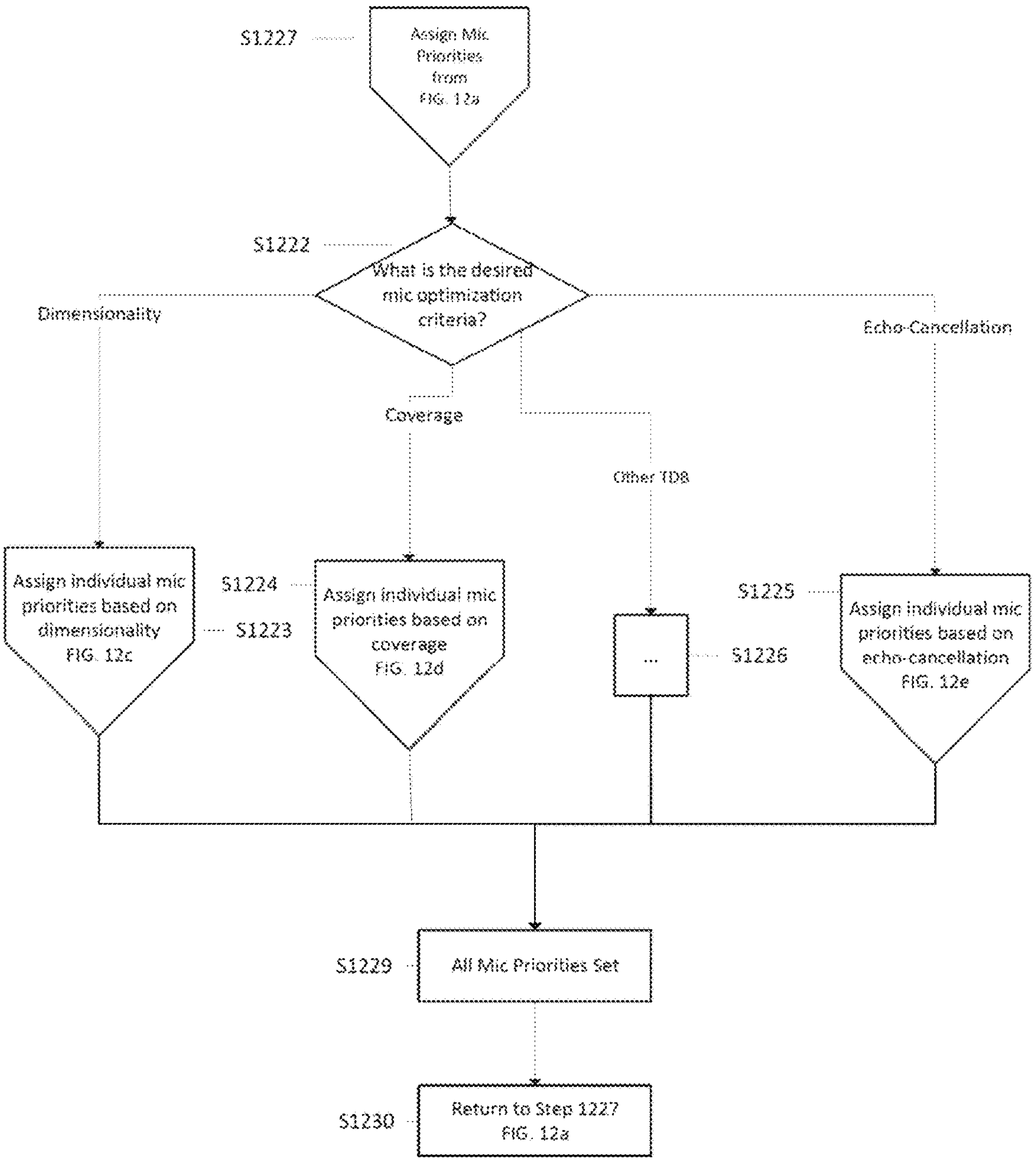

FIG. 12c (Step 1223) Invention – Flowchart for Assigning Mic Priority – Optimizing for Dimensionality
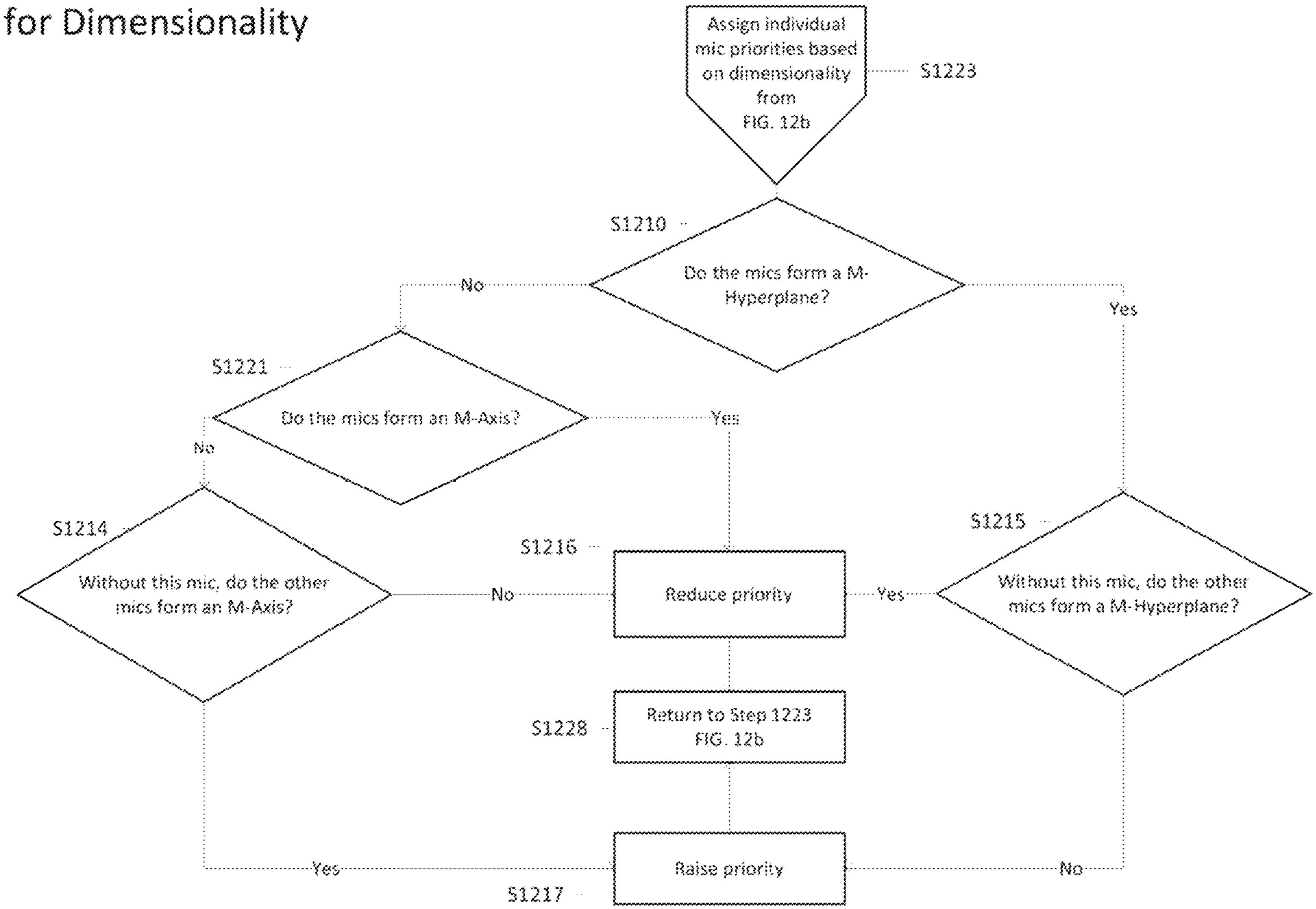

FIG. 12d Invention (S1224) – Flowchart for Assigning Mic Priority – Optimizing for Room Coverage
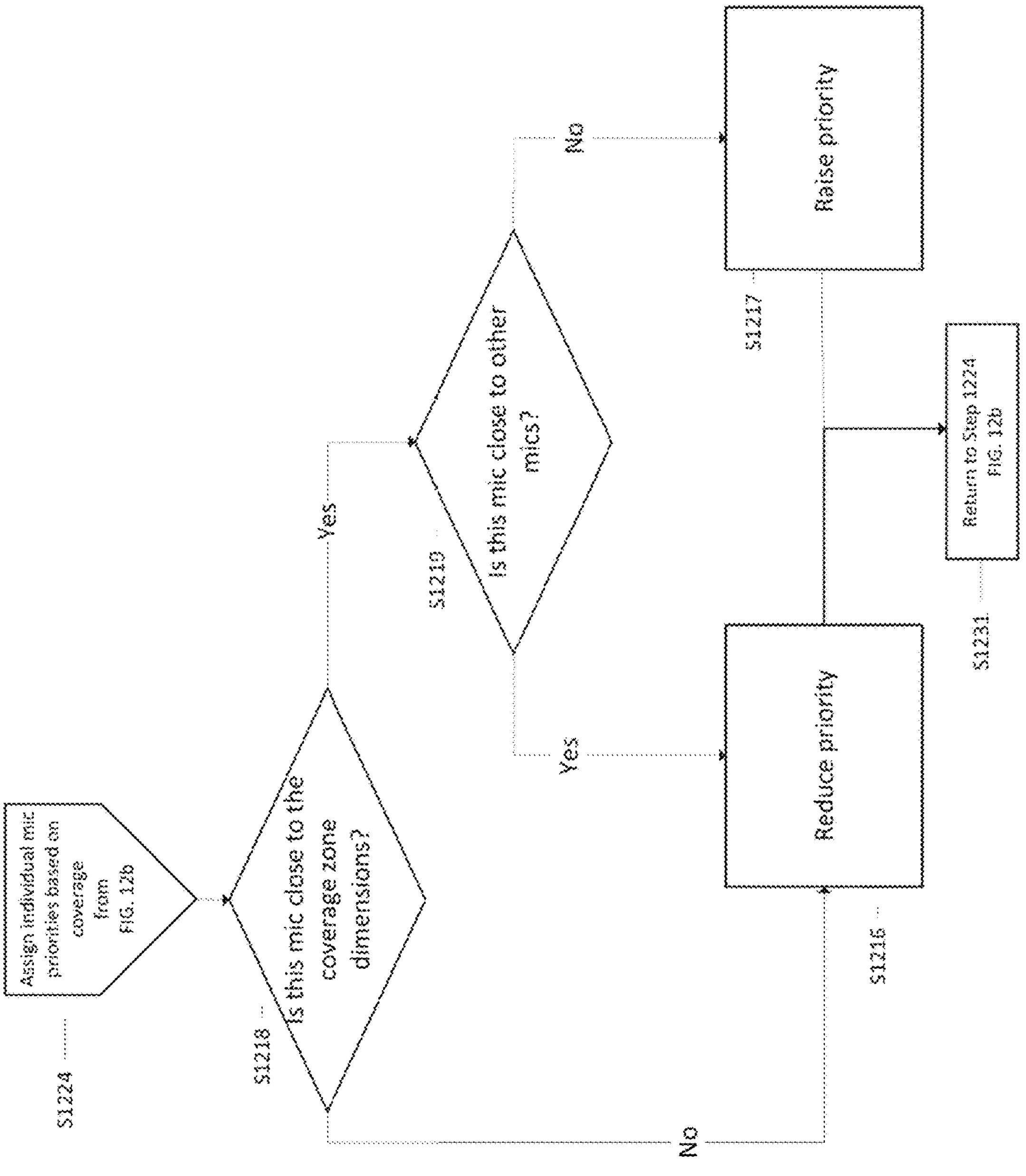

FIG. 12e Invention (S1225) – Flowchart for Assigning Mic Priority – Optimizing for Echo Cancellation
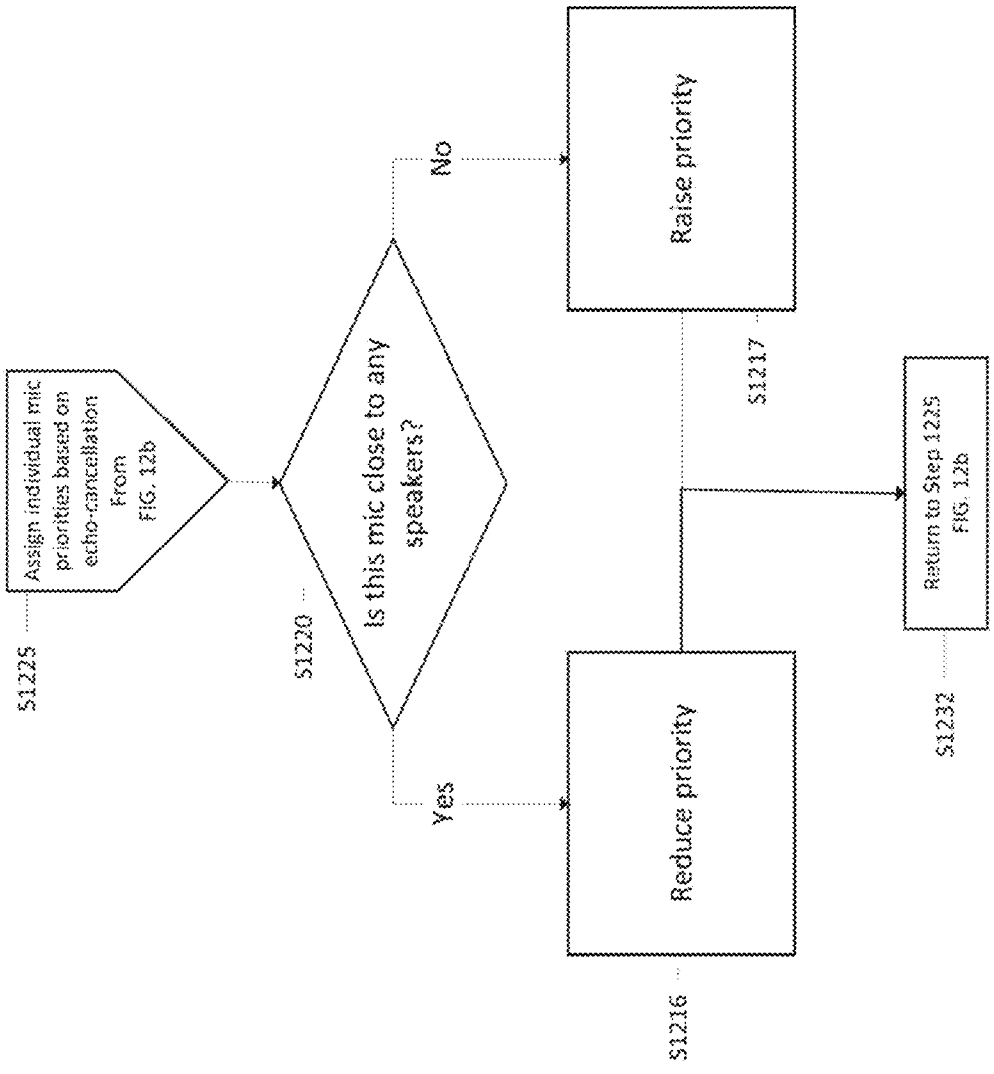

FIG. 13a Invention – One Boundary Device Installed - Top View
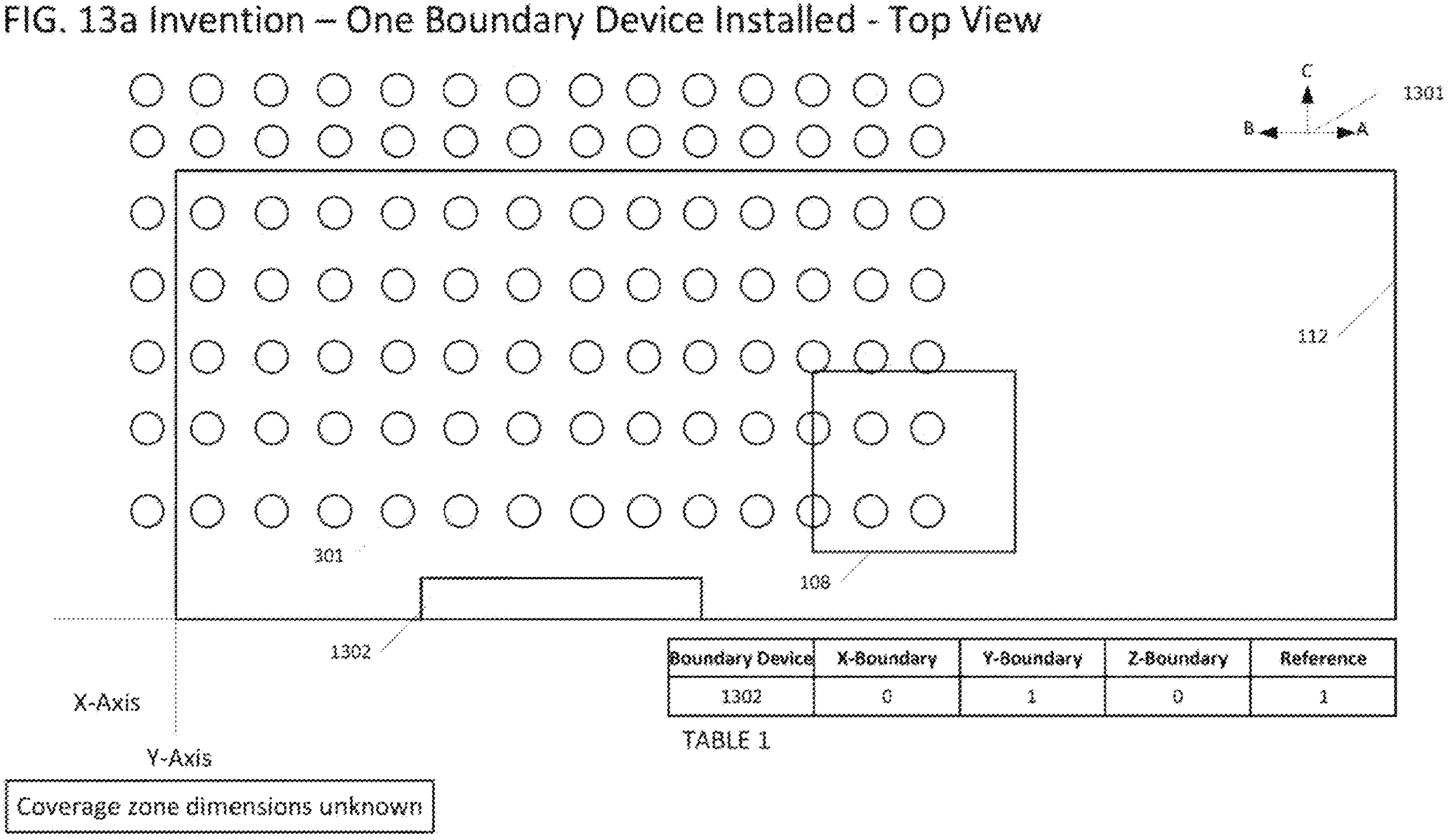
| Boundary Device | X-Boundary | Y-Boundary | Z-Boundary | Reference |
|---|---|---|---|---|
| 1302 | 0 | 1 | 0 | 1 |
TABLE 1
FIG. 13b – Single M-Plane Boundary device
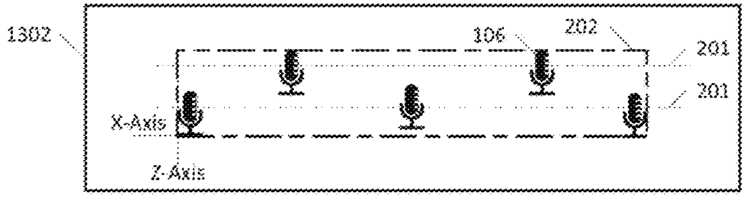

FIG. 13c Invention – One Boundary Device Installed – Side View
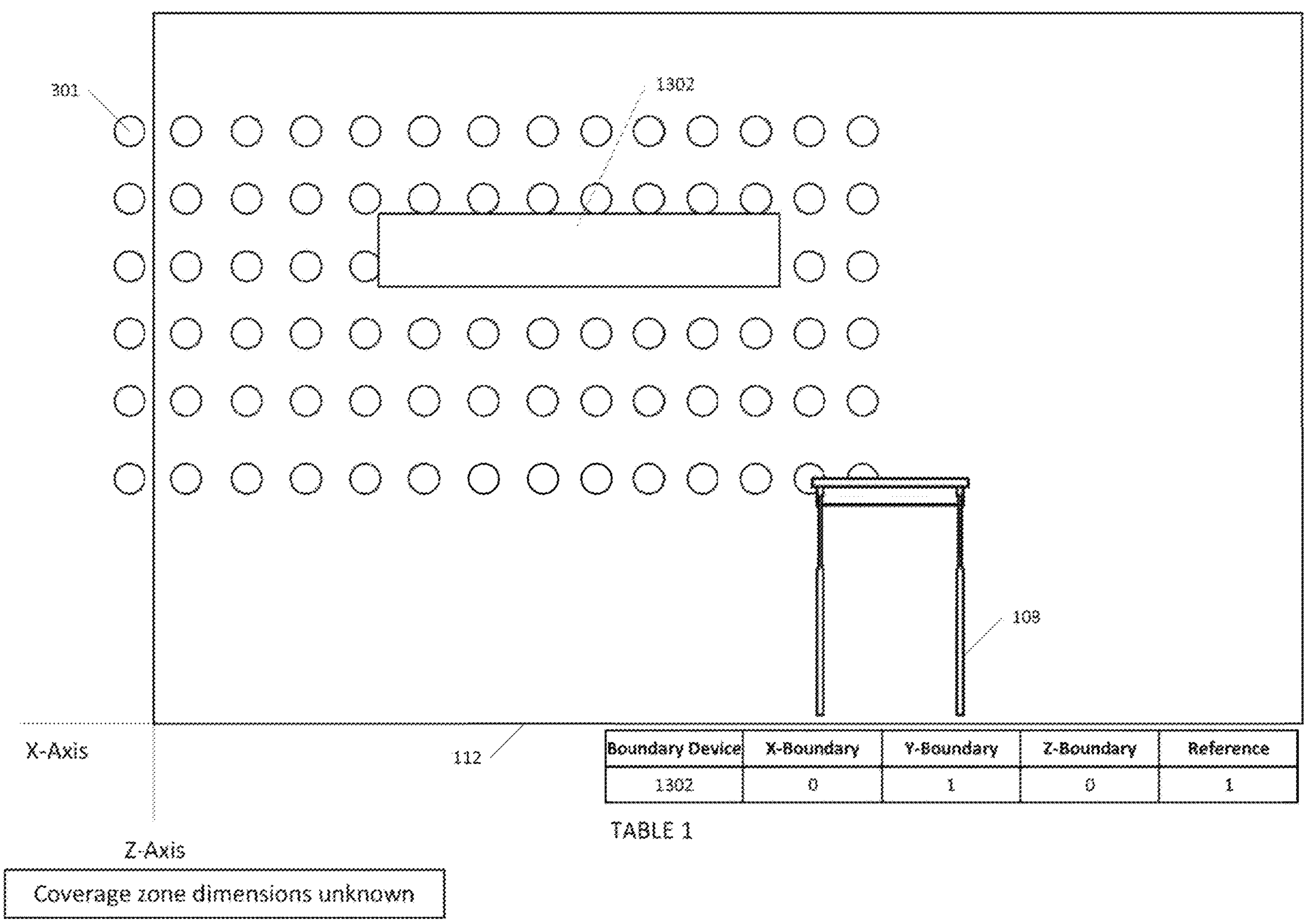
| Boundary Device | X-Boundary | Y-Boundary | Z-Boundary | Reference |
|---|---|---|---|---|
| 1302 | 0 | 1 | 0 | 1 |
TABLE 1

FIG. 14a Invention – Two Boundary Devices Installed In X-Y – Top View
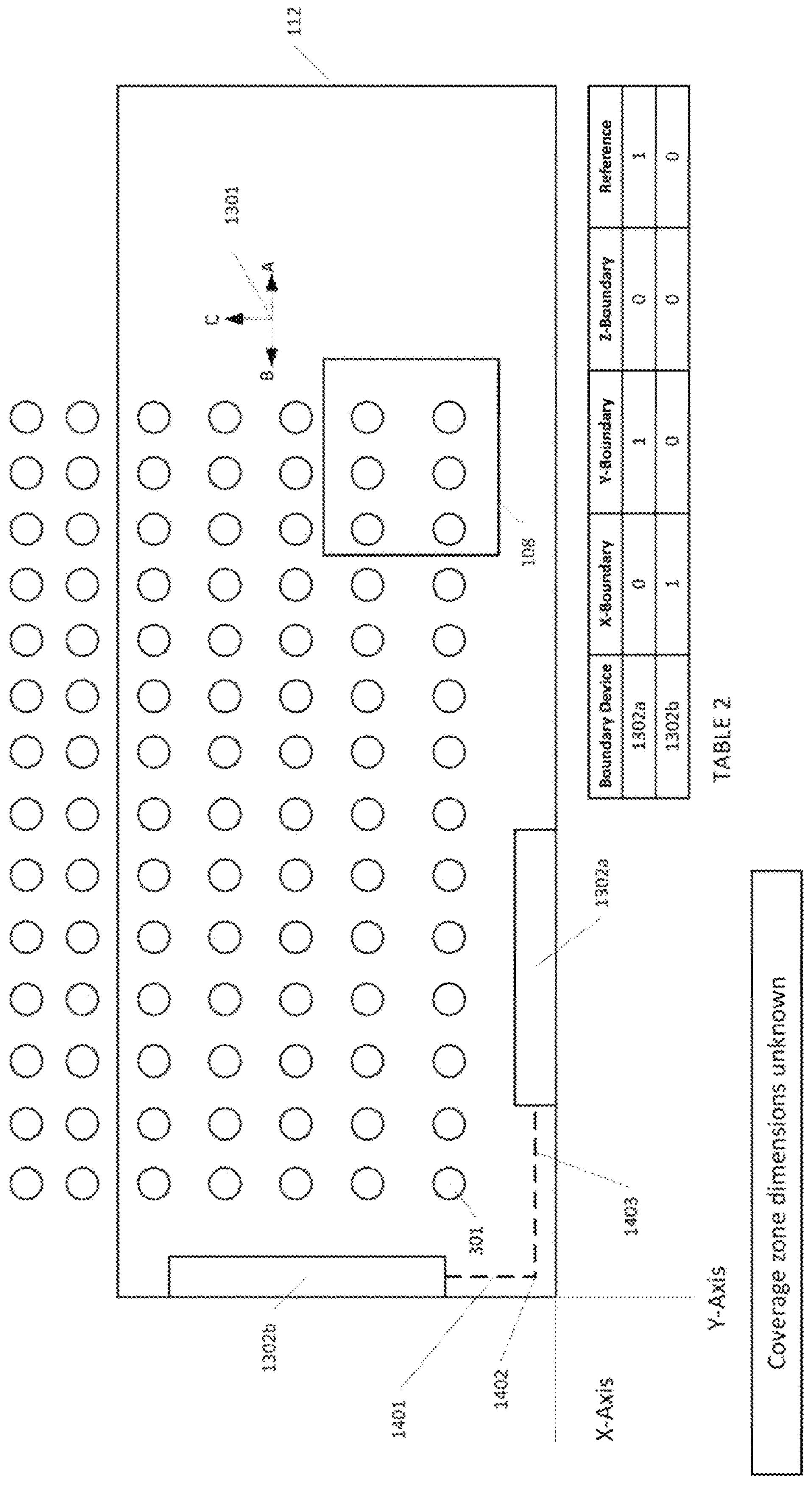
| Boundary Device | X-Boundary | Y-Boundary | Z-Boundary | Reference |
|---|---|---|---|---|
| 1302a | 0 | 1 | 0 | 1 |
| 1302b | 1 | 0 | 0 | 0 |
TABLE 2

FIG. 14b Invention – Two Boundary Devices Installed In X-Y – Side View
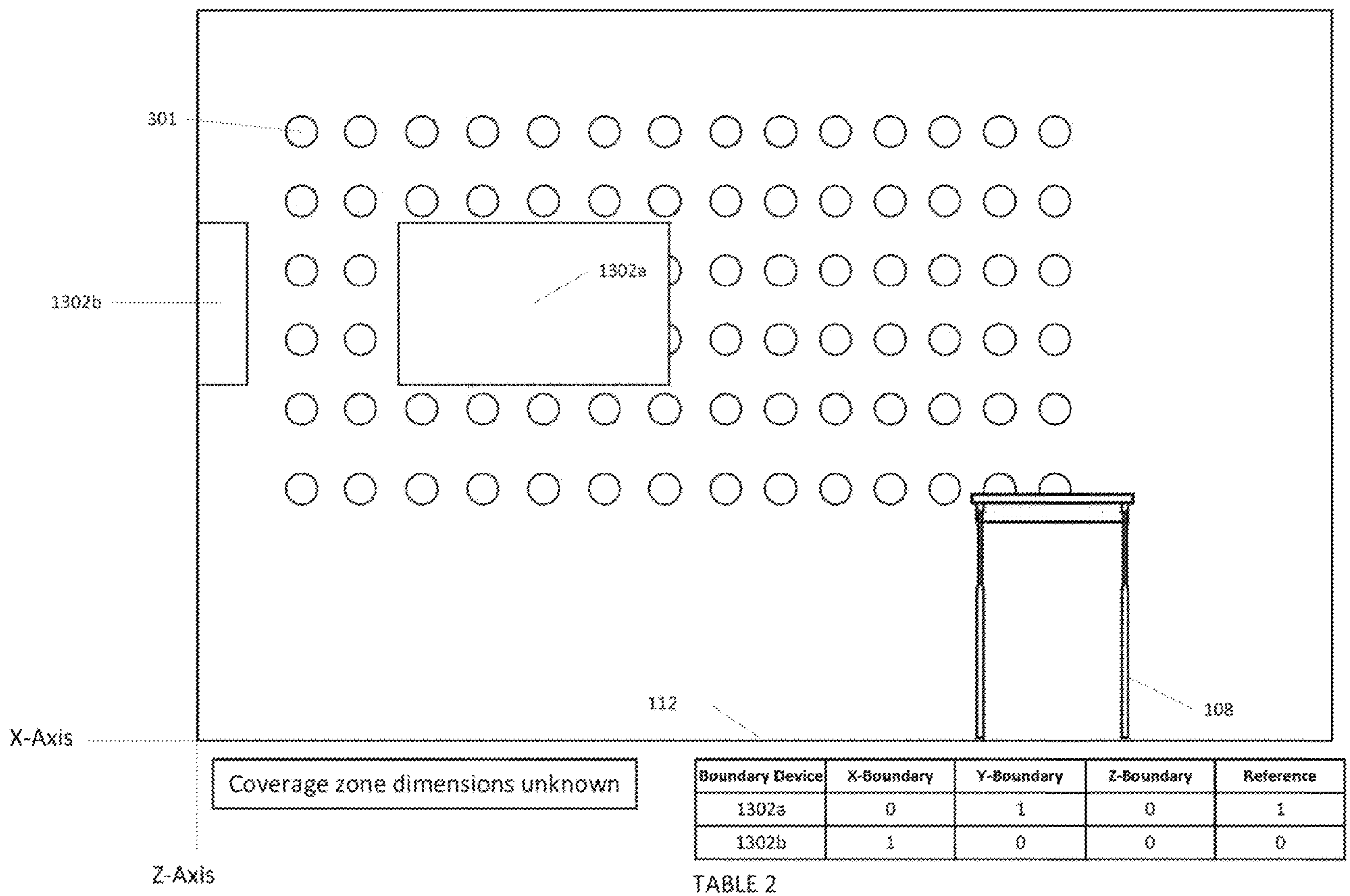
| Boundary Device | X-Boundary | Y-Boundary | Z-Boundary | Reference |
|---|---|---|---|---|
| 1302a | 0 | 1 | 0 | 1 |
| 1302b | 1 | 0 | 0 | 0 |
TABLE 2

FIG. 14c Invention – Two Boundary Devices Installed In Y-Y – Top View
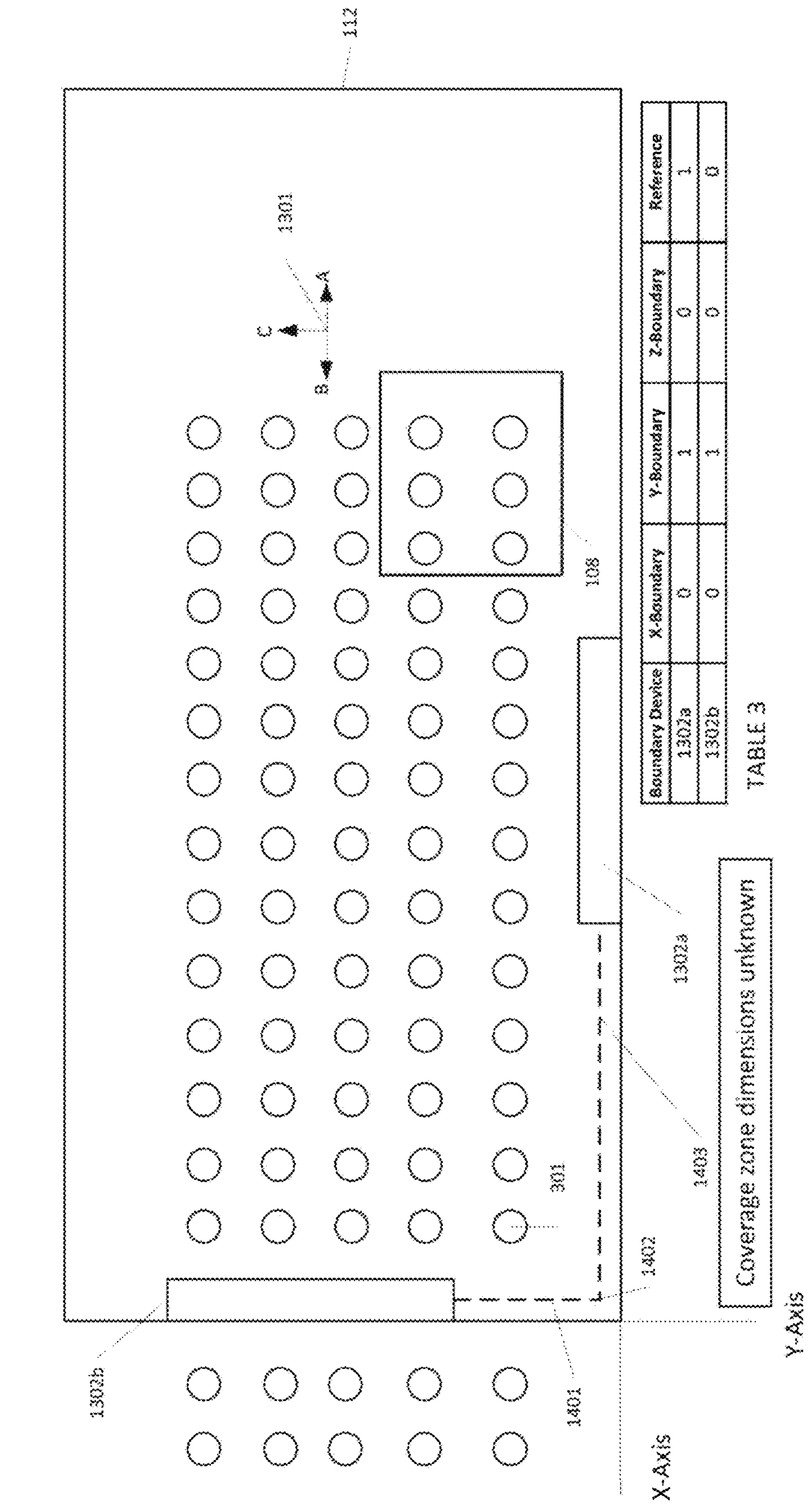
| Boundary Device | X-Boundary | Y-Boundary | Z-Boundary | Reference |
|---|---|---|---|---|
| 1302a | 0 | 1 | 0 | 1 |
| 1302b | 0 | 1 | 0 | 0 |
TABLE 3

FIG. 14d Invention – Two Boundary Devices Installed In Y-Y – Side View
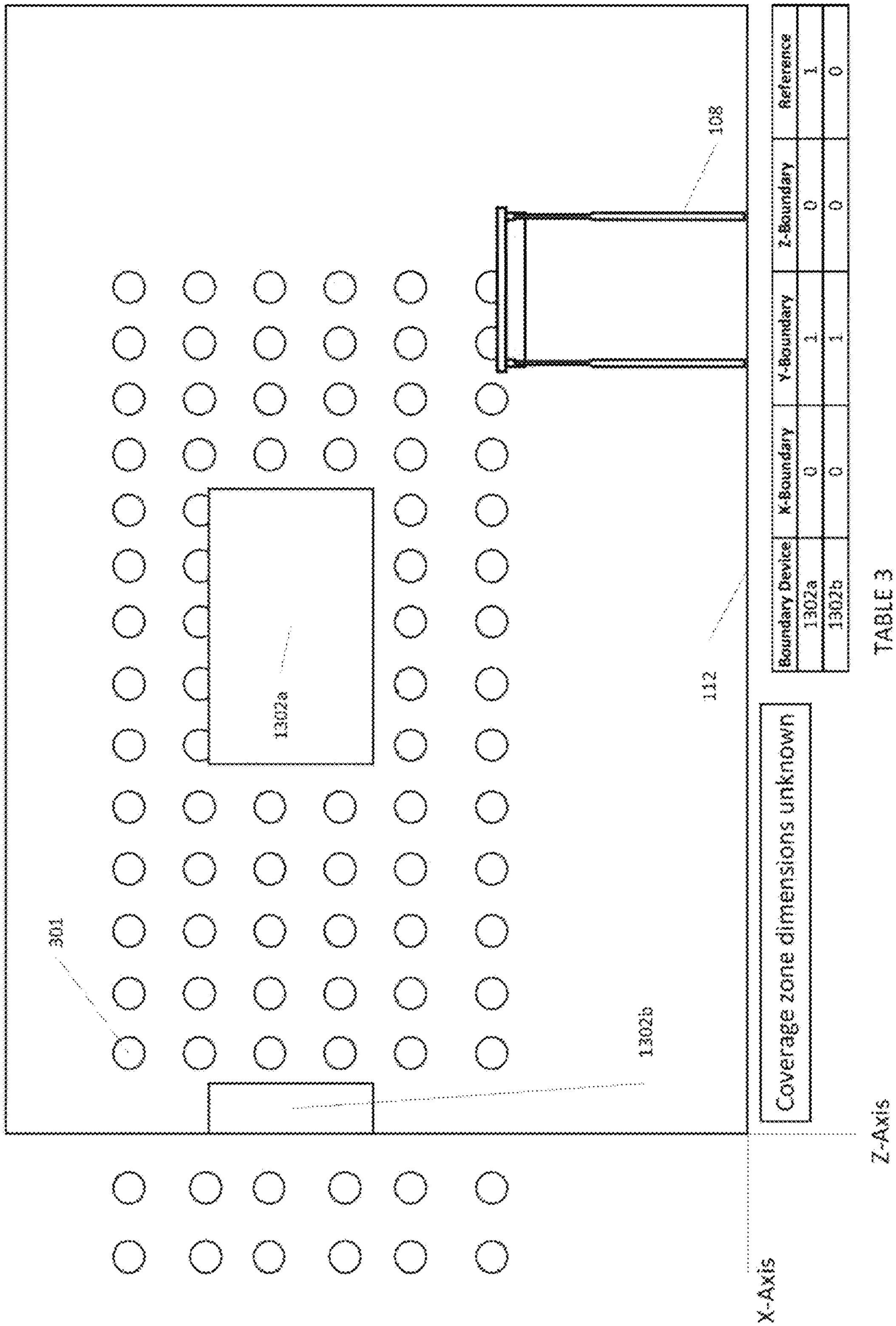
| Boundary Device | X-Boundary | Y-Boundary | Z-Boundary | Reference |
|---|---|---|---|---|
| 1302a | 0 | 1 | 0 | 1 |
| 1302b | 0 | 1 | 0 | 0 |
TABLE 3

FIG. 14e Invention – Two Boundary Devices Installed In Y-Z – Top View
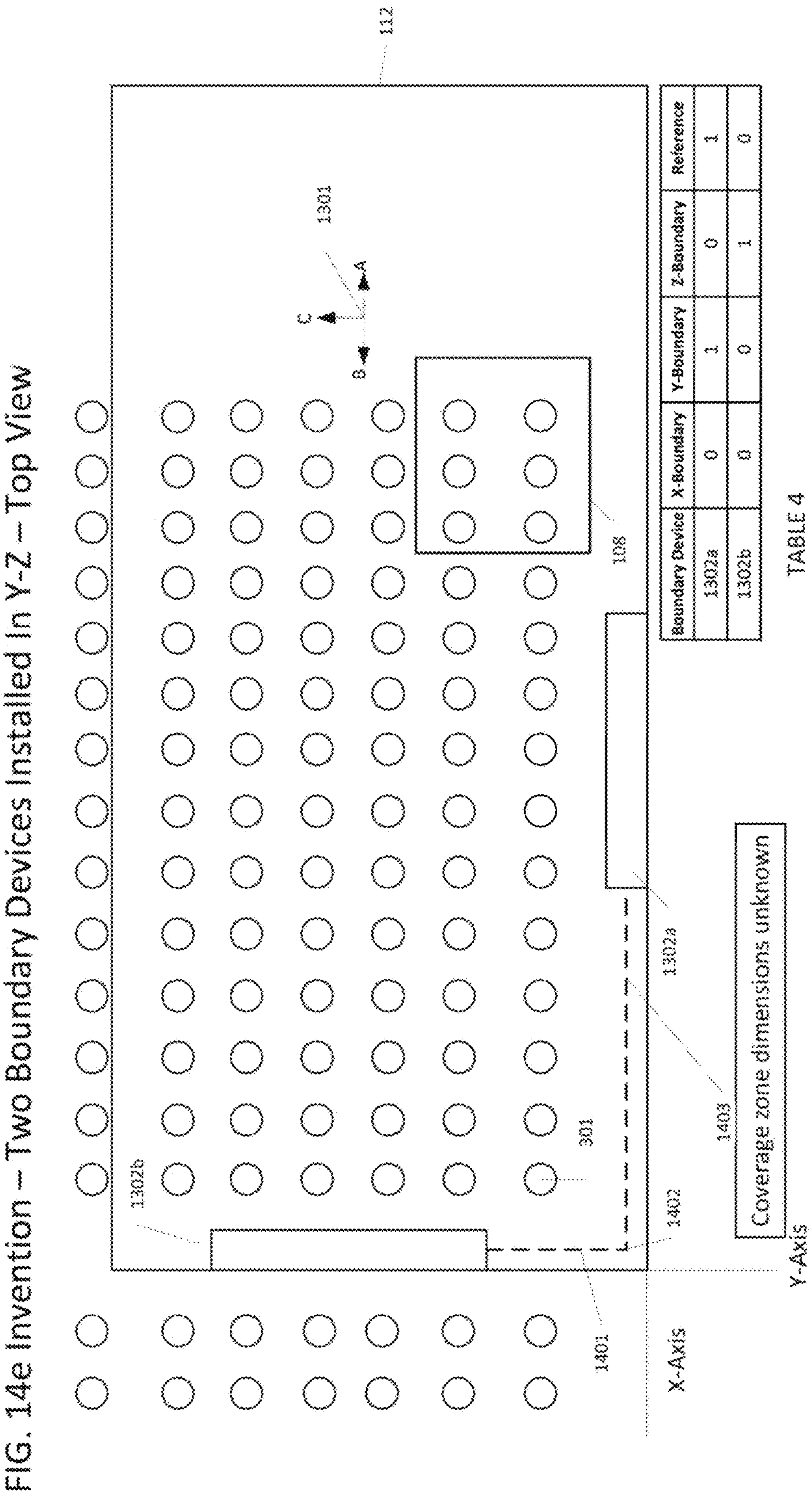
| Boundary Device | X-Boundary | Y-Boundary | Z-Boundary | Reference |
|---|---|---|---|---|
| 1302a | 0 | 1 | 0 | 1 |
| 1302b | 0 | 0 | 1 | 0 |
TABLE 4

FIG. 14f Invention – Two Boundary Devices Installed In Y-Z – Side View
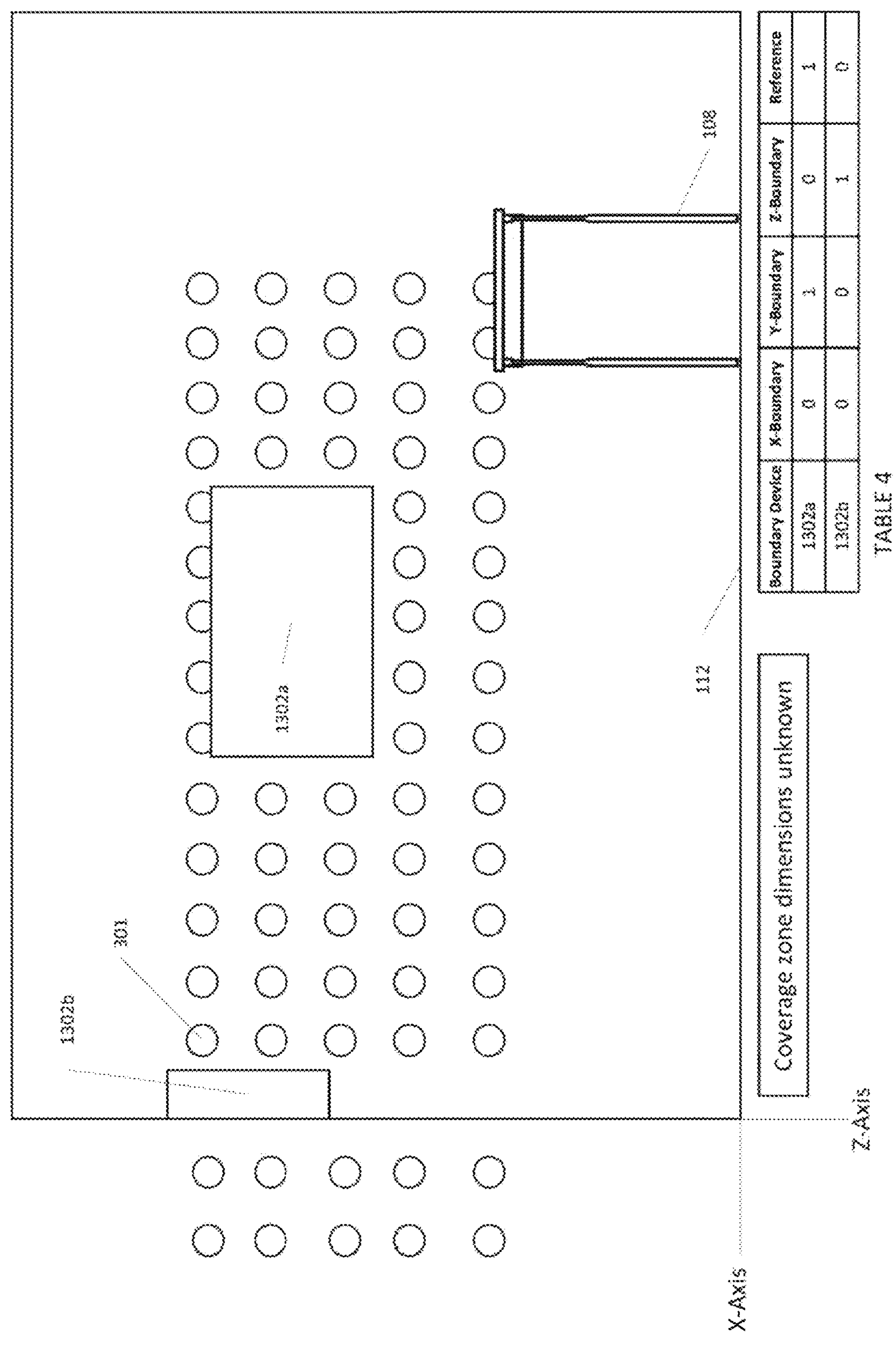
| Boundary Device | X-Boundary | Y-Boundary | Z-Boundary | Reference |
|---|---|---|---|---|
| 1302a | 0 | 1 | 0 | 1 |
| 1302b | 0 | 0 | 1 | 0 |
TABLE 4

FIG. 15a Invention — Three-Boundary Devices Installed — Top View
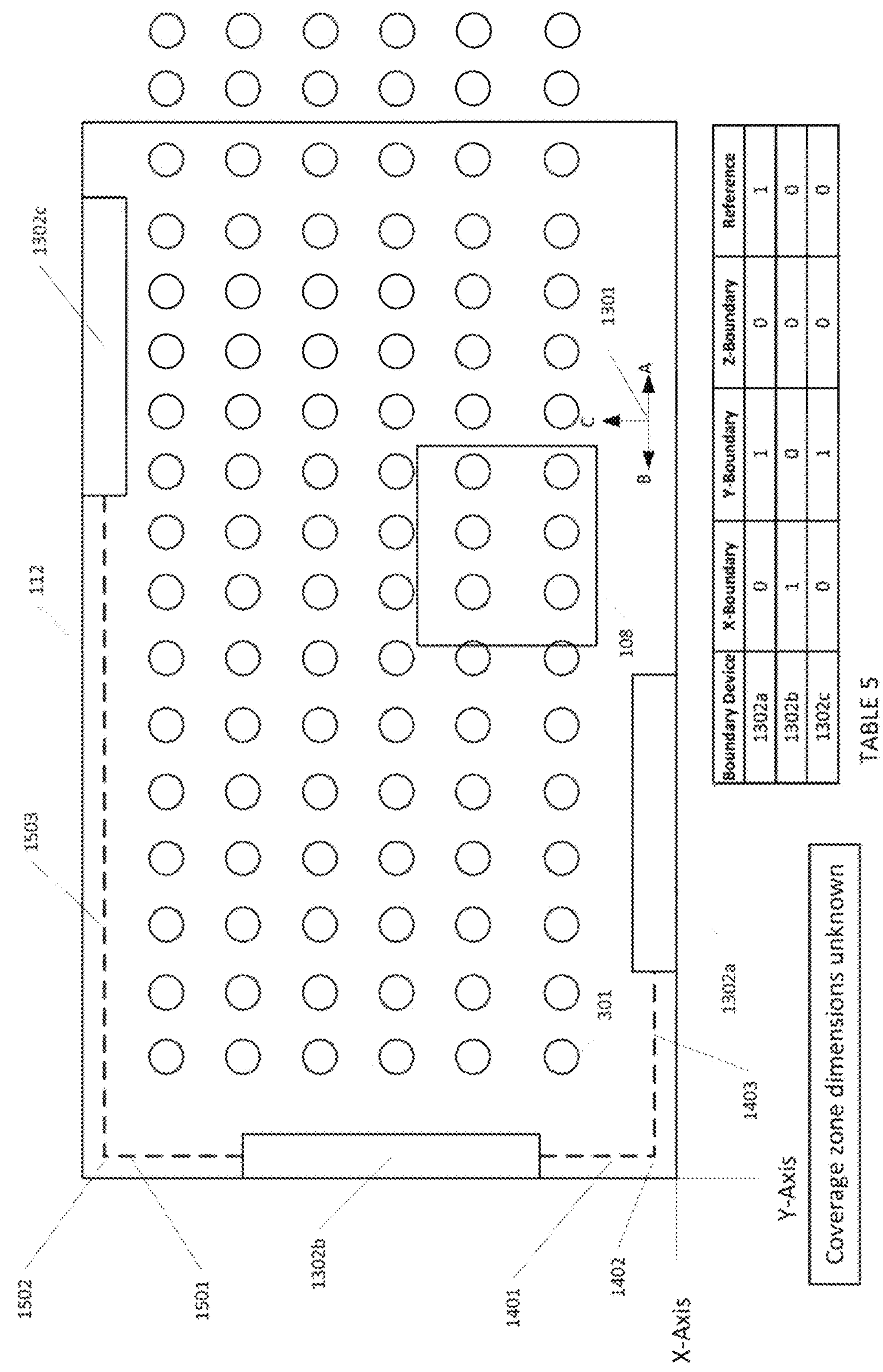
| Boundary Device | X-Boundary | Y-Boundary | Z-Boundary | Reference |
|---|---|---|---|---|
| 1302a | 0 | 1 | 0 | 1 |
| 1302b | 1 | 0 | 0 | 0 |
| 1302c | 0 | 1 | 0 | 0 |
TABLE 5

FIG. 15b Invention – Three Boundary Devices Installed– Side View
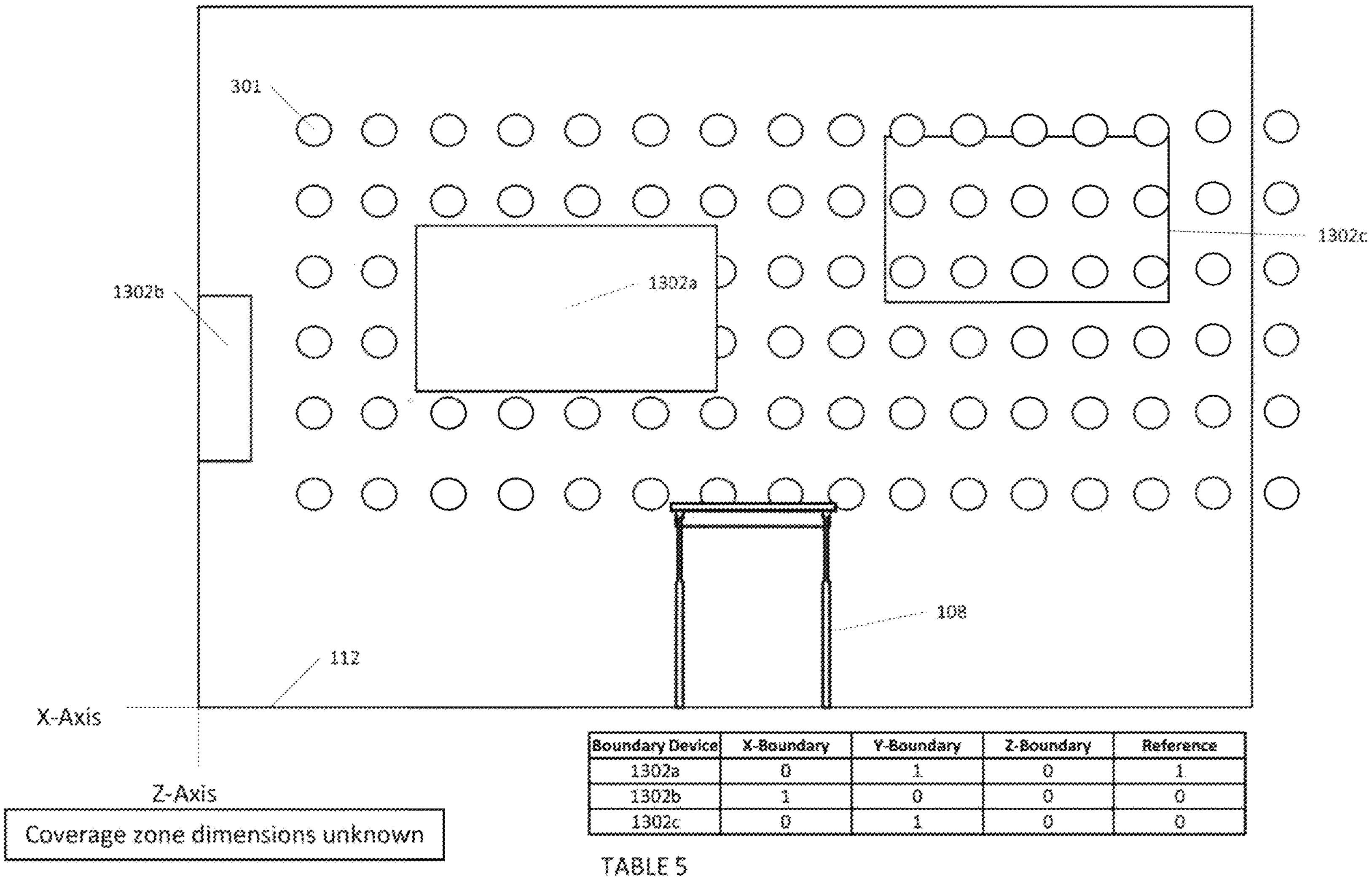
| Boundary Device | X-Boundary | Y-Boundary | Z-Boundary | Reference |
|---|---|---|---|---|
| 1302a | 0 | 1 | 0 | 1 |
| 1302b | 1 | 0 | 0 | 0 |
| 1302c | 0 | 1 | 0 | 0 |
TABLE 5

FIG. 15c Invention – Two Boundary Devices And One Multi-Boundary Device Installed – Top View
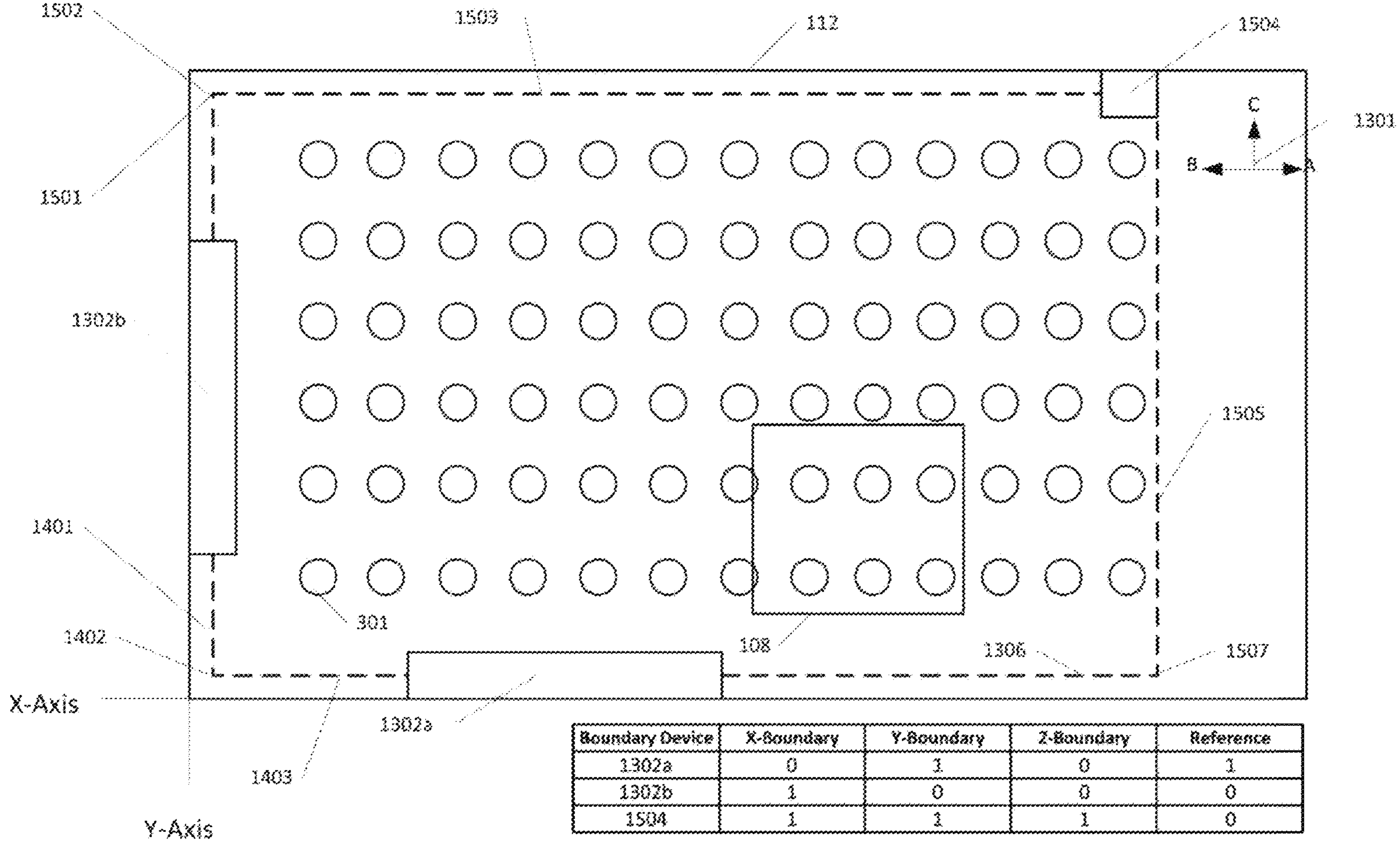
| Boundary Device | X-Boundary | Y-Boundary | Z-Boundary | Reference |
|---|---|---|---|---|
| 1302a | 0 | 1 | 0 | 1 |
| 1302b | 1 | 0 | 0 | 0 |
| 1504 | 1 | 1 | 1 | 0 |
TABLE 6
Coverage zone dimensions unknown FIG. 15d Invention – Two Boundary Devices And One Multi-Boundary Device Installed– Side View
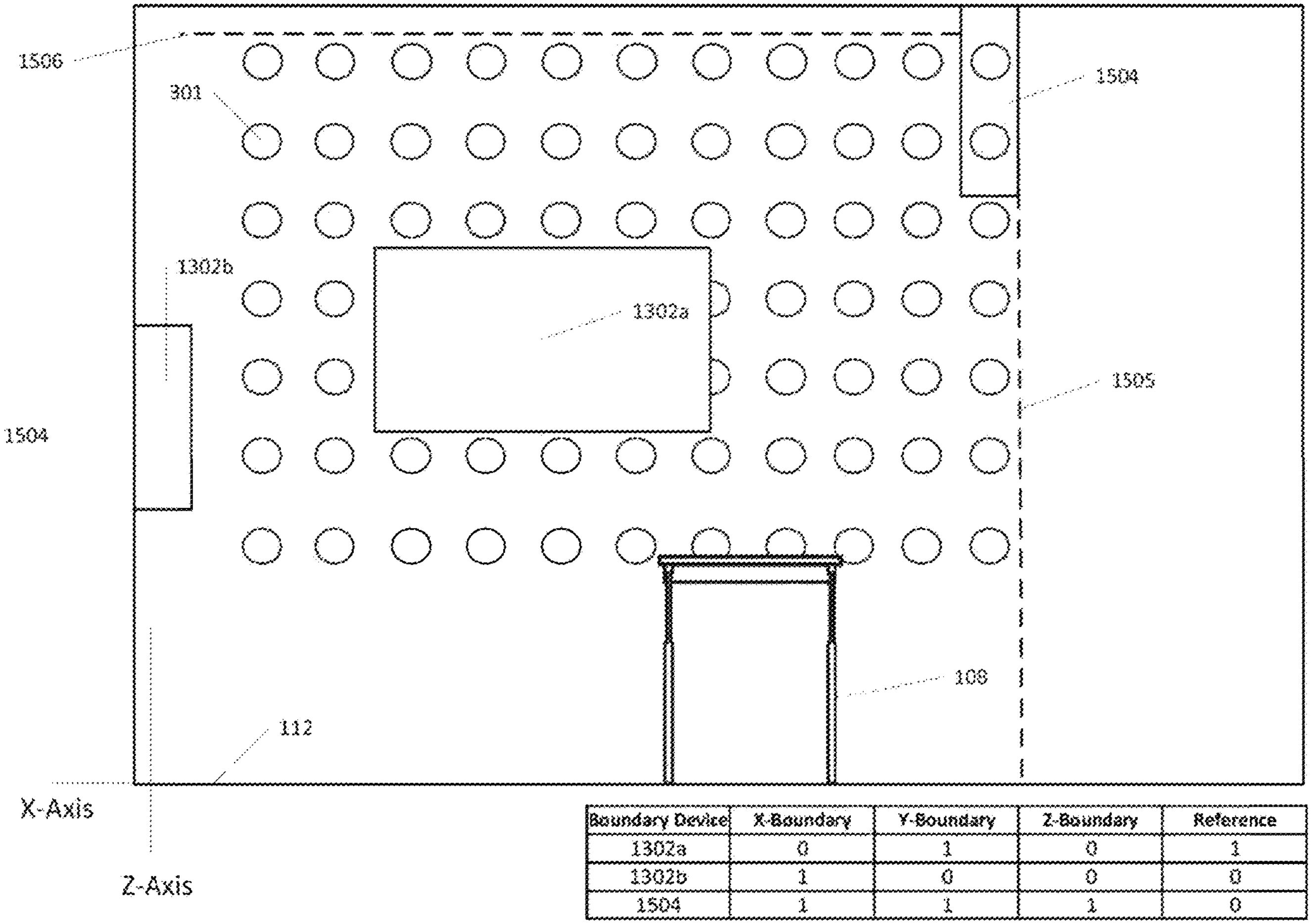
| Boundary Device | X-Boundary | Y-Boundary | Z-Boundary | Reference |
|---|---|---|---|---|
| 1302a | 0 | 1 | 0 | 1 |
| 1302b | 1 | 0 | 0 | 0 |
| 1504 | 1 | 1 | 1 | 0 |
TABLE 6
FIG. 15e Invention – Single Mic Multi-Boundary Device
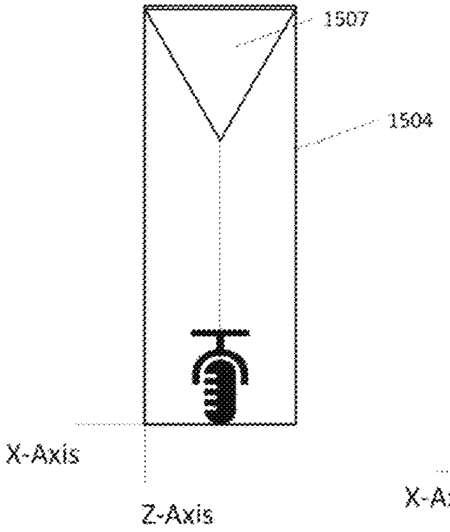
Coverage zone dimensions unknown FIG. 16a Invention – Four Boundary Devices Installed – Top View
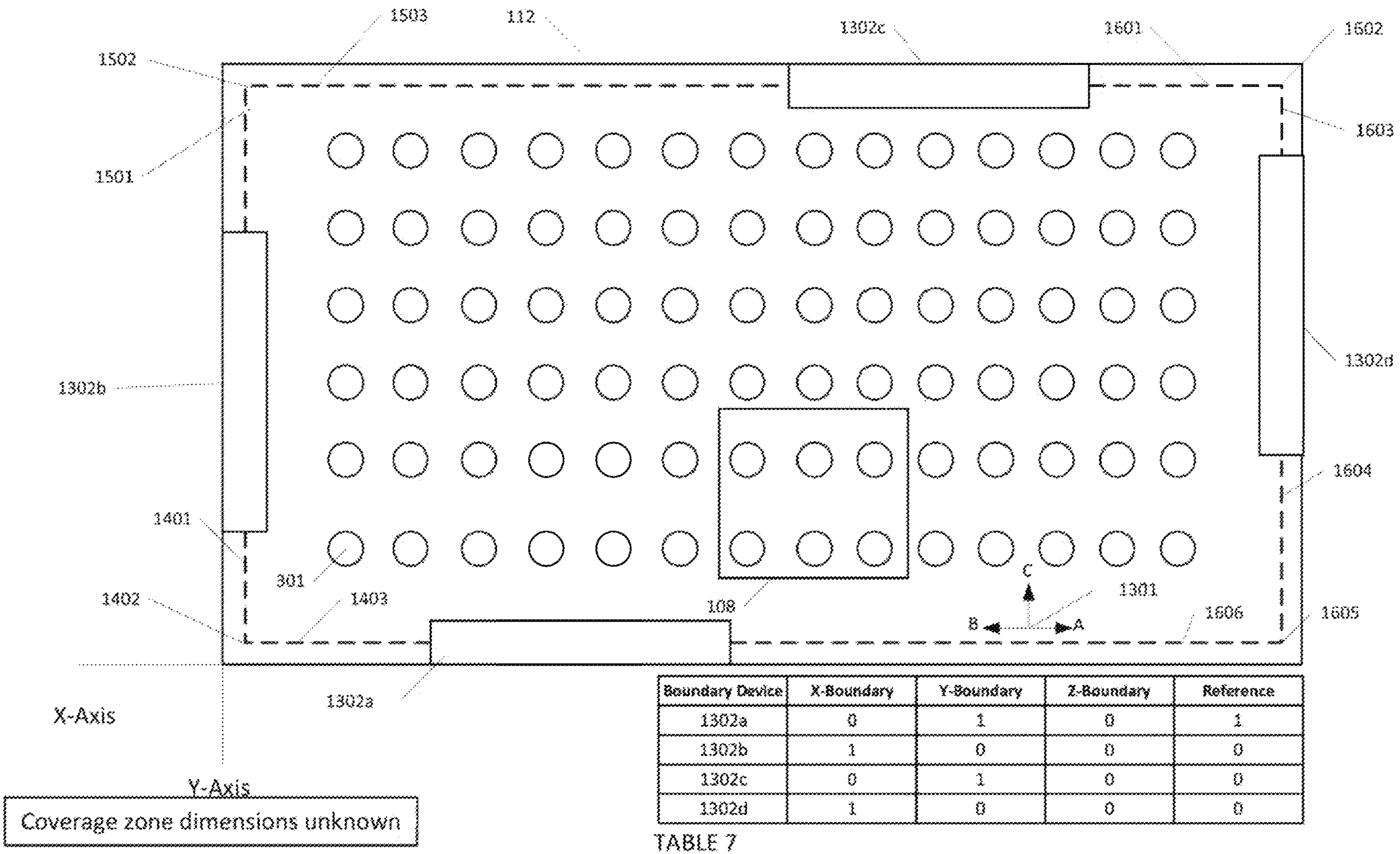
| Boundary Device | X-Boundary | Y-Boundary | Z-Boundary | Reference |
|---|---|---|---|---|
| 1302a | 0 | 1 | 0 | 1 |
| 1302b | 1 | 0 | 0 | 0 |
| 1302c | 0 | 1 | 0 | 0 |
| 1302d | 1 | 0 | 0 | 0 |
TABLE 7

FIG. 16b Invention – Four Boundary Devices Installed – Side View
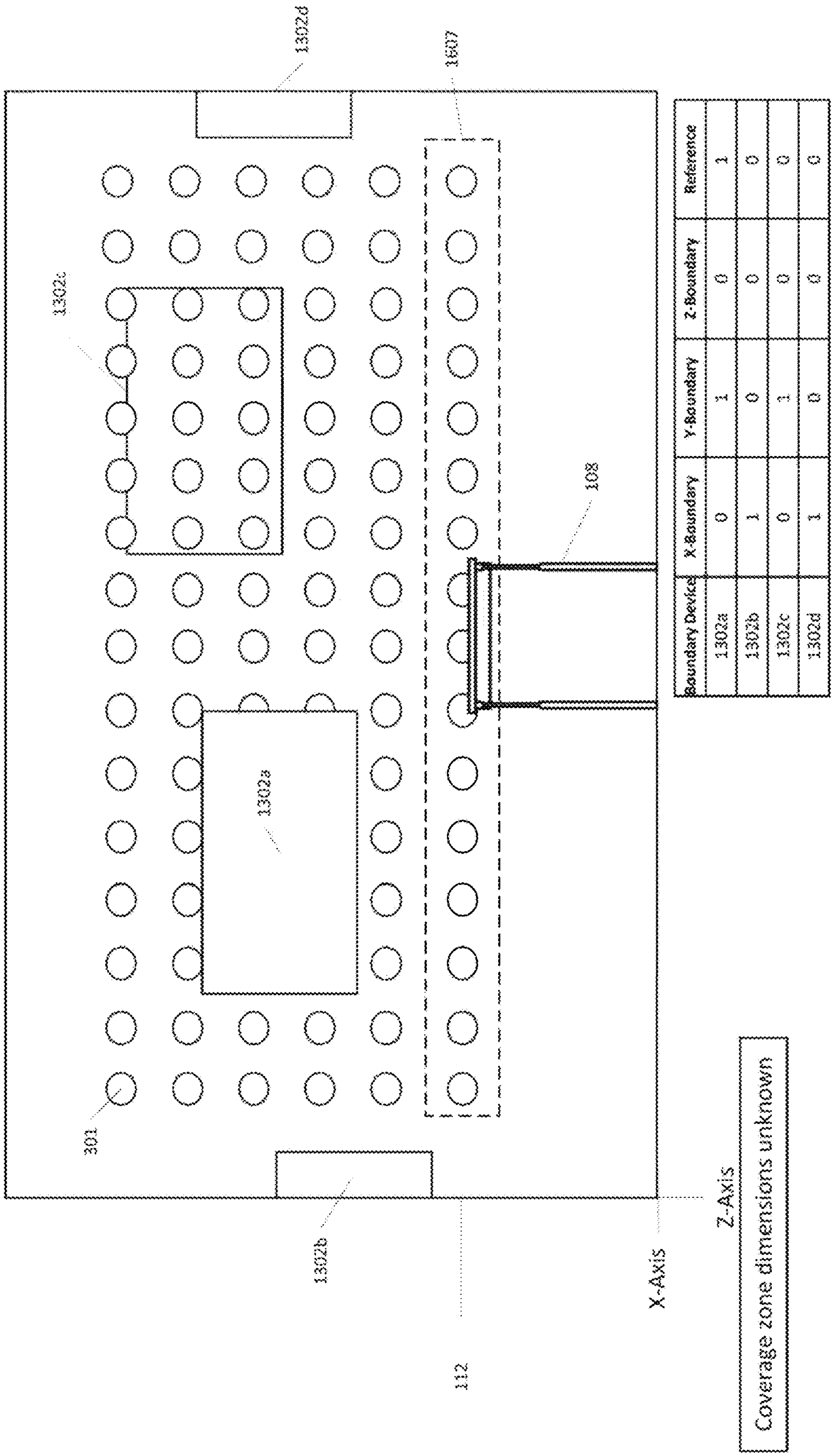
| Boundary Device | X-Boundary | Y-Boundary | Z-Boundary | Reference |
|---|---|---|---|---|
| 1302a | 0 | 1 | 0 | 1 |
| 1302b | 1 | 0 | 0 | 0 |
| 1302c | 0 | 1 | 0 | 0 |
| 1302d | 1 | 0 | 0 | 0 |
TABLE 7
Coverage zone dimensions unknown FIG. 17a Invention – Five Boundary Devices Installed With Ceiling Mics – Top View
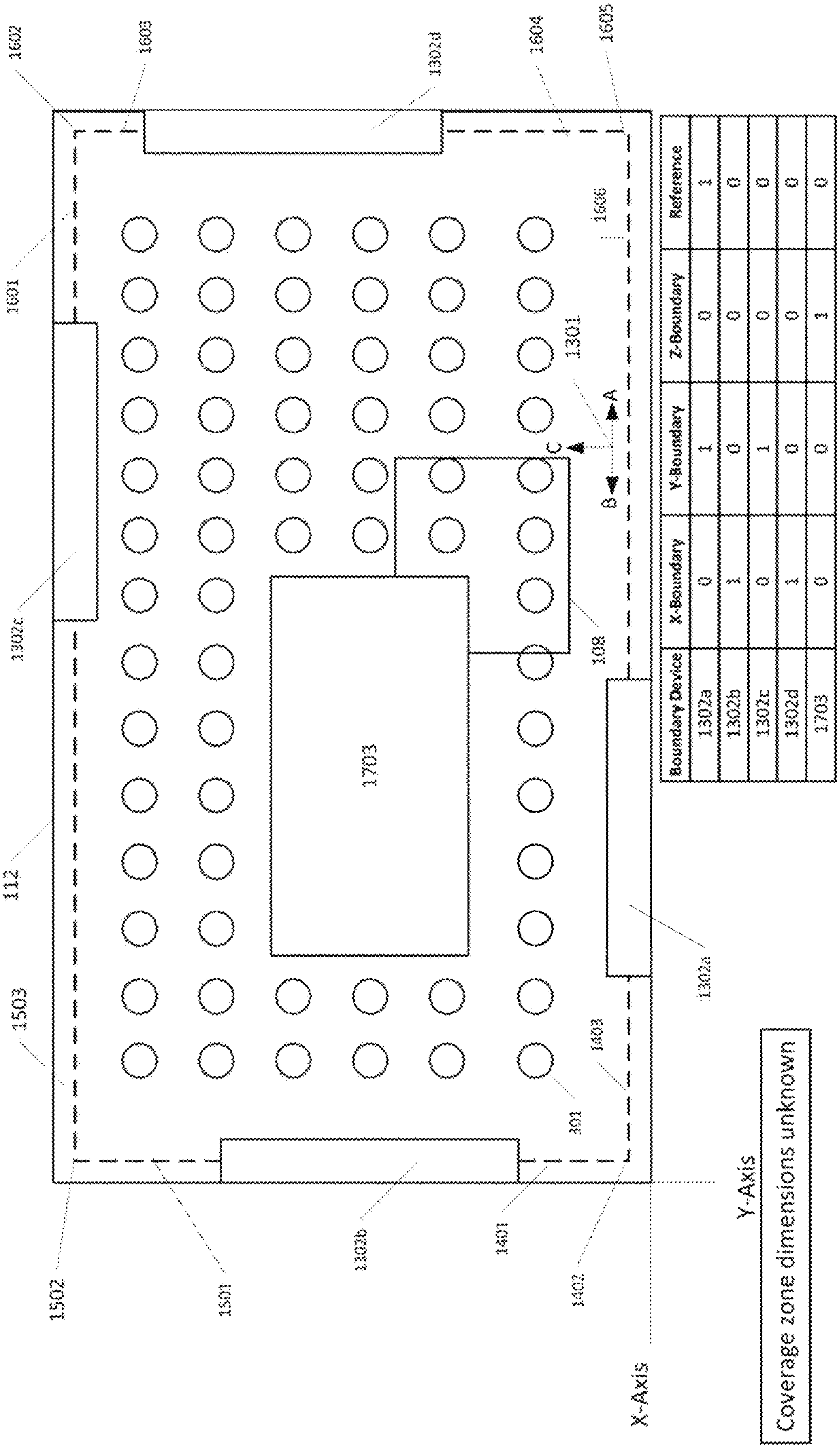
| Boundary Device | X-Boundary | Y-Boundary | Z-Boundary | Reference |
|---|---|---|---|---|
| 1302a | 0 | 1 | 0 | 1 |
| 1302b | 1 | 0 | 0 | 0 |
| 1302c | 0 | 1 | 0 | 0 |
| 1302d | 1 | 0 | 0 | 0 |
| 1703 | 0 | 0 | 1 | 0 |
TABLE 8

FIG. 17b Invention – Five Boundary Devices Installed With Ceiling Mics – Side View
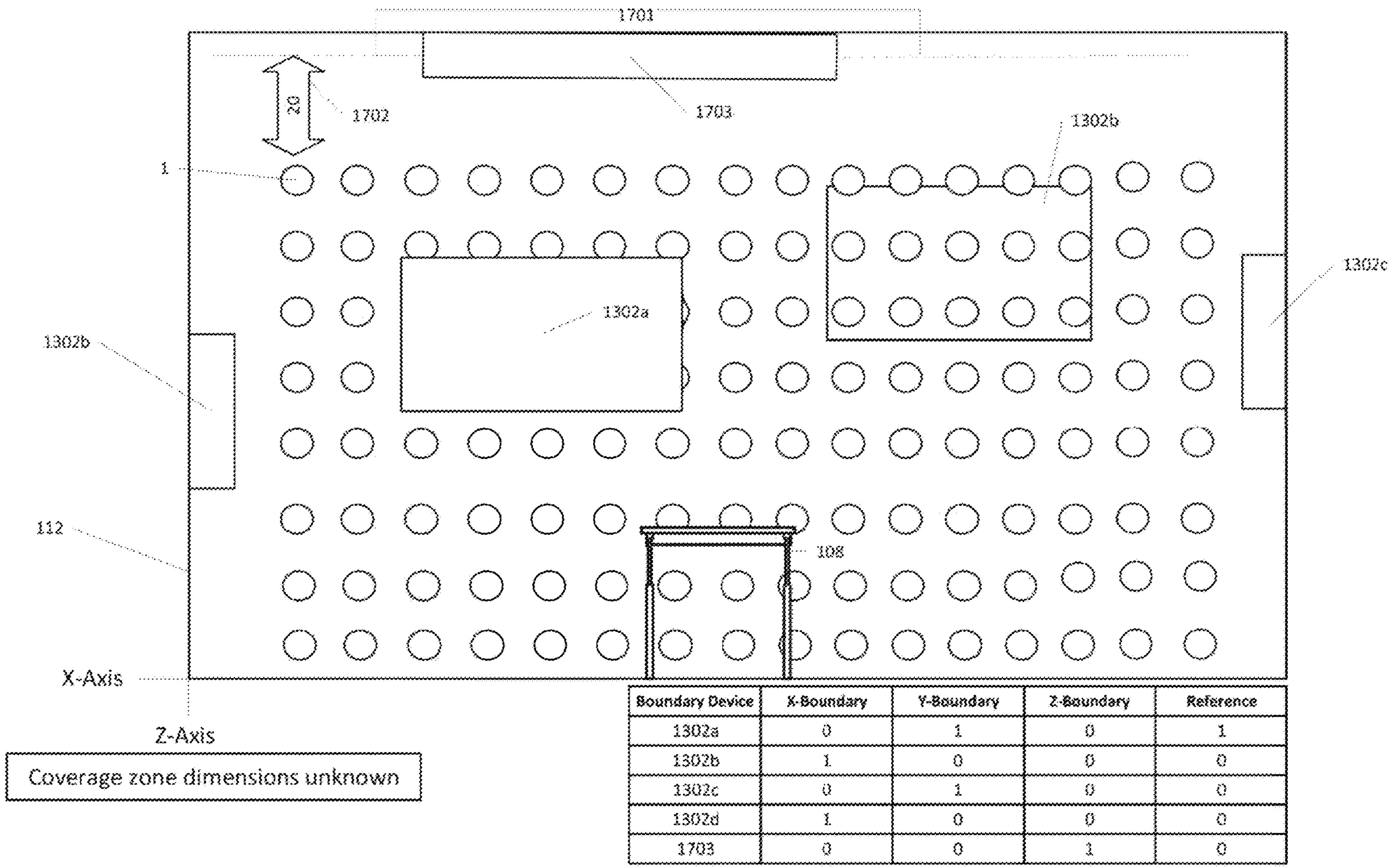
| Boundary Device | X-Boundary | Y-Boundary | Z-Boundary | Reference |
|---|---|---|---|---|
| 1302a | 0 | 1 | 0 | 1 |
| 1302b | 1 | 0 | 0 | 0 |
| 1302c | 0 | 1 | 0 | 0 |
| 1302d | 1 | 0 | 0 | 0 |
| 1703 | 0 | 0 | 1 | 0 |
TABLE 8

FIG. 18a Invention – Five Boundary Devices Installed With Table-Top Mic – Top View
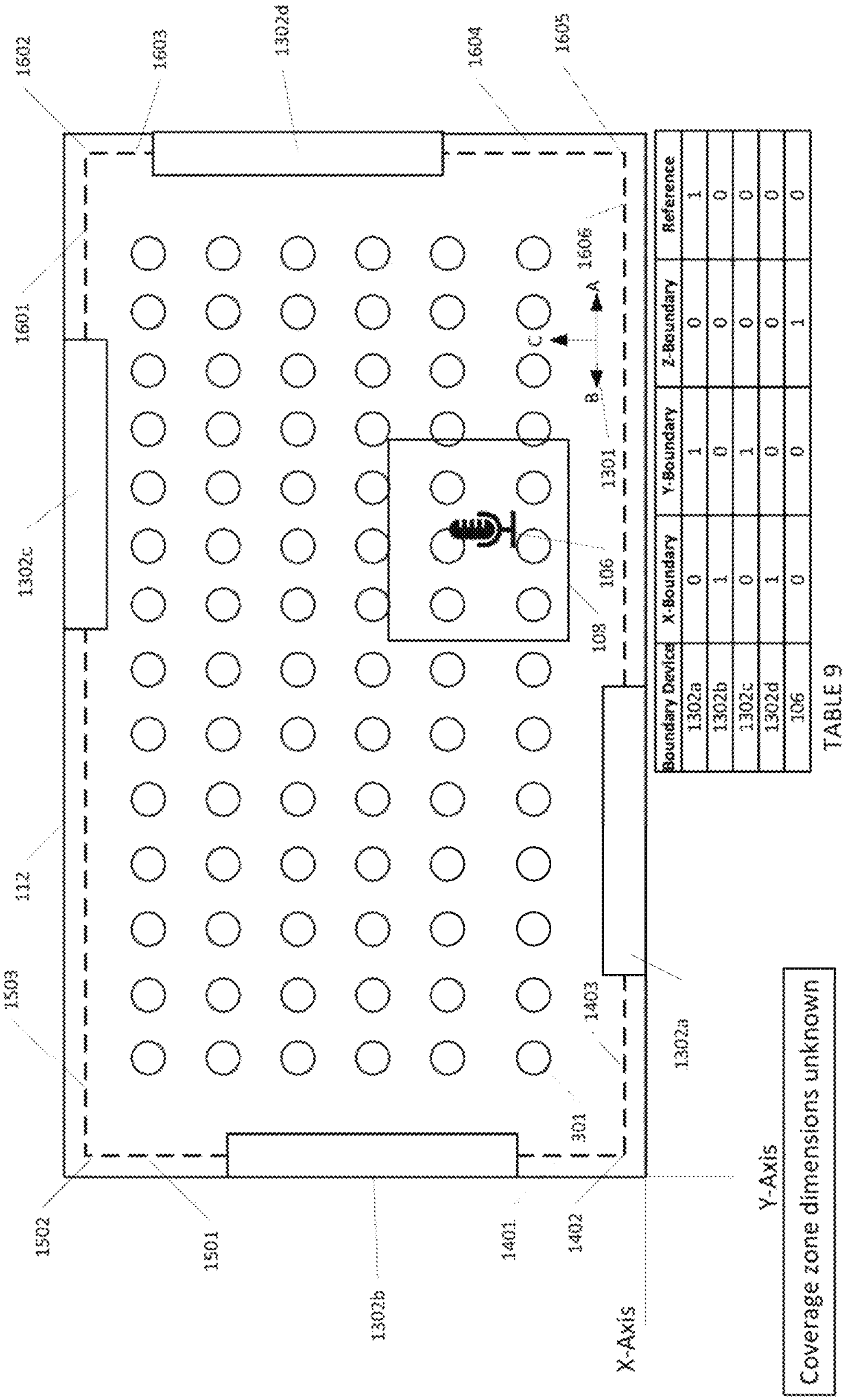
| Boundary Device | X-Boundary | Y-Boundary | Z-Boundary | Reference |
|---|---|---|---|---|
| 1302a | 0 | 1 | 0 | 1 |
| 1302b | 1 | 0 | 0 | 0 |
| 1302c | 0 | 1 | 0 | 0 |
| 1302d | 1 | 0 | 0 | 0 |
| 106 | 0 | 0 | 1 | 0 |
TABLE 9

FIG. 18b Invention – Five Boundary Devices Installed With Table-Top Mic – Side View
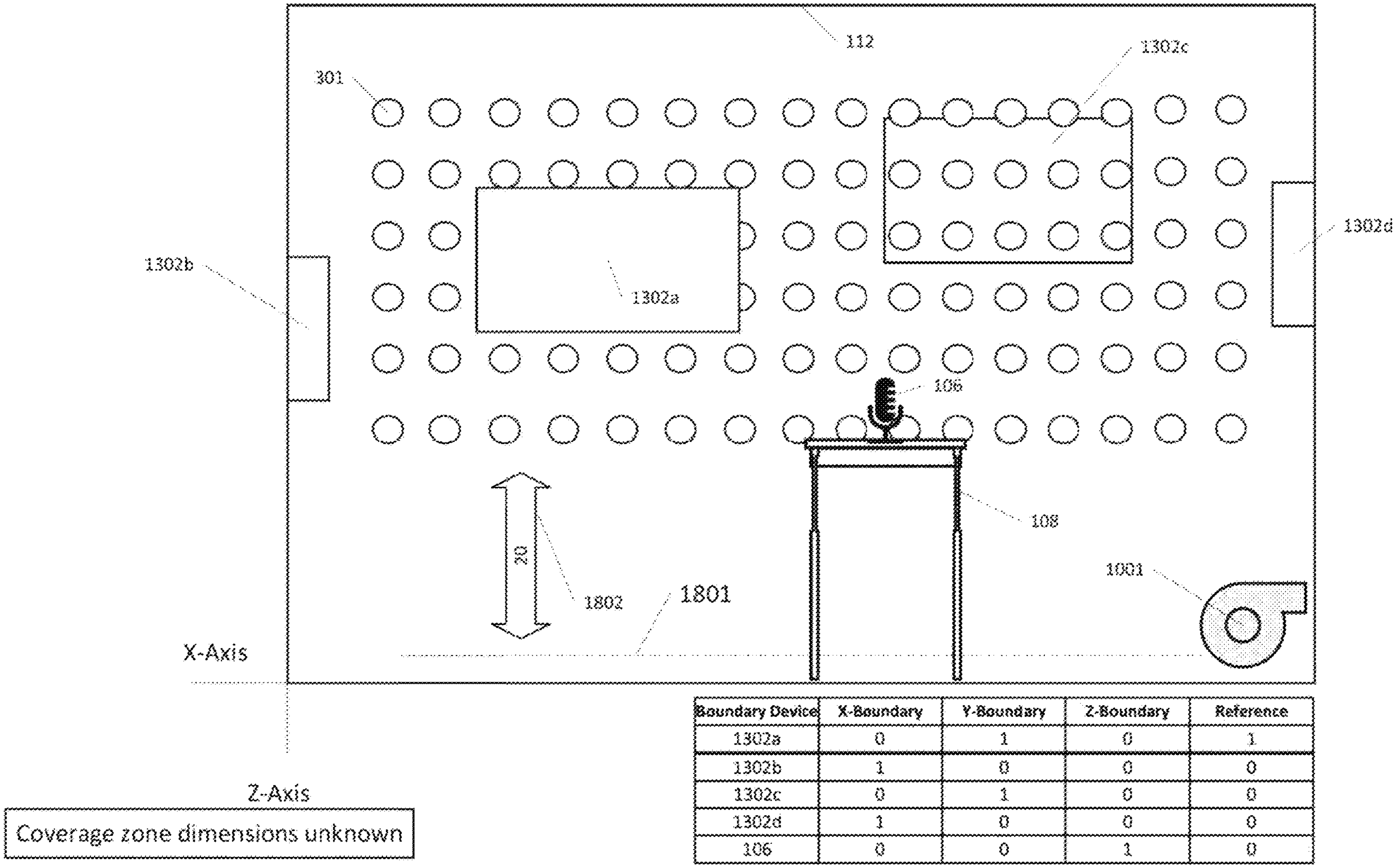
| Boundary Device | X-Boundary | Y-Boundary | Z-Boundary | Reference |
|---|---|---|---|---|
| 1302a | 0 | 1 | 0 | 1 |
| 1302b | 1 | 0 | 0 | 0 |
| 1302c | 0 | 1 | 0 | 0 |
| 1302d | 1 | 0 | 0 | 0 |
| 106 | 0 | 0 | 1 | 0 |
TABLE 9

FIG. 19a Invention – Six Boundary Devices Installed – Top View
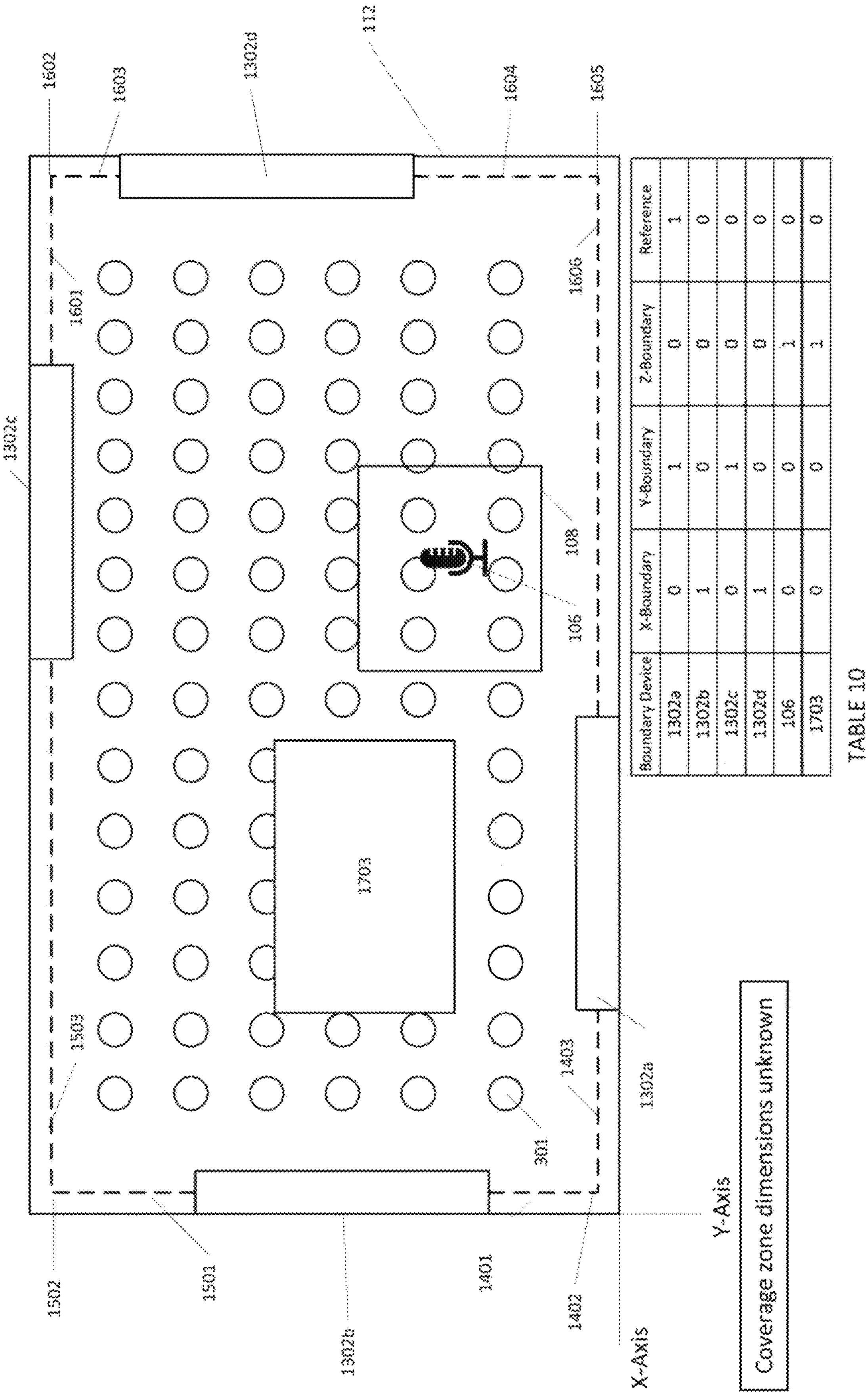
| Boundary Device | X-Boundary | Y-Boundary | Z-Boundary | Reference |
|---|---|---|---|---|
| 1302a | 0 | 1 | 0 | 1 |
| 1302b | 1 | 0 | 0 | 0 |
| 1302c | 0 | 1 | 0 | 0 |
| 1302d | 1 | 0 | 0 | 0 |
| 106 | 0 | 0 | 1 | 0 |
| 1703 | 0 | 0 | 1 | 0 |
TABLE 10

FIG. 19b Invention – Six Boundary Devices Installed– Side View
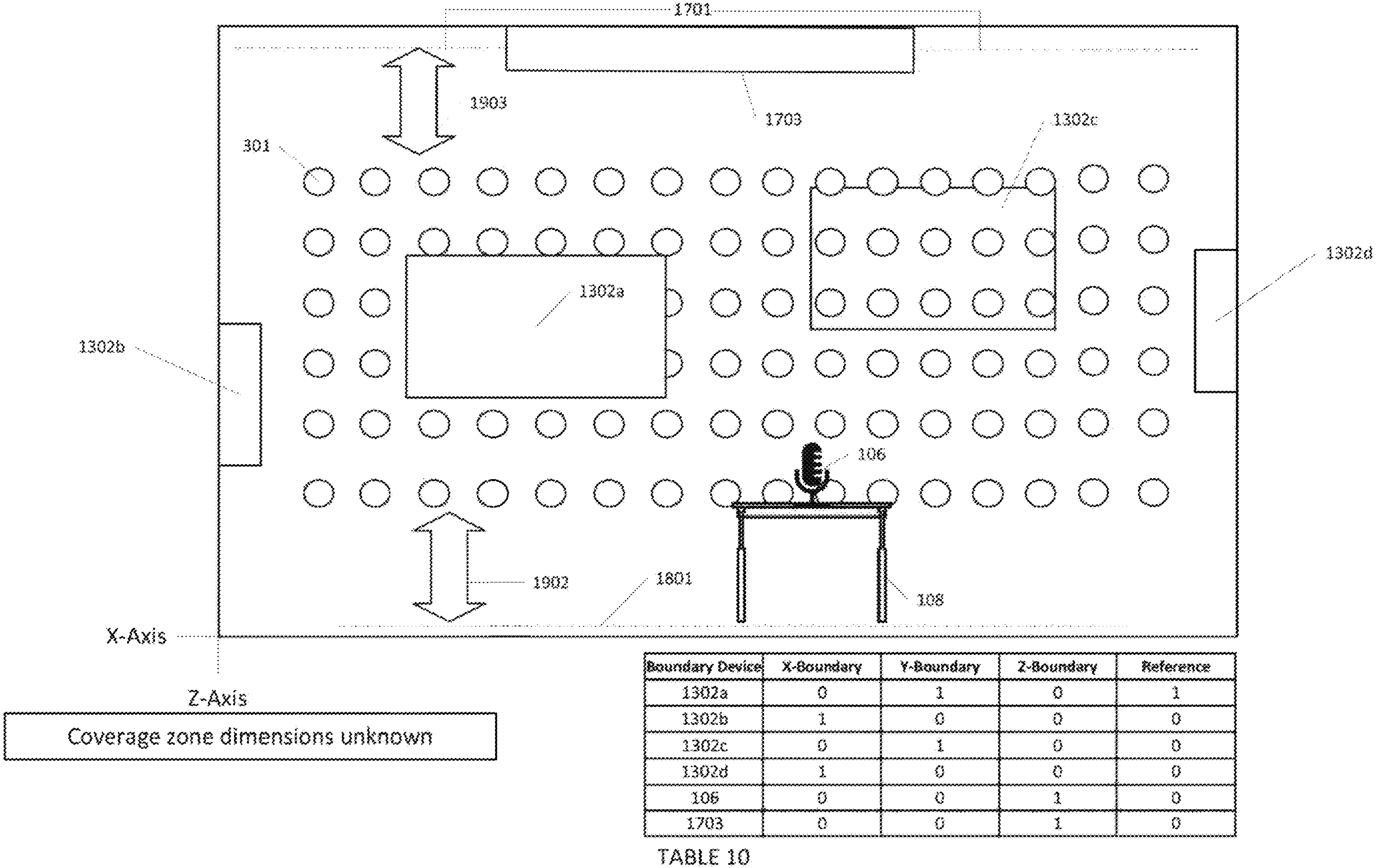
| Boundary Device | X-Boundary | Y-Boundary | Z-Boundary | Reference |
|---|---|---|---|---|
| 1302a | 0 | 1 | 0 | 1 |
| 1302b | 1 | 0 | 0 | 0 |
| 1302c | 0 | 1 | 0 | 0 |
| 1302d | 1 | 0 | 0 | 0 |
| 106 | 0 | 0 | 1 | 0 |
| 1703 | 0 | 0 | 1 | 0 |
TABLE 10

FIG. 20a Invention – Known Coverage Zone Dimensions With One Device Installed - Top View
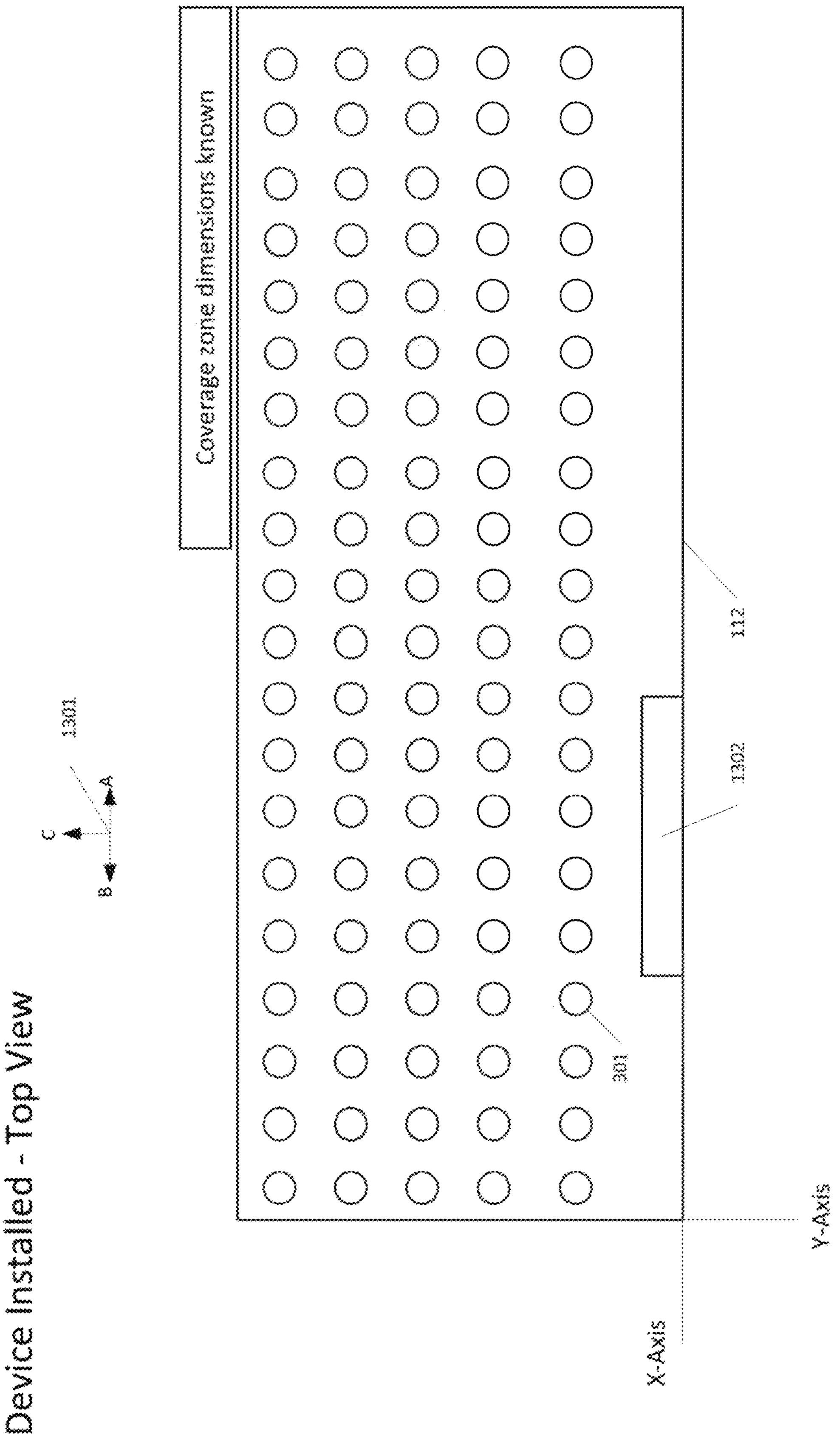

FIG. 20b Invention – Known Coverage Zone Dimensions With Two Devices Installed – Top View
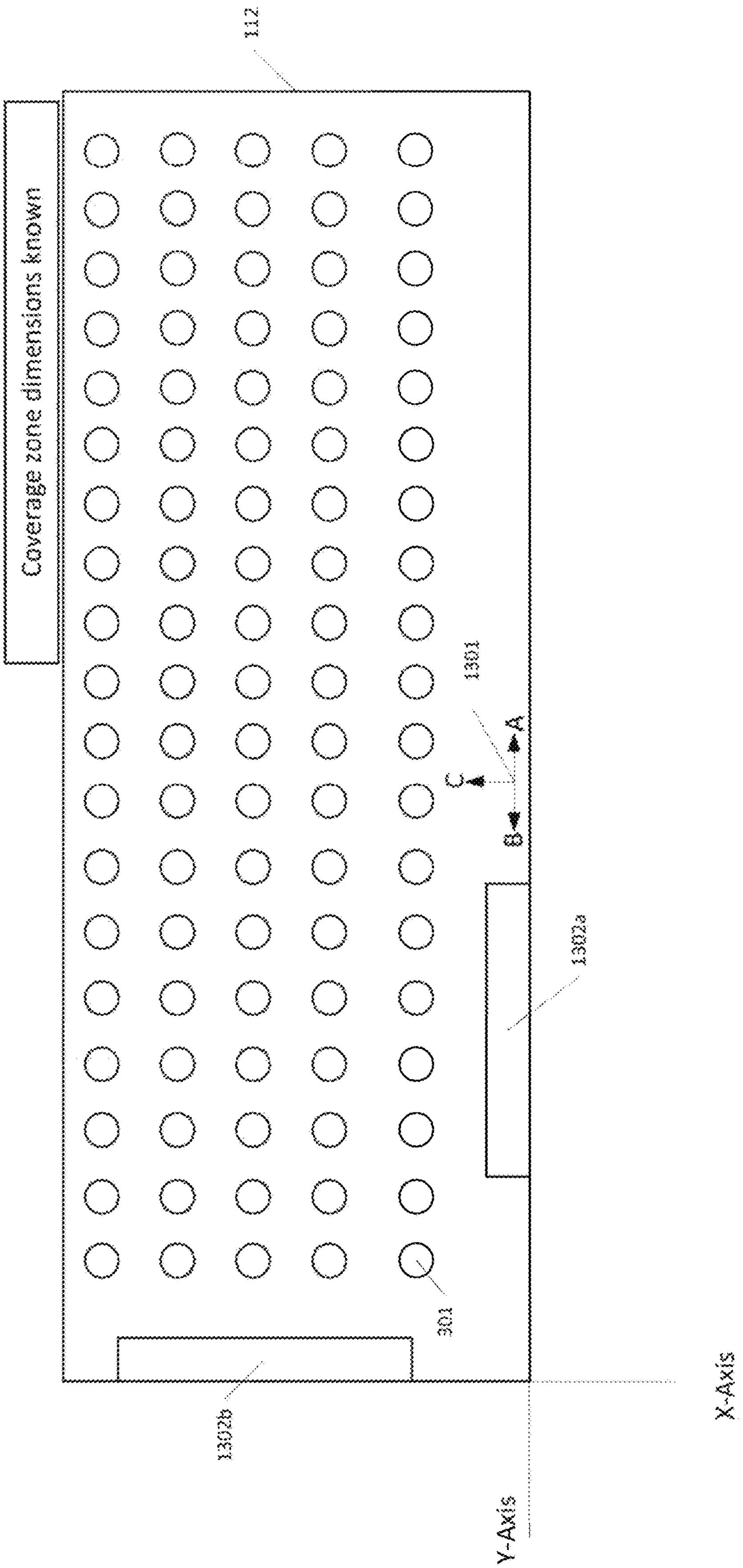

FIG. 20c Invention – Known Coverage Zone Dimensions With Three Devices Installed – Top View
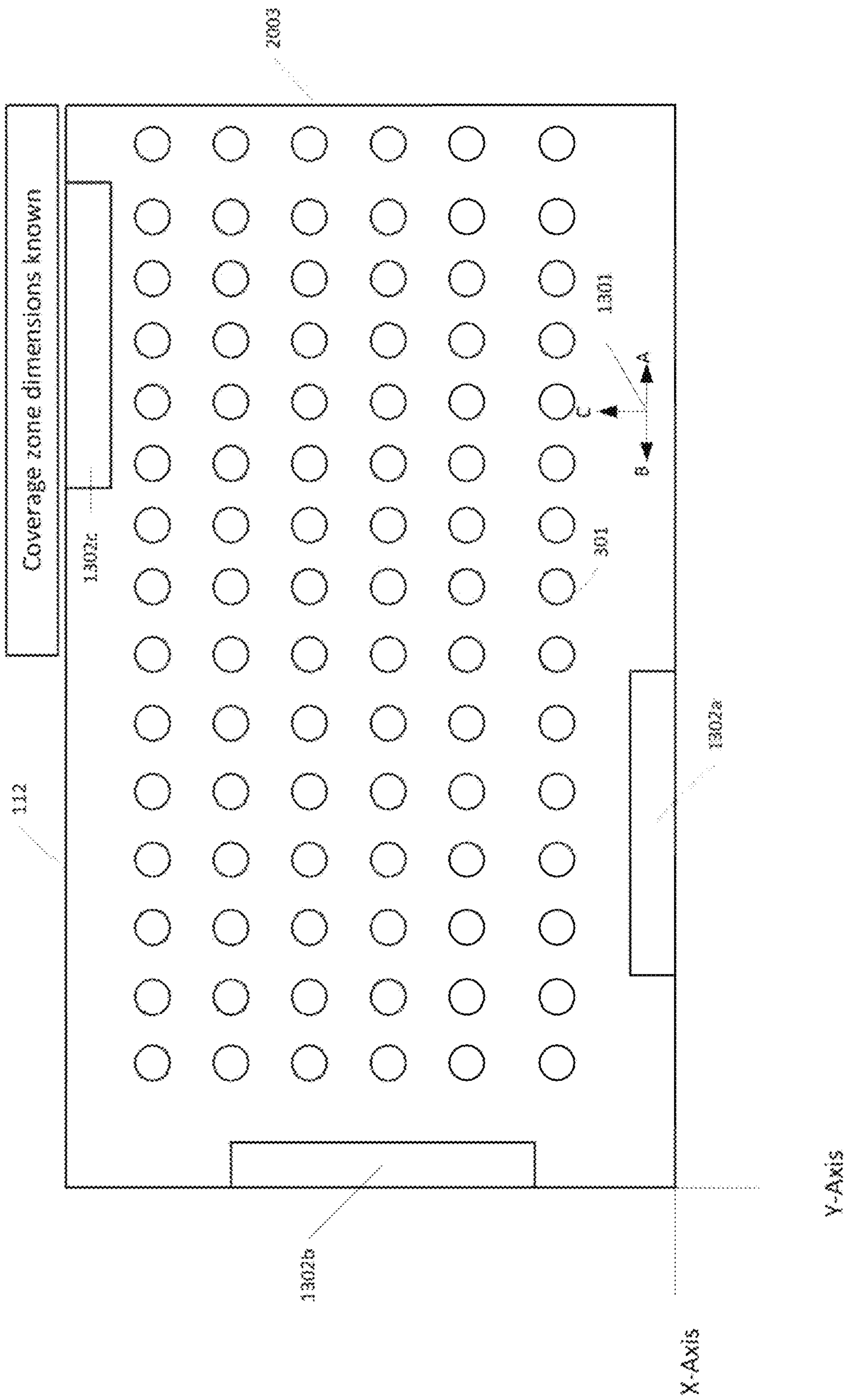

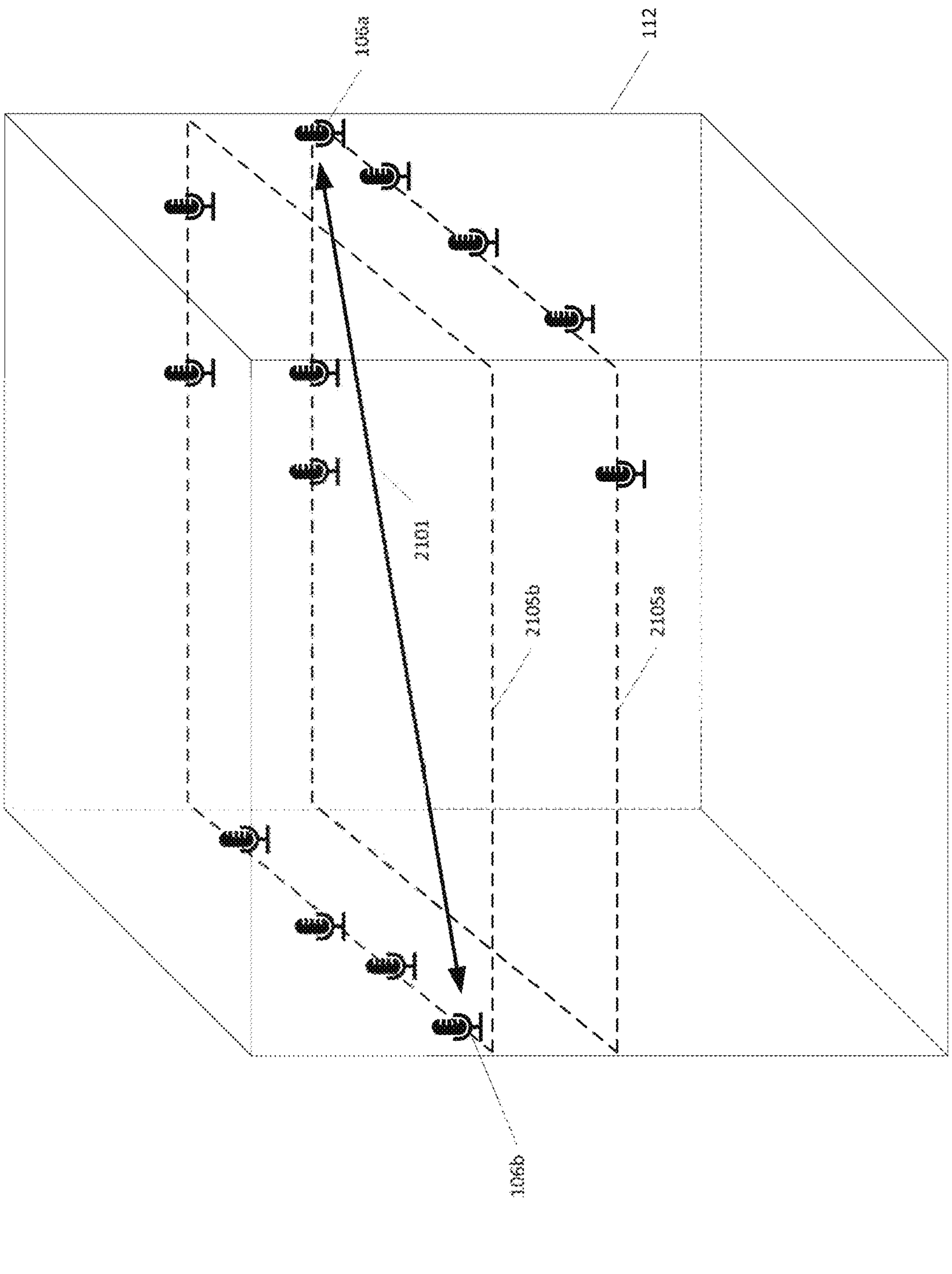
FIG. 21a Invention – Maximum Distance in 3-Dimensions

FIG. 21b Invention – Maximum Distance in 2-Dimensions
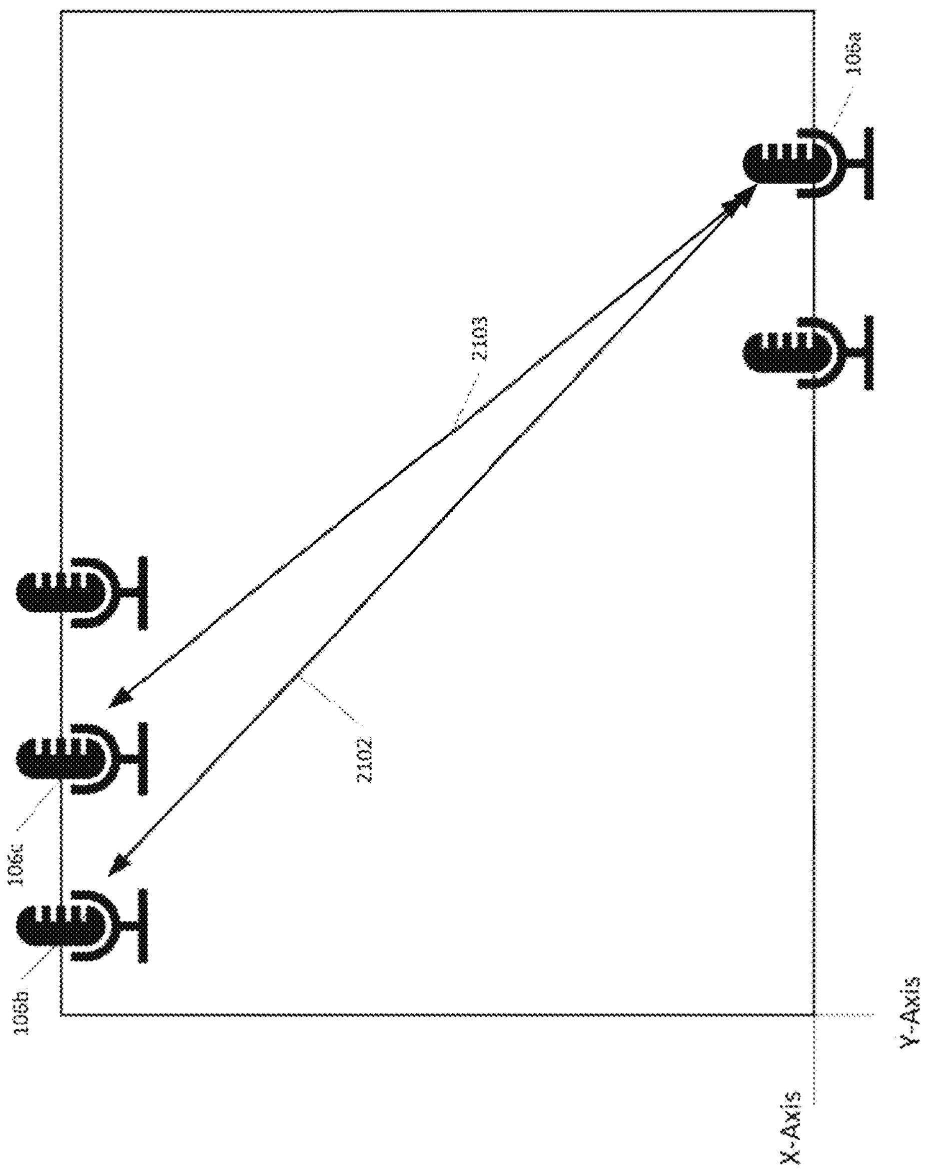

FIG. 21c Invention – Maximum Distance with Removed Mics
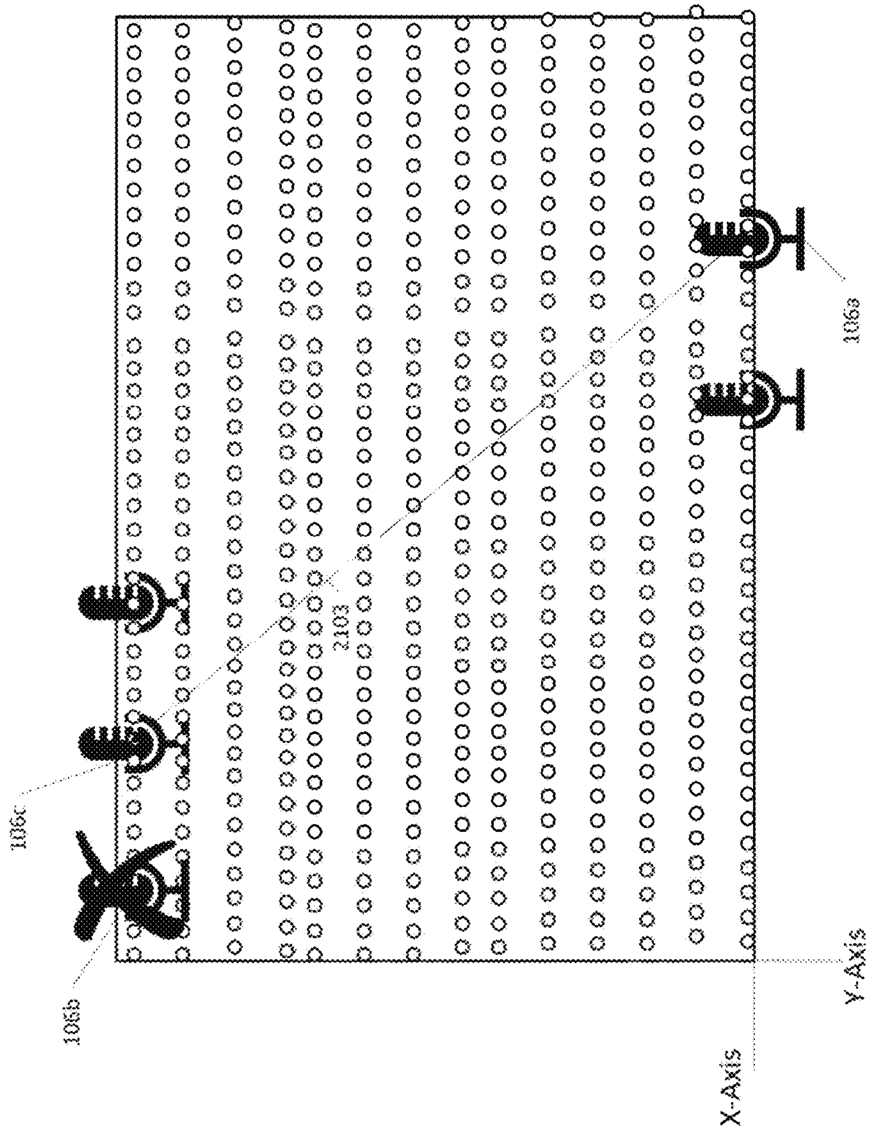

FIG. 21d Invention – Maximum Distance with Reduced Bubble Map
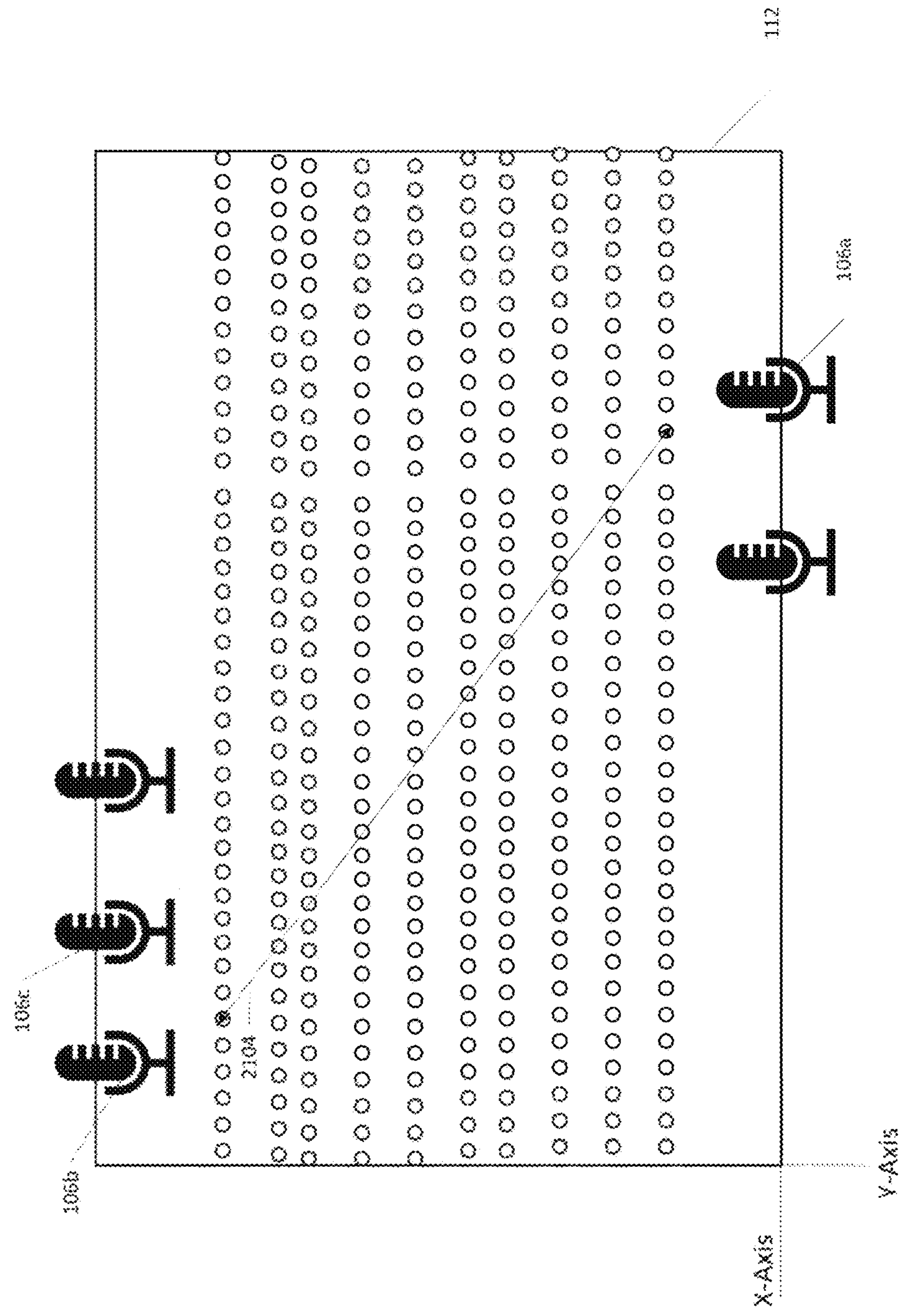

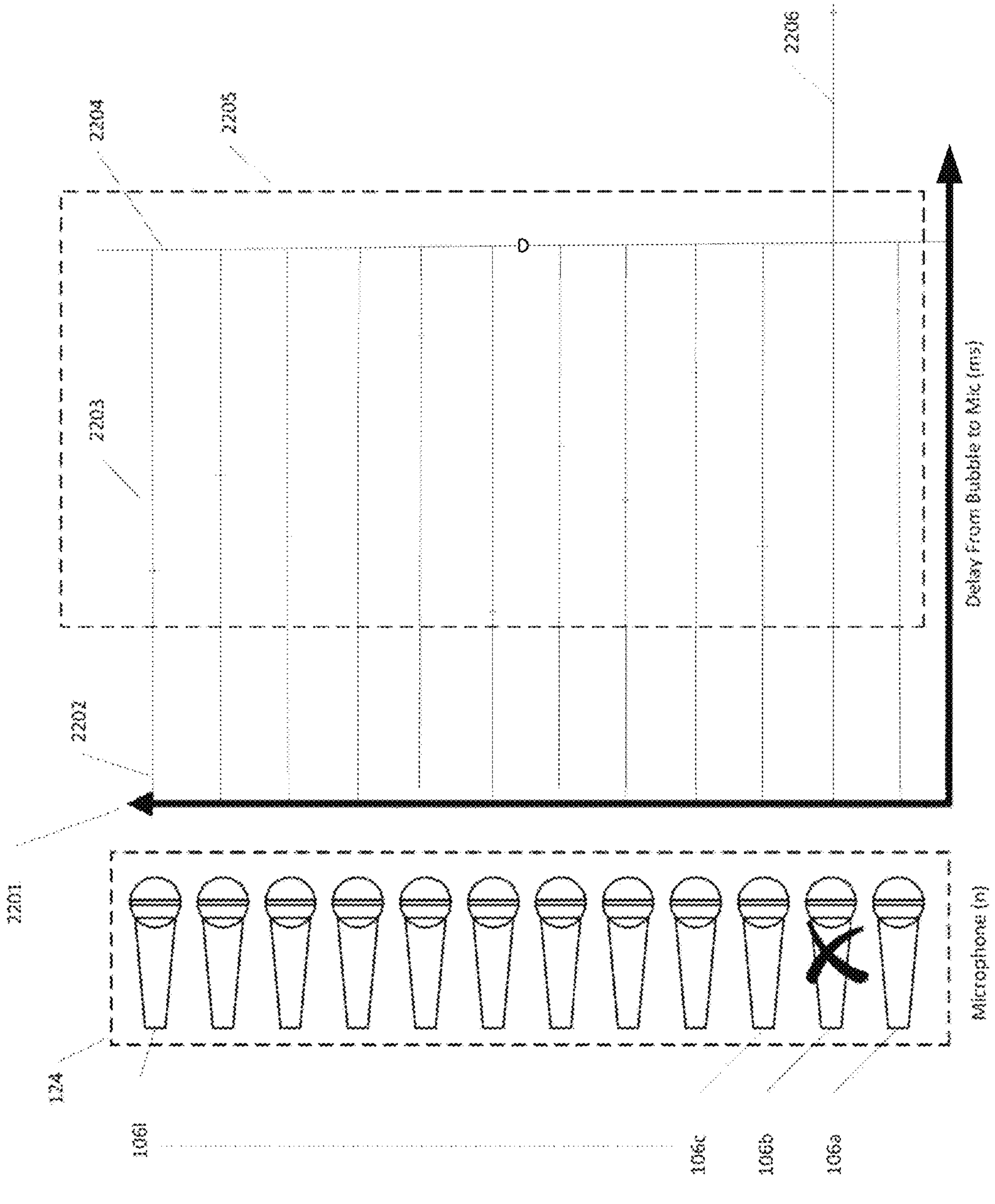
FIG 22 – Removing a Mic from the Microphone Delay Table

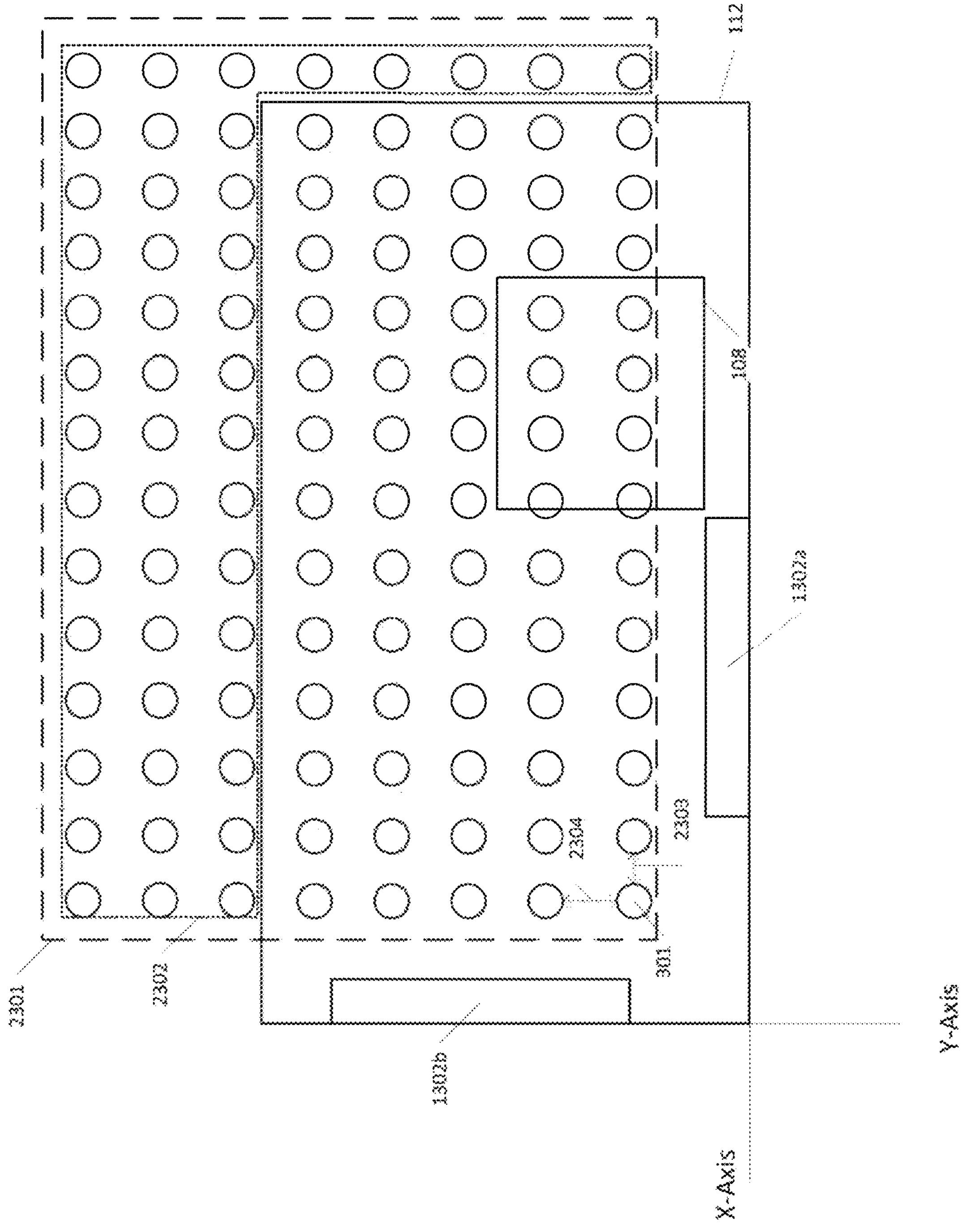
FIG. 23a – Two Boundary Devices With Extra X-Y Bubbles – Top View

FIG. 23b – Two Boundary Devices With Extra X-Y Bubbles – Side View
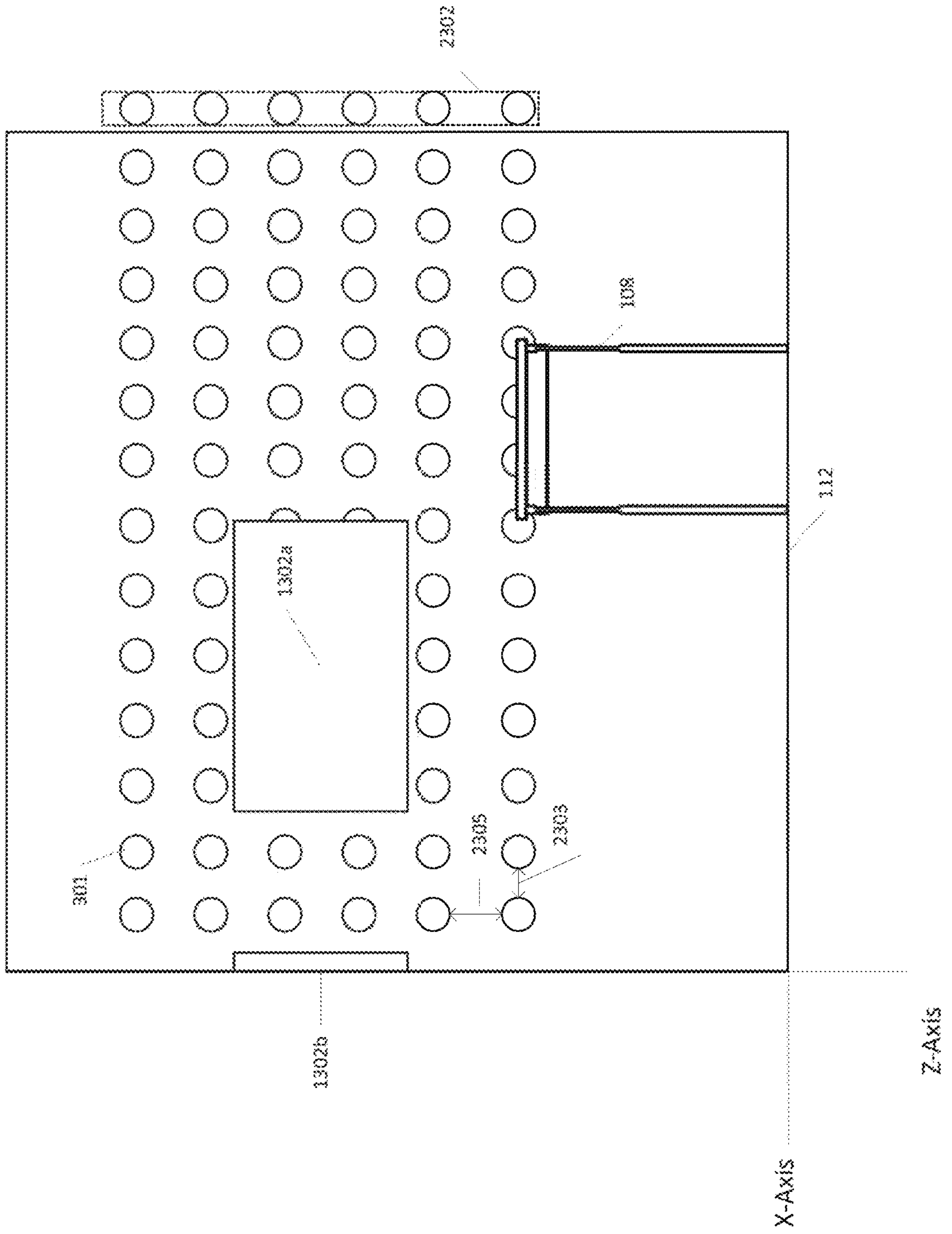

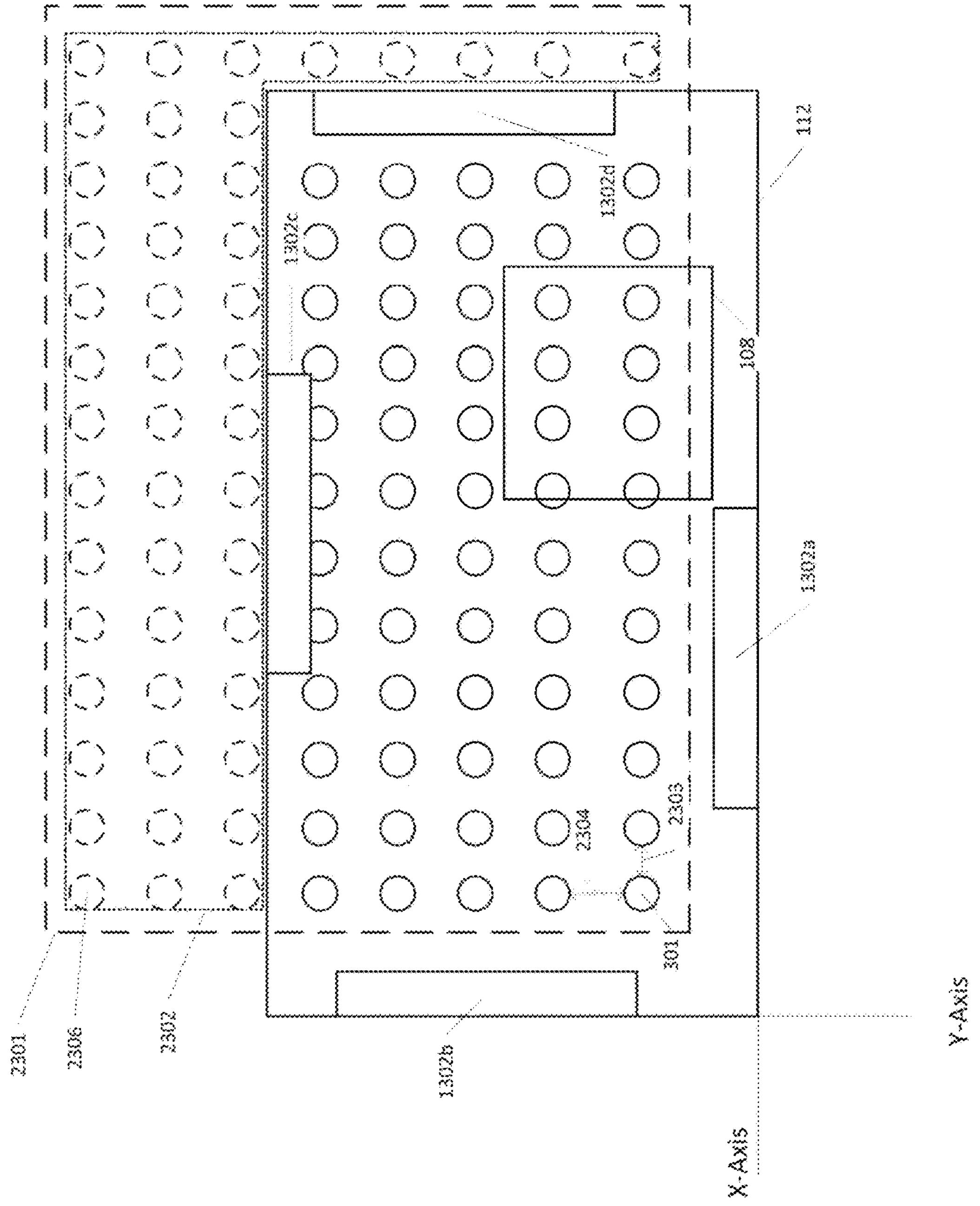
FIG. 23c – Four Boundary Devices With Extra X-Y Bubbles Replaced – Top View FIG. 23d — Four Boundary Devices With Extra X-Y Bubbles Replaced — Side View
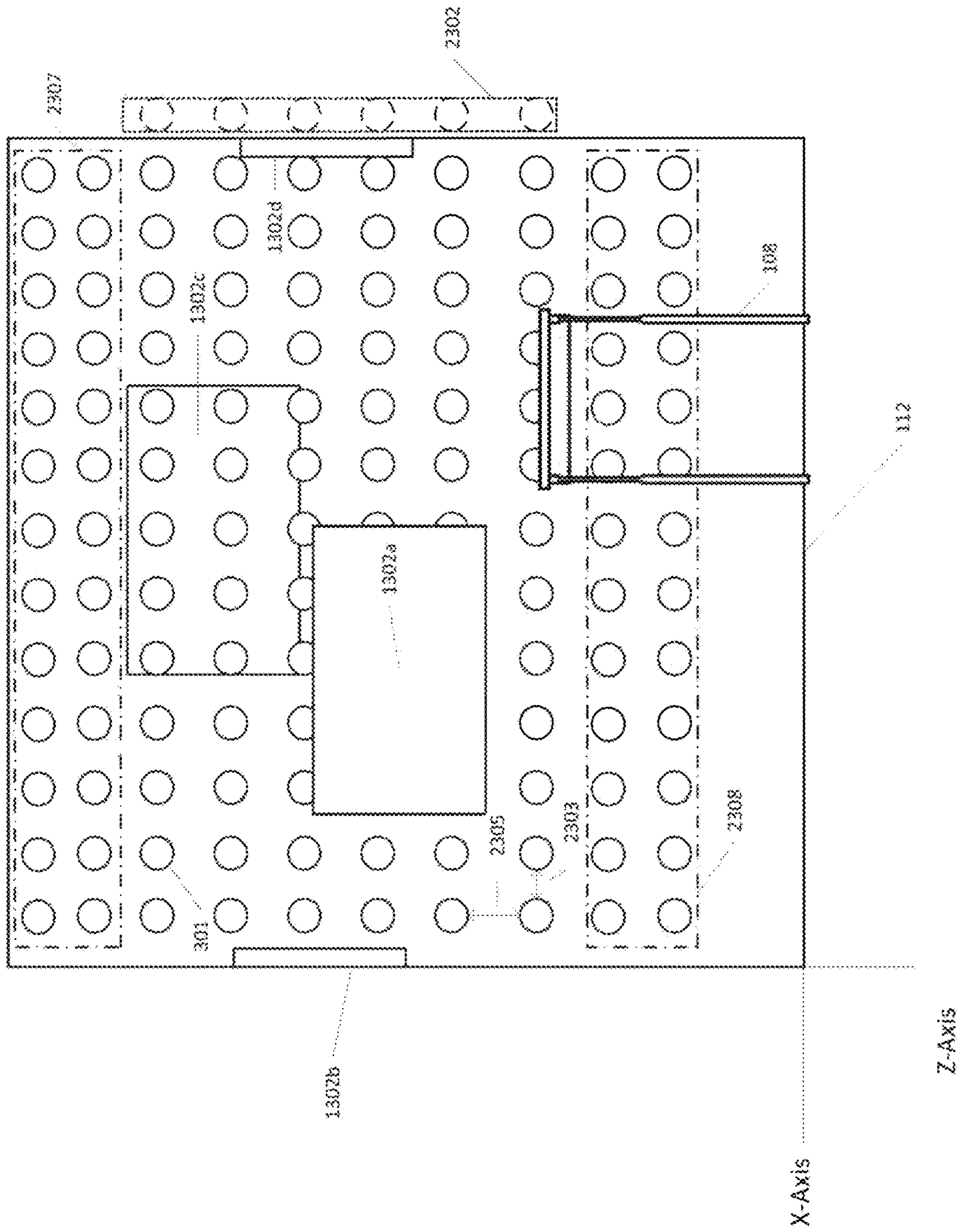

FIG. 23e – Four Boundary Devices With Extra X-Y Bubbles Condensed – Top View
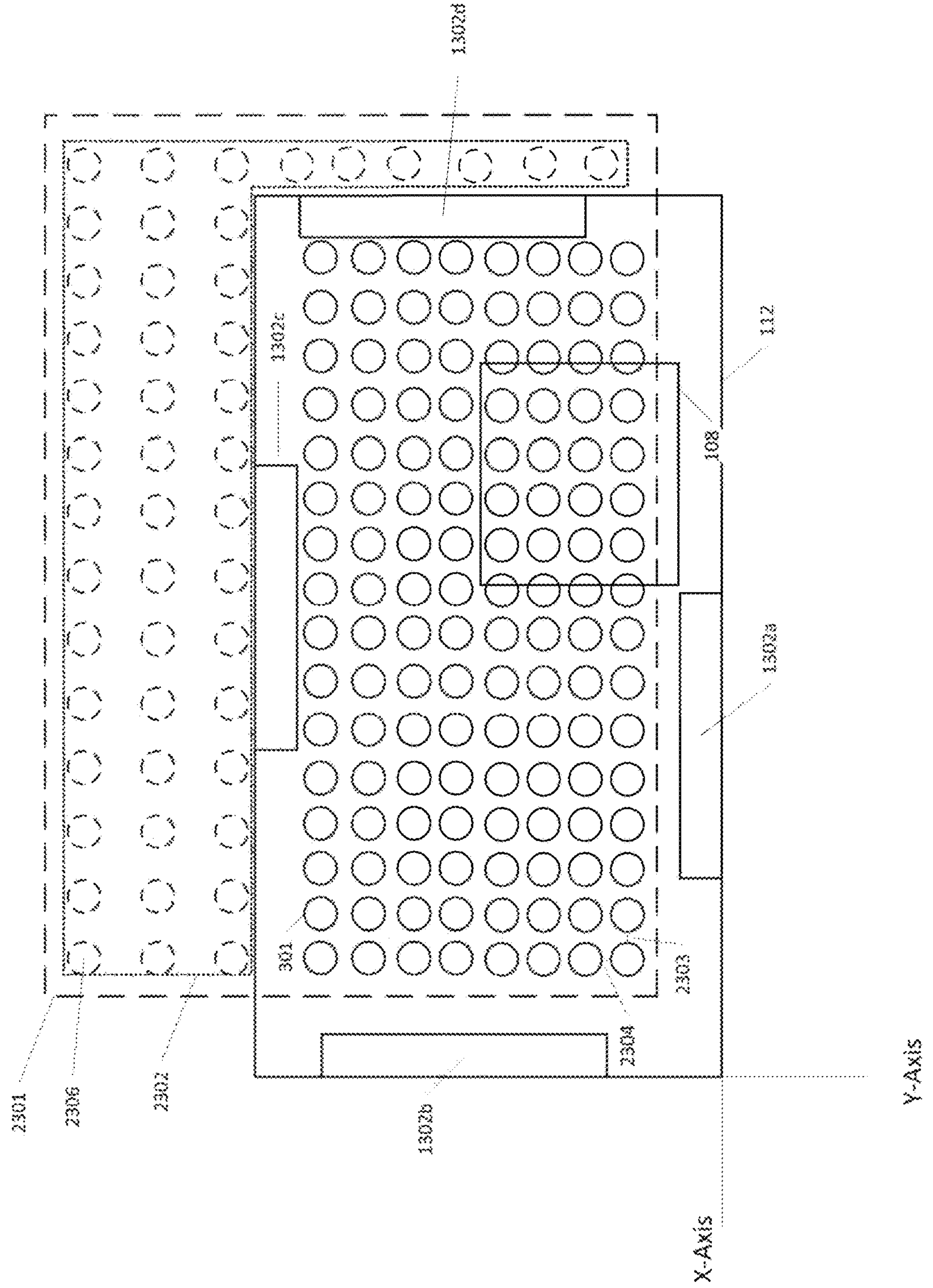

FIG. 23f – Four Boundary Devices With Extra X-Y Bubbles Condensed – Side View
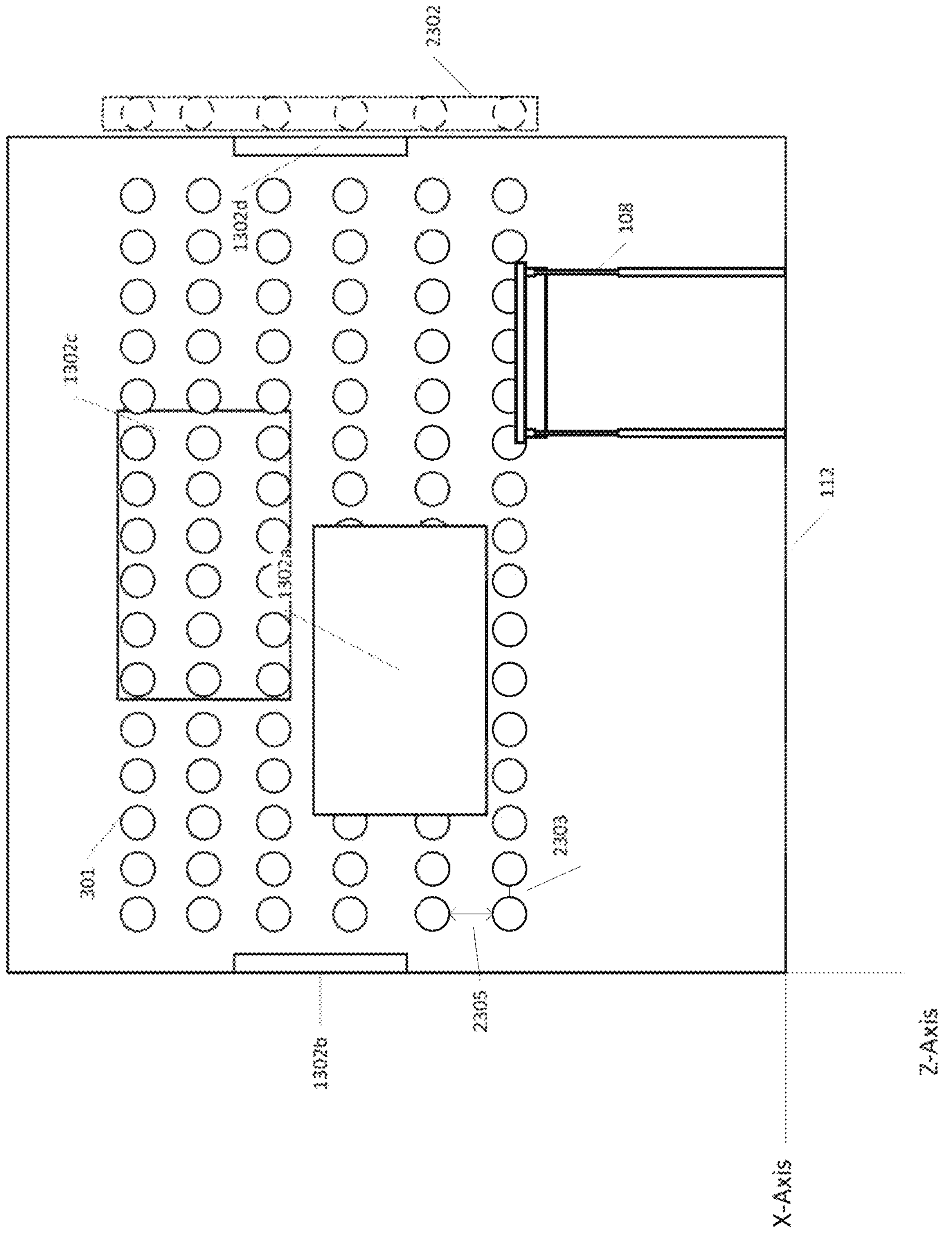

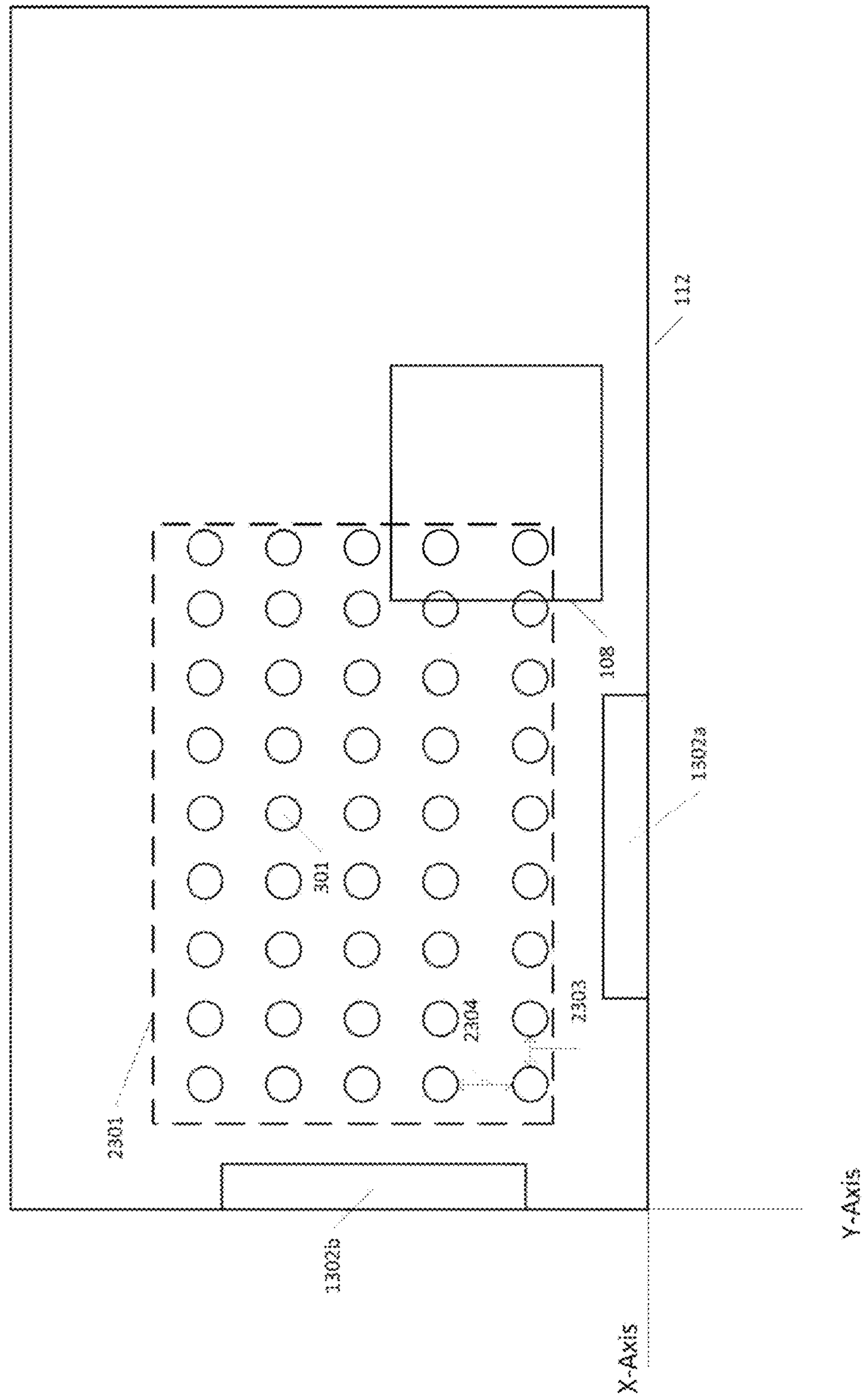
FIG. 24a – Two Boundary Devices With Insufficient X-Y Bubbles – Top View FIG. 24b — Two Boundary Devices With Insufficient X-Y Bubbles — Side View
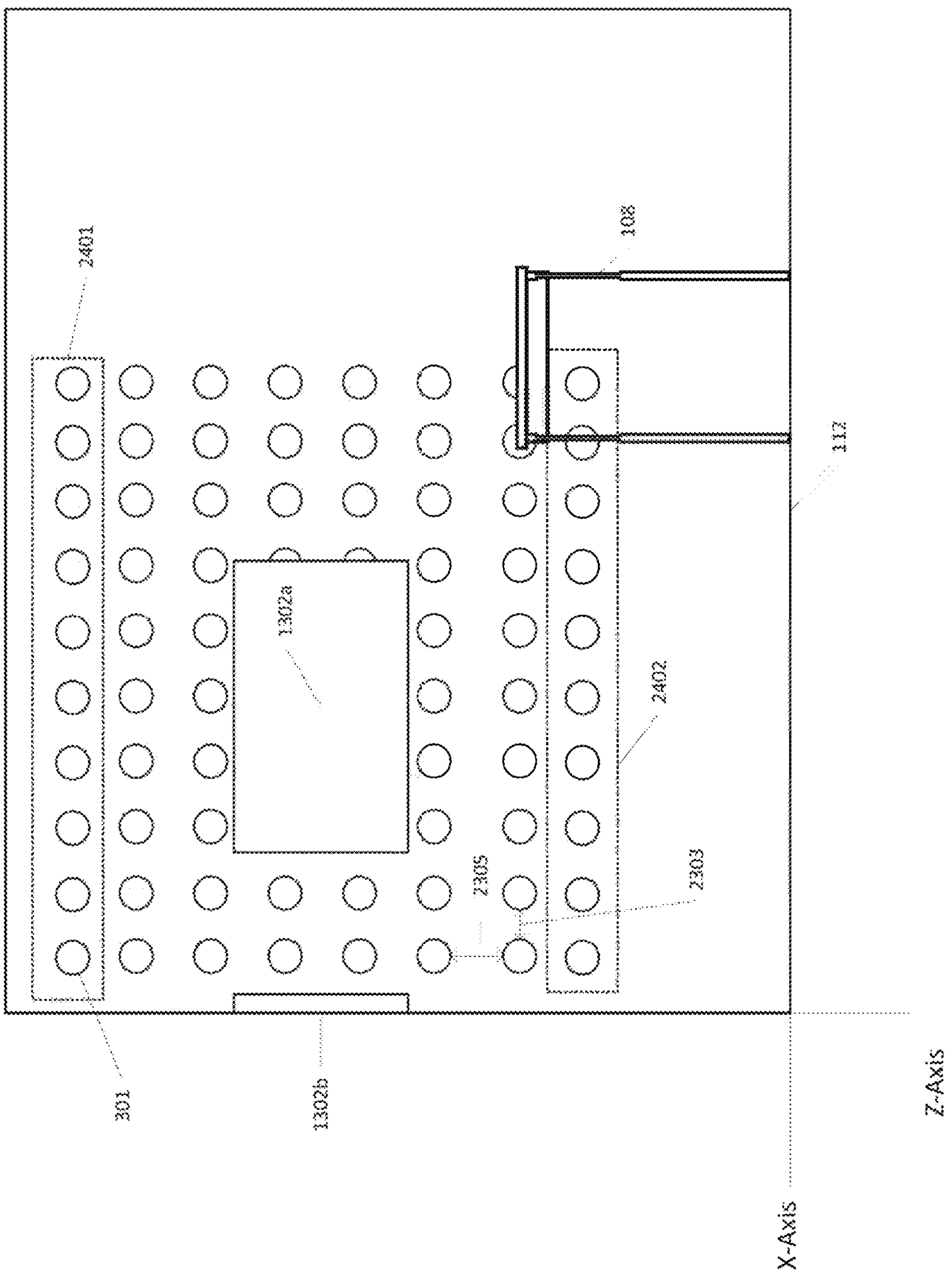

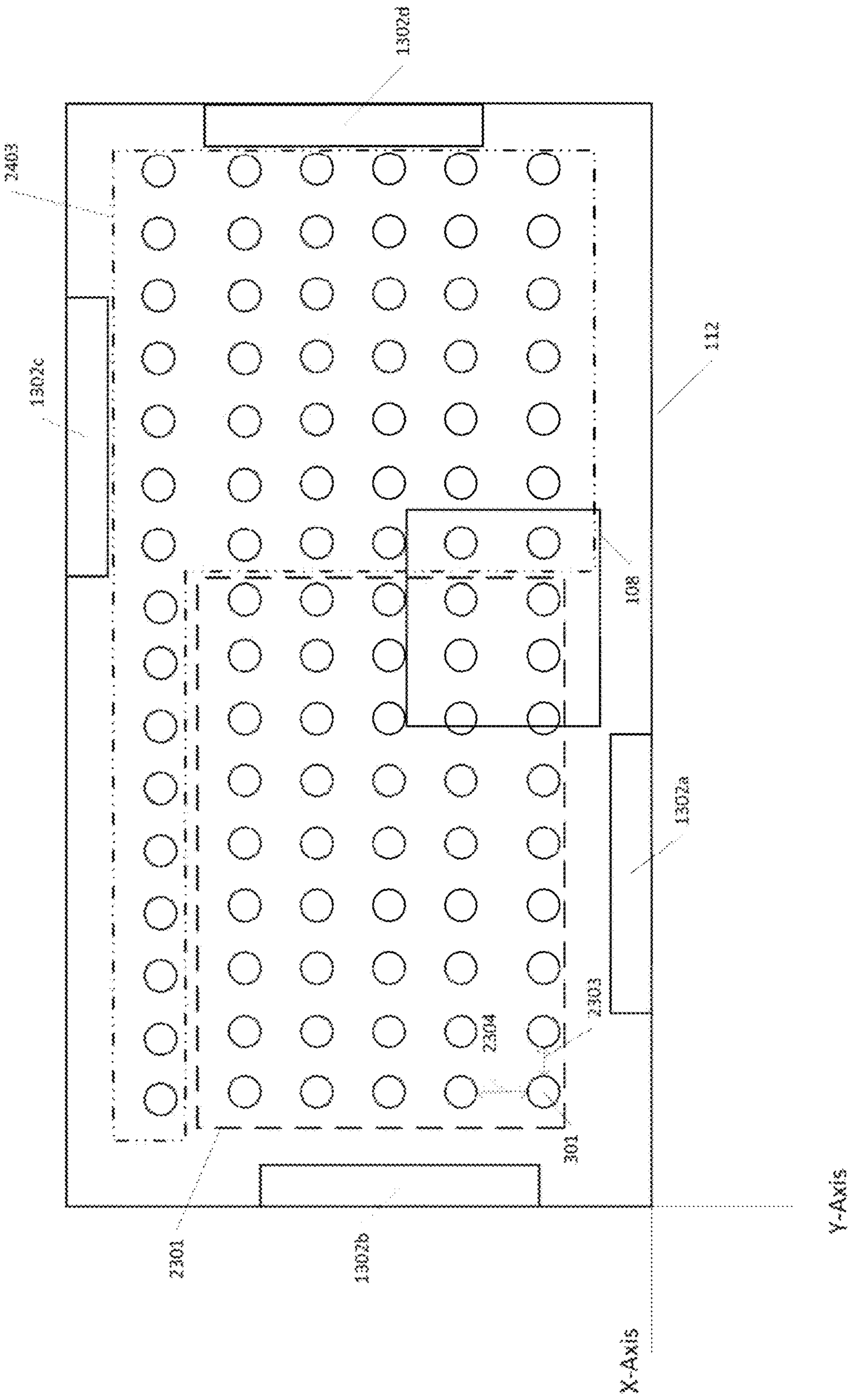
FIG. 24c – Four Boundary Devices With Insufficient X-Y Bubbles Replaced – Top View FIG. 24d – Four Boundary Devices With Insufficient X-Y Bubbles Replaced – Side View
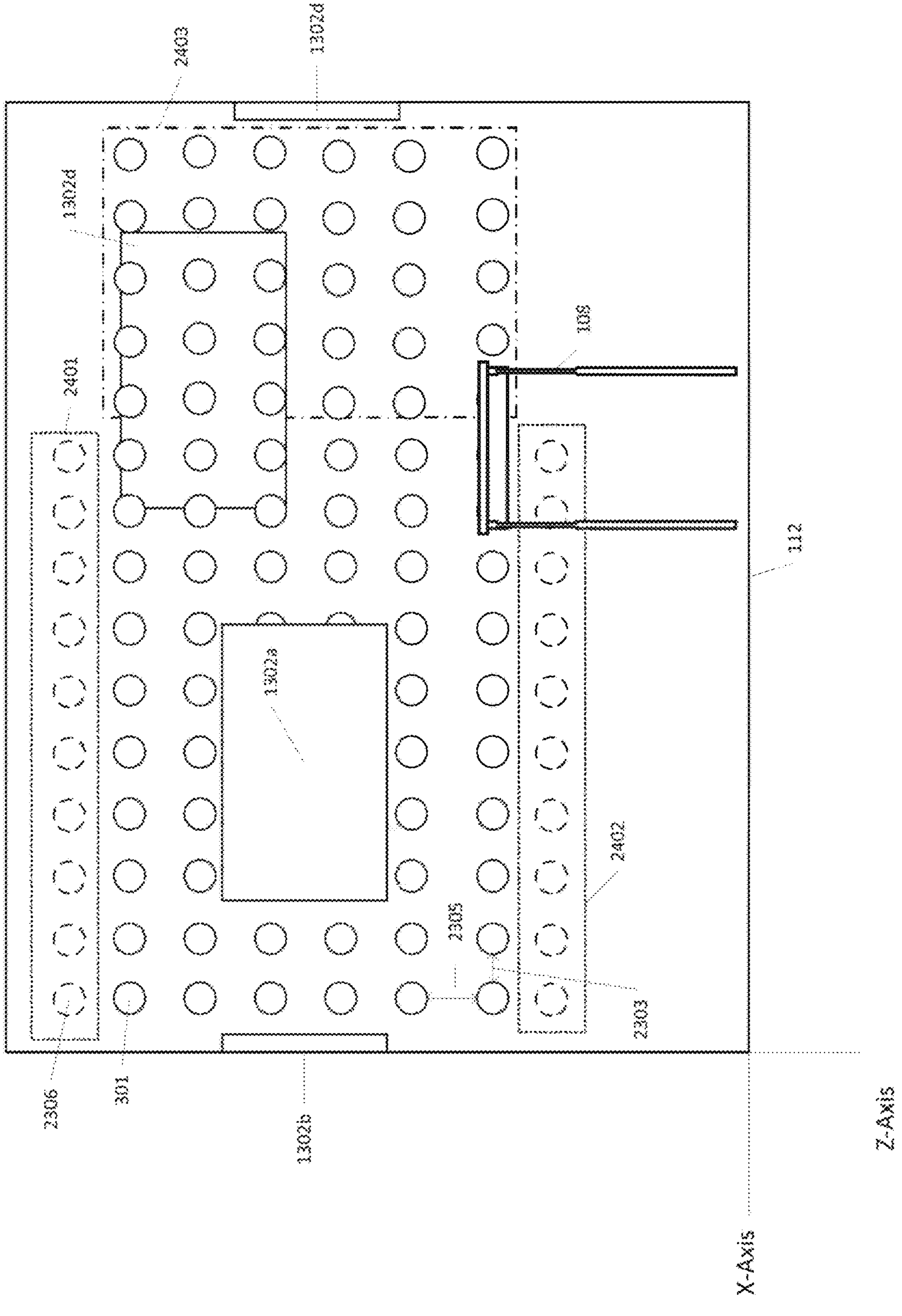

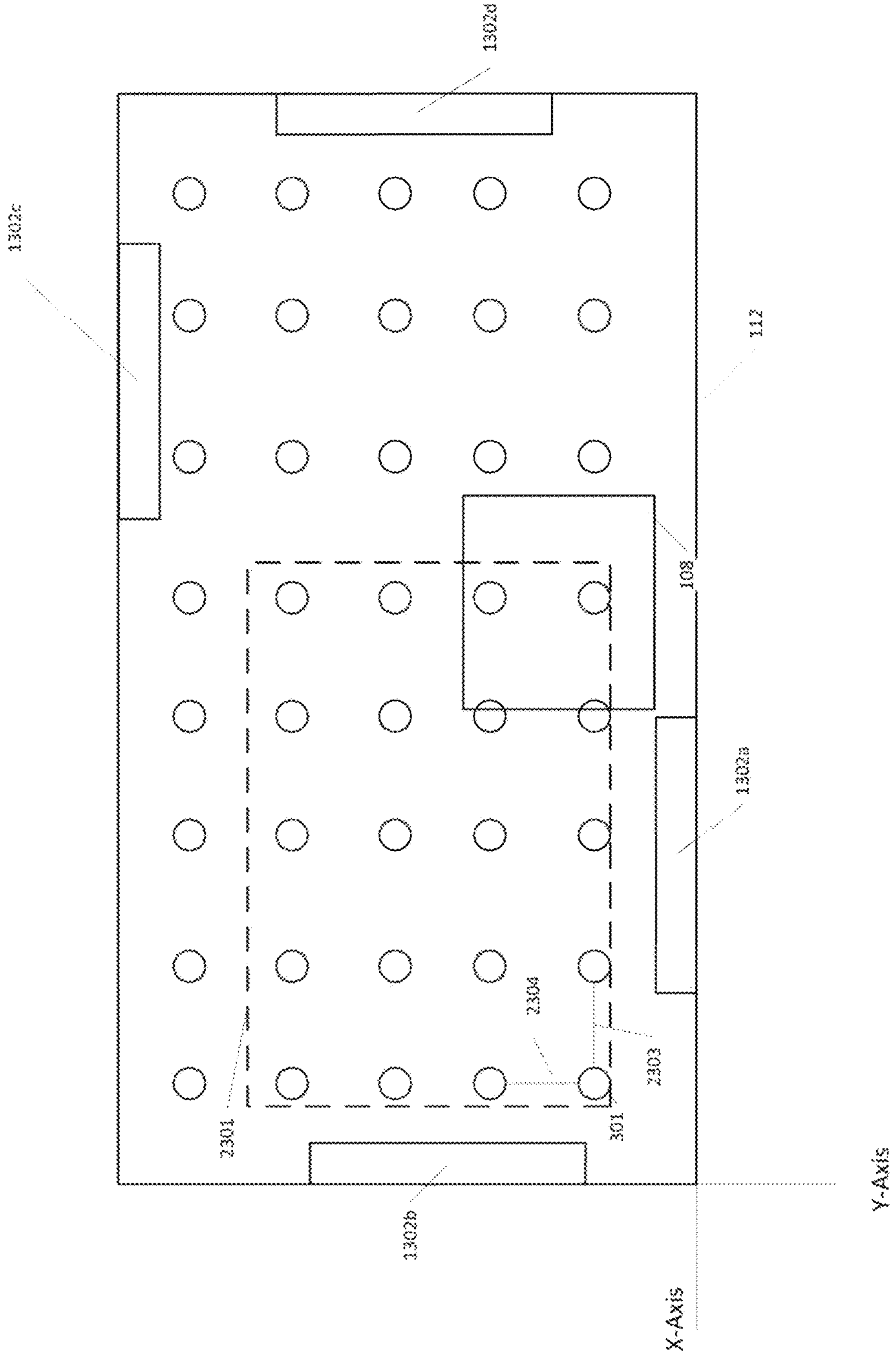
FIG. 24e – Four Boundary Devices With Insufficient X-Y Bubbles Stretched – Top View FIG. 24f — Four Boundary Devices With Insufficient X-Y Bubbles Stretched — Side View
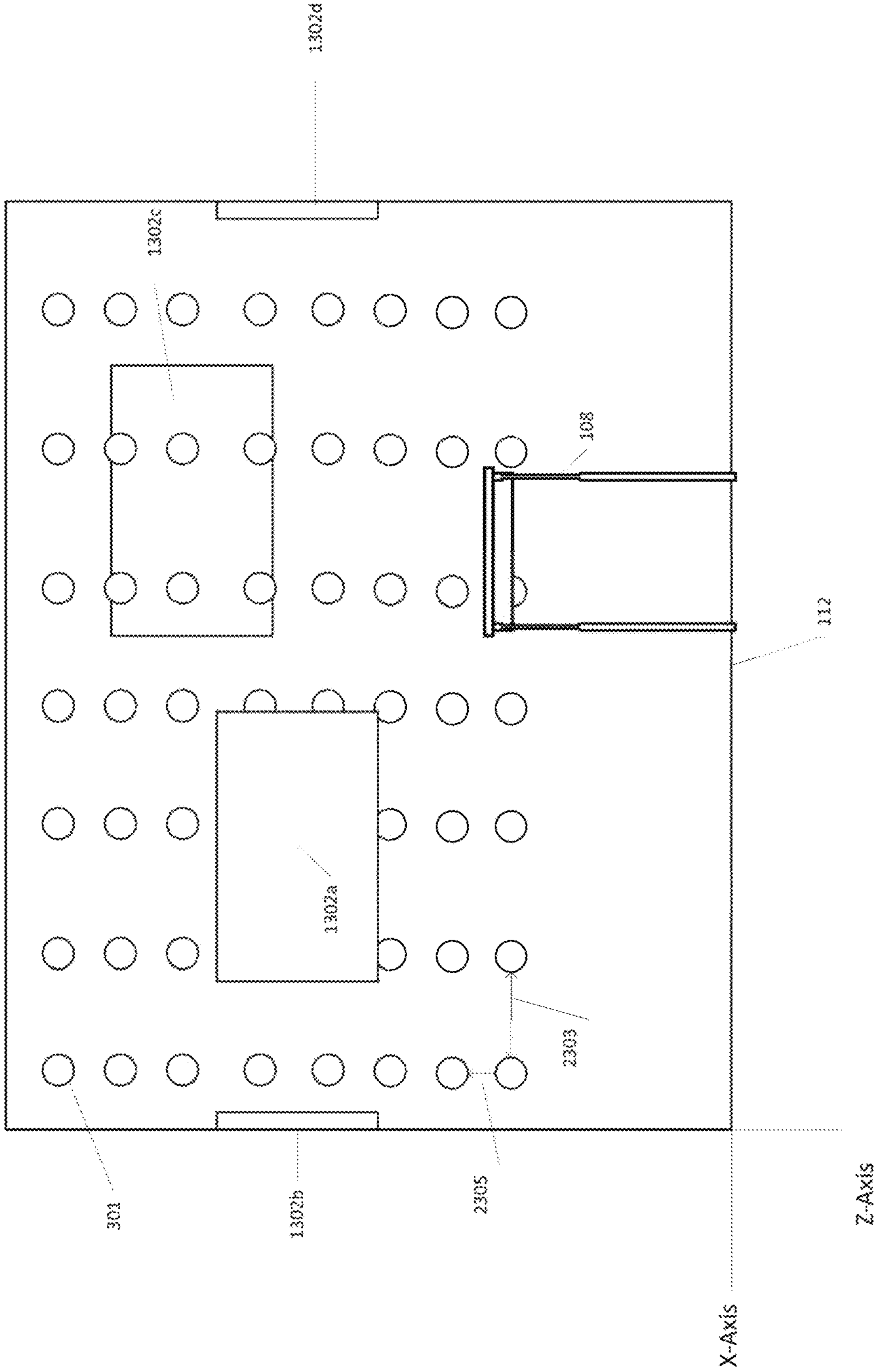

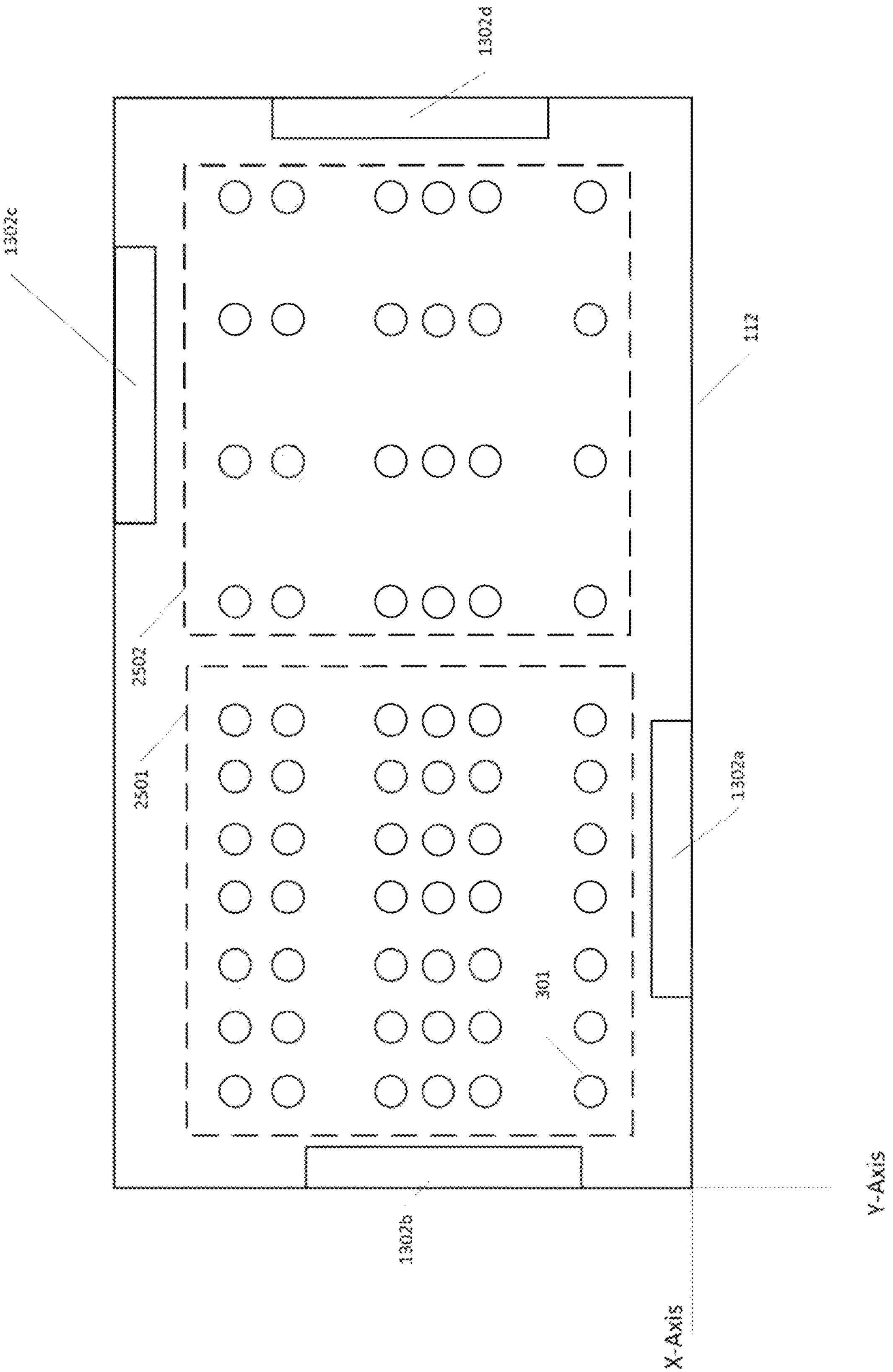
FIG. 25 —Hyperplane with Hybrid Bubble Spacing — Top View

SYSTEM FOR DYNAMICALLY FORMING A VIRTUAL MICROPHONE COVERAGE MAP FROM A COMBINED ARRAY TO ANY DIMENSION, SIZE AND SHAPE BASED ON INDIVIDUAL MICROPHONE ELEMENT LOCATIONS

CROSS REFERENCE TO RELATED APPLICATIONS

This application claims priority to U.S. Provisional Patent Application No. 63/322,504, filed Mar. 22, 2022, the entire contents of which are incorporated herein by reference.

BACKGROUND OF THE INVENTION

1. Field of the Invention

The present invention generally relates to audio conference systems, and more particularly, to automatically dynamically forming a virtual microphone coverage map using a combined microphone array that can be dimensioned, positioned and bounded based on measured and derived placement and distance parameters relating to the individual microphone elements in the combined array in real-time for multi-user conference systems to optimize audio signal and noise level performance in the shared space.

2. Description of Related Art

Obtaining high quality audio at both ends of a conference call is difficult to manage due to, but not limited to, variable room dimensions, dynamic seating plans, roaming participants, unknown number of microphones and locations, unknown speaker system locations, known steady state and unknown dynamic noise, variable desired sound source levels, and unknown room characteristics. This may result in conference call audio having a combination of desired sound sources (participants) and undesired sound sources (return speaker echo signals, HVAC ingress, feedback issues and varied gain levels across all sound sources, etc.).

To provide an audio conference system that addresses dynamic room usage scenarios and the audio performance variables discussed above, microphone systems need to be thoughtfully designed, installed, configured, and calibrated to perform satisfactorily in the environment. The process starts by placing an audio conference system in the room utilizing one or more microphones. The placement of microphone(s) is critical for obtaining adequate room coverage which must then be balanced with proximity of the microphone(s) to the participants to maximize desired vocal audio pickup while reducing the pickup of speakers and undesired sound sources. In a small space where participants are collocated around a table, simple audio conference systems can be placed on the table to provide adequate performance and participant audio room coverage. Larger spaces require multiple microphones of various form factors which may be mounted in any combination of, but not limited to, the ceiling, tables, walls, etc., making for increasingly complex and difficult installations. To optimize performance of the audio conference system, various compromises are typically required based on, but not limited to, limited available microphone mounting locations, inability to run connecting cables, room use changes requiring a different microphone layout, seated vs. agile and walking participants, location of undesired noise sources and other equipment in the room, etc. all affecting where and what type of microphones can be placed in the room.

Once mounting locations have been determined and the system has been installed, the audio system will typically require a manual calibration process run by an audio technician to complete setup up. Examples of items checked during the calibration include: the coverage zone for each microphone type, gain structure and levels of the microphone inputs, feedback calibration and adjustment of speaker levels and echo canceler calibration. It should be noted in the current art, the microphone systems do not have knowledge of location information relative to other microphones and speakers in the system, so the setup procedure is managing basic signal levels and audio parameters to account for the unknown placement of equipment to reduce acoustic feedback loops between speakers and microphones. As a result, if any part of the microphone or speaker system is removed, replaced, or new microphone and speakers are added, the system would need to undergo a new calibration and configuration procedure. Even though the audio conference system has been calibrated to work as a system, the microphone elements operate independently of each other requiring complex switching and management logic to ensure the correct microphone system element is active for the appropriate speaking participant in the room. The impact of this is overlapping microphone coverage zones, coverage zone boundaries that cannot be configured for, or controlled precisely resulting in microphone element conflict with desired sound sources, unwanted undesired sound source pick up, acoustic feedback loops, too little coverage zone for the room and coverage zone extension beyond the preferred coverage area.

The optimum solution would be a conference system that is able to automatically determine and adapt a unified and optimized coverage zone for shape, size, position, and boundary dimensions in real-time utilizing all available microphone elements in shared space as a single physical array. However, fully automating the dynamic coverage zone process and creating a unified, dimensioned, positioned and shaped coverage zone grid from multiple individual microphones that is able to fully encompass a 3D space including limiting the coverage area to inferred boundaries and solving such problems has proven difficult and insufficient within the current art.

An automatic calibration process is preferably required which will detect microphones attached or removed from the system, locate the microphones in 3D space to sufficient position and orientation accuracy to form a single cohesive microphone array out of all the in-room microphone elements. With all microphones operating as a single physical microphone array, the system will be able to derive a single cohesive position based, dimensioned and shaped coverage map that is specifically adapted to the room the microphone system is installed in which improves the system's ability to manage audio signal gain, participant tracking, minimization of unwanted sound sources, reduction of ingress from other spaces, and sound source bleed through from coverage grids that extend beyond wall boundaries and wide-open spaces while accommodating a wide range of microphone placement options one of which is being able to add or remove microphone elements in the system and have the audio conference system integrate the changed microphone element structure into the microphone array in real-time and preferably adapting the coverage pattern accordingly.

Systems in the current art do not automatically derive, establish and adjust their specific coverage zone parameters specifics based on specific microphone element positions and orientations and instead rely on a manual calibration and setup process to configure the audio conference system requiring complex digital signal processing (DSP) switching and management processors to integrate independent microphones into a coordinated microphone room coverage selection process based on the position and sound levels of the participants in the room. Adapting to the addition of or removal of a microphone element is a complex process. The audio conference system will typically need to be taken offline, recalibrated, and configured to account for coverage patterns as microphones are added or removed from the audio conference system. Adapting and optimizing the coverage area to a specific size, shape and bounded dimensions is not easily accomplished with microphone devices used in the current art which results in a scenario where either not enough of the desired space is covered or too much of the desired space is covered extending into an undesired space and undesired sound source pickup.

Therefore, the current art is not able to provide a dynamically formed virtual microphone coverage grid in real-time accounting for individual microphone position placement in the space during audio conference system setup that takes into account multiple microphone-to-speaker combinations, multiple microphone and microphone array formats, microphone room position, addition and removal of microphones, in-room reverberation, and return echo signals.

SUMMARY OF THE INVENTION

An object of the present embodiments is, in real-time, upon auto-calibration of the combined microphone array system to automatically determine and position the microphone coverage grid for the optimal dispersion of virtual microphones for grid placement, size and geometric shape relative to a reference point in the combined microphone array and to the position of the other microphone elements in the combined microphone array. More specifically, it is an object of the invention to preferably place the microphone coverage grid based on microphone boundary device determinations and/or manually entered room boundary configuration data to adjust the virtual microphone grid in a 3D space for the purpose of optimizing the microphone coverage pattern regardless of the number of physical microphone elements, location of the microphone elements, and orientation of the microphone elements connected to the system processor in the shared 3D space.

The present invention provides a real-time adaptable solution to undertake creation of a dynamically determined coverage zone grid of virtual microphones based on the installed microphones positions, orientations, and configuration settings in the 3D space.

These advantages and others are achieved, for example, by a system for automatically dynamically forming a virtual microphone coverage map using a combined microphone array in a shared 3D space. The system includes a combined microphone array comprising a plurality of microphones and a system processor communicating with the combined microphone array. The microphones in the combined microphone array are arranged along one or more microphone axes. The system processor is configured to perform operations including obtaining predetermined locations of the microphones within the combined microphone array throughout the shared 3D space, generating coverage zone dimensions based on the locations of the microphones, and populating the coverage zone dimensions with virtual microphones.

The microphones in the combined microphone array may be configured to form a 2D microphone plane in the shared 3D space. The microphones in the combined microphone array may be configured to form a microphone hyperplane in the shared 3D space. The combined microphone array may include one or more discrete microphones not collocated within microphone array structures. The combined microphone array may include one or more discrete microphones and one or more microphone array structures. The generating coverage zone dimensions may include deriving the coverage zone dimensions from positions of one or more boundary devices throughout the 3D space. The boundary devices may include one or more of wall-mounted microphones, ceiling microphones, suspended microphones, table-top microphones and free-standing microphones. The populating the coverage zone dimensions with virtual microphones may include incorporating constraints to optimize placement of the virtual microphones. The constraints may include one or more of hardware/memory resources, a number of physical microphones that can be supported, and a number of virtual microphones that can be allocated. The combined microphone array may include one or more microphone array structures and the populating the coverage zone dimensions with virtual microphones may include aligning the virtual microphones according to a configuration of the one or more microphone array structures.

The preferred embodiments comprise both algorithms and hardware accelerators to implement the structures and functions described herein.

BRIEF DESCRIPTION OF THE DRAWINGS

FIGS. 1*a*, 1*b* and 1*c* are diagrammatic examples of a typical audio conference setups across multiple device types.

FIGS. 2*a* and 2*b* are graphical structural examples of microphone array layouts supported in the embodiment of the present invention.

FIGS. 3*a*, 3*b*, 3*c* and 3*d* are examples of Microphone Axis arrangements supported in the embodiment of the invention.

FIGS. 3*e*, 3*f*, 3*g*, 3*h*, 3*i*, 3*j* and 3*k* are examples of Microphone Plane arrangements supported in the embodiment of the invention.

FIGS. 3*l*, 3*m*, 3*n*, 3*o*, 3*p*, 3*q* and 3*r* are examples of Microphone Hyperplane arrangements supported in the embodiment of the invention.

FIGS. 4*a*, 4*b*, 4*c*. 4*d*, 4*e* and 4*f* are prior art diagrammatic examples of microphone array coverage patterns in the current art.

FIGS. 5*a*, 5*b*, 5*c*, 5*d*, 5*e*, 5*f* and 5*g* are diagrammatic illustrations of the of microphone array devices combined and calibrated into a single array providing full room coverage.

FIG. 6 is diagrammatic illustration of coordinate definitions within a 3D space.

FIGS. 7*a*, 7*b* and 7*c* are exemplary illustrations of microphones in m-plane arrangements installed on various horizontal planes and showing the distribution of virtual microphones in 3D space supported in the embodiment of the invention.

FIGS. 8*a* and 8*b* are exemplary illustrations of a microphones in m-plane arrangements installed on a diagonal plane and showing the distribution of virtual microphones in space supported in the embodiment of the invention.

FIG. 8*c* is an exemplary illustration of microphones in an m-hyperplane arrangement and showing the distribution of virtual microphones in a space supported in the embodiment of the invention.

FIGS. 9*a* and 9*b* are exemplary illustrations of microphones in an m-hyperplane arrangement and showing the distribution of virtual microphones in a 3D space supported in the embodiment of the invention.

FIGS. 10*a*, 10*b* and 10*c* are exemplary illustrative examples of mounting microphones in an m-plane or m-hyperplane accounting for the mirrored virtual microphones in such a way as to minimize undesired around sources in the 3D space.

FIGS. 11*a*, 11*b*, and 11*c* are functional and structural diagrams of an exemplary embodiment of automatically creating a virtual microphone specific room mapping based on known and unknown criteria and using the virtual microphone map to target sound sources in a 3D space.

FIGS. 12*a*, 12*b*, 12*c*, 12*d* and 12*e* are exemplary embodiments of the logic flowcharts of the Bubble Map Position processor process.

FIGS. 13*a*, 13*b* and 13*c* are exemplary illustrations of the present invention mapping virtual microphones in a 3D space based on a single boundary device mounting location where the coverage dimensions are unknown.

FIGS. 14*a*, 14*b*, 14*c*, 14*d*, 14*e* and 14*f* are exemplary illustrations of the present invention mapping virtual microphones in a 3D space based on two boundary device mounting locations where the coverage dimensions are unknown.

FIGS. 15*a*, 15*b*, 15*c*, 15*d* and 15*e* are exemplary illustrations of the present invention mapping virtual microphones in a 3D space based on three boundary device mounting locations where the coverage dimensions are unknown.

FIGS. 16*a* and 16*b* are exemplary illustrations of the present invention mapping virtual microphones in a 3D space based on four boundary device mounting locations where the coverage dimensions are unknown.

FIGS. 17*a* and 17*b* are exemplary illustrations of the present invention mapping virtual microphones in a 3D space based on a five-boundary device mounting locations where the coverage dimensions are unknown.

FIGS. 18*a* and 18*b* are exemplary illustrations of the present invention mapping virtual microphones in a 3D space based on five boundary device mounting locations with one device located on a table where the coverage dimensions are unknown.

FIGS. 19*a* and 19*b* are exemplary illustrations of the present invention mapping virtual microphones in a 3D space based on six boundary device mounting locations where the coverage dimensions are unknown.

FIGS. 20*a*, 20*b* and 20*c* are exemplary illustrations of the present invention mapping virtual microphones in a 3D space based on increasing the number of boundary devices incrementally in the 3D space where the coverage dimensions are known.

FIGS. 21*a*, 21*b*, 21*c* and 21*d* are illustrations of physical microphone distance constraints between microphones.

FIG. 22 is a diagrammatic illustration of removing a physical microphone from the microphone array delay table.

FIGS. 23*a*, 23*b*, 23*c*, 23*d*, 23*e* and 23*f* are exemplary illustrations of replacing extra X-Y virtual microphones in the virtual microphone map when incrementing from 2 to 4 boundary devices.

FIGS. 24*a*, 24*b*, 24*c*, 24*d*, 24*e* and 24*f* are exemplary illustrations of reallocating insufficient X-Y virtual microphones in the virtual microphone map when more boundary devices are incrementally installed in the 3d space.

FIG. 25 is an exemplary illustration of a hybrid virtual microphone map configuration utilizing an m-hyperplane arrangement of microphones.

DETAILED DESCRIPTION OF THE PRESENT INVENTION

Figure 2B:
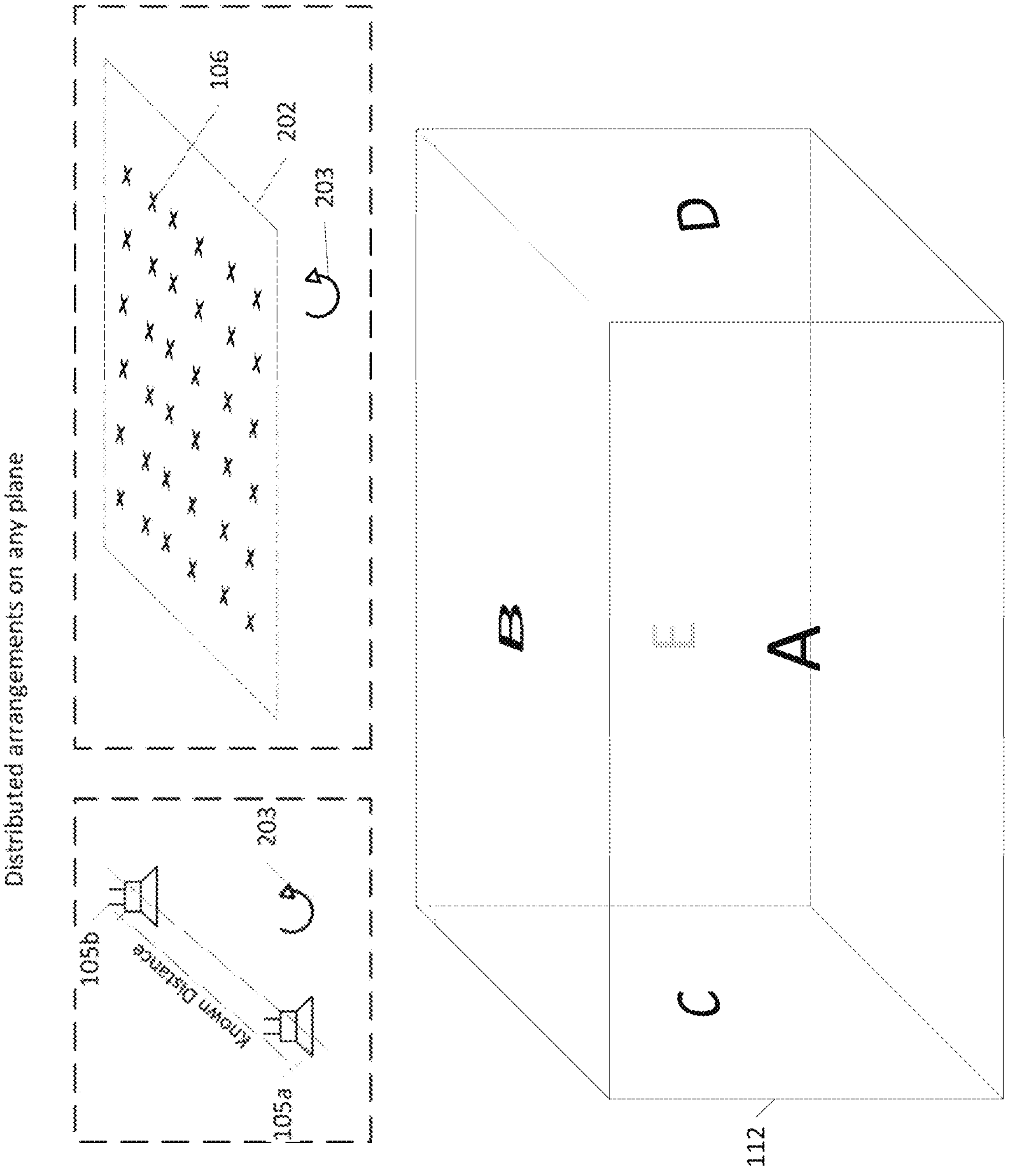

The present invention is directed to apparatus and methods that enable groups of people (and other sound sources, for example, recordings, broadcast music, Internet sound, etc.), known as "participants", to join together over a network, such as the Internet or similar electronic channel(s), in a remotely-distributed real-time fashion employing personal computers, network workstations, and/or other similarly connected appliances, often without face-to-face contact, to engage in effective audio conference meetings that utilize large multi-user rooms (spaces) with distributed participants.

Advantageously, embodiments of the present apparatus and methods afford an ability to provide all participants in the room with a microphone array system that auto-generates a virtual microphone coverage grid that is adapted to each unique installation space and situation consisting of ad-hoc located microphone elements, providing specifically shaped, placed and dimensioned full room microphone coverage, optimized based on the number of microphone elements formed into a combined microphone array in the room, while maintaining optimum audio quality for all conference participants.

A notable challenge to creating a dynamically shaped and positioned virtual microphone bubble map from ad-hoc located microphones in a 3D space is reliably placing and sizing the 3D virtual microphone bubble map with sufficient accuracy required to position the virtual microphone bubble map in proper context to the room boundaries, physical microphones' installed locations and the participants' usage requirements all without requiring a complex manual setup procedure, the merging of individual microphone coverage zones, directional microphone systems or complex digital signal processing (DSP) logic. This is also preferably using instead a microphone array system that is aware of its constituent microphone element locations relative to each other in the 3D space as well as each microphone device having configuration parameters that facilitate coverage zone boundary determinations on a per microphone basis allowing for a microphone array system that is able to automatically and dynamically derive and establish room specific installed coverage zone areas and constraints to optimize the coverage zone area for each individual room automatically without the need to manually calibrate and configure the microphone system.

A "microphone" in this specification may include, but is not limited to, one or more of, any combination of transducer device(s) such as, microphone element, condenser mics, dynamic mics, ribbon mics, USB mics, stereo mics, mono mics, shotgun mics, boundary mic, small diaphragm mics, large diaphragm mics, multi-pattern mics, strip microphones, digital microphones, fixed microphone arrays, dynamic microphone arrays, beam forming microphone arrays, and/or any transducer device capable of receiving acoustic signals and converting to electrical signals, and or digital signals.

A "microphone point source" is defined for the purpose of this specification as the center of the aperture of each physical microphone. The microphones are considered to be omnidirectional as defined by their polar plot and essentially can be considered an isotropic point source. This is required for determining the geometric arrangement of the physical microphones relative to each other. The microphones will be considered to be a microphone point source in 3D space.

A "Boundary Device" in this specification may be defined as any microphone and/or microphone arrangement that has been defined as a boundary device. A microphone can be configured and thus defined as a boundary device through automatic queries to the microphone and/or through a manual configuration process. A boundary device may be mounted on a room boundary such as a wall or ceiling, a tabletop, and/or a free-standing microphone offset from or suspended from a mounting location that will be used to define the outer coverage area limit of the installed microphone system in its environment. The microphone system will use microphones configured as boundary devices to derive coverage zone dimensions in the 3D space. By default, if a boundary device is mounted to a wall or ceiling it will define the coverage area to be constrained to that mounting surface which can then be used to derive room dimensions. As more boundary devices are installed on each room boundary in a space the accuracy of determining the room dimensions increases with each device and can be determined to a high degree of accuracy if all room boundaries are used for mounting. By the same token a boundary device can be free standing in a space such as a microphone on a stand or suspended from a ceiling or offset from a wall or other structure. The coverage zone dimension will be constrained to that boundary device which is not defining a specific room dimension but is a free air dimension that is movable based on the boundary devices' current placement in the space. These can be used to define a boundary constraint of 1, 2 or 3 planes based on the location of the boundary device. Boundary constraints are defined as part of the boundary device configuration parameters to be defined in detail within the specification. Note that a boundary device is not restricted to create a boundary at its microphone location. For example, a boundary device that consists of a single microphone hanging from a ceiling mount at a known distance could create a boundary at the ceiling by off-setting the boundary from the microphone by that known distance.

A "microphone arrangement" may be defined in this specification as a geometric arrangement of all the microphones contained in the microphone system. Microphone arrangements are required to determine the virtual microphone distribution pattern. The microphones can be mounted at any point in the 3D space, which may be a room boundary, such as a wall, ceiling or floor. Alternatively, the microphones may be offset from the room boundaries by mounting on stands, tables or structures that provide offset from the room boundaries. The microphone arrangements are used to describe all the possible geometric layouts of the physical microphones to either form a microphone axis (m-axis), microphone plane (m-plane) or microphone hyperplane (m-hyperplane) geometric arrangement in the 3D space.

A "microphone axis" (m-axis) may be defined in this specification as an arrangement of microphones that forms and is constrained to a single 1D line.

A "microphone plane" (m-plane) may be defined in this specification as an arrangement containing all the physical microphones that forms and is constrained to a 2D geometric plane. A microphone plane cannot be formed from a single microphone axis.

A "microphone hyperplane" (m-hyperplane) may be defined in this specification as an arrangement containing all the physical microphones that forms a 3-dimensional hyperplane structure between the microphones. A microphone hyperplane cannot be formed from a single microphone axis or microphone plane.

Two or more microphone aperture arrangements can be combined to form an overall microphone aperture arrangement. For example, two microphone axes arranged perpendicular to each other will form a microphone plane and two microphone planes arranged perpendicular to each other will form a microphone hyperplane.

A "virtual microphone" in this specification represents a point in space that has been focused on by the combined microphone array by time-aligning and combining a set of physical microphone signals according to the time delays based on the speed of sound and the time to propagate from the sound source each to physical microphone. A virtual microphone emulates performance of a single, physical, omnidirectional microphone at that point in space.

A "Coverage Zone Dimension" in the specification may include physical boundaries such as wall, ceiling and floors that contain a space with regards to the establishment of installing and configuring a microphone system coverage patterns and dimensions. The coverage zone dimension can be known ahead of time or derived with a number of sufficiently placed microphone arrays also known as boundary devices placed on or offset from physical room boundaries.

A "combined array" in this specification can be defined as the combining of two more individual microphone elements, groups of microphone elements and other combined microphone elements into a single combined microphone array system that is aware of the relative distance between each microphone element to a reference microphone element, determined in configuration, and is aware of the relative orientation of the microphone elements such as an m-axis, m-plane and m-hyperplane sub arrangements of the combined array. A combined array will integrate all microphone elements into a single array and will be able to form coverage pattern configurations as a combined array.

A "conference enabled system" in this specification may include, but is not limited to, one or more of, any combination of device(s) such as, UC (unified communications) compliant devices and software, computers, dedicated software, audio devices, cell phones, a laptop, tablets, smart watches, a cloud-access device, and/or any device capable of sending and receiving audio signals to/from a local area network or a wide area network (e.g. the Internet), containing integrated or attached microphones, amplifiers, speakers and network adapters. PSTN, Phone networks etc.

A "communication connection" in this specification may include, but is not limited to, one or more of or any combination of network interface(s) and devices(s) such as, Wi-Fi modems and cards, internet routers, internet switches, LAN cards, local area network devices, wide area network devices, PSTN, Phone networks, etc.

A "device" in this specification may include, but is not limited to, one or more of, or any combination of processing device(s) such as, a cell phone, a Personal Digital Assistant, a smart watch or other body-borne device (e.g., glasses, pendants, rings, etc.), a personal computer, a laptop, a pad, a cloud-access device, a white board, and/or any device capable of sending/receiving messages to/from a local area network or a wide area network (e.g., the Internet), such as devices embedded in cars, trucks, aircraft, household appliances (refrigerators, stoves, thermostats, lights, electrical control circuits, the Internet of Things, etc.).

A "participant" in this specification may include, but is not limited to, one or more of, any combination of persons such as students, employees, users, attendees, or any other general groups of people that can be interchanged throughout the specification and construed to mean the same thing. Participants gather into a room or space for the purpose of listening to and or being a part of a classroom, conference, presentation, panel discussion or any event that requires a public address system and a UCC connection for remote participants to join and be a part of the session taking place. Throughout this specification a participant is a desired sound source, and the two words can be construed to mean the same thing.

A "desired sound source" in this specification may include, but is not limited to, one or more of a combination of audio source signals of interest such as: sound sources that have frequency and time domain attributes, specific spectral signatures, and/or any audio sounds that have amplitude, power, phase, frequency and time, and/or voice characteristics that can be measured and/or identified such that a microphone can be focused on the desired sound source and said signals processed to optimize audio quality before delivery to an audio conferencing system. Examples include one or more speaking persons, one or more audio speakers providing input from a remote location, combined video/audio sources, multiple persons, or a combination of these. A desired sound source can radiate sound in an omni-polar pattern and/or in any one or combination of directions from the center of origin of the sound source.

An "undesired sound source" in this specification may include, but is not limited to, one or more of a combination of persistent or semi-persistent audio sources such as: sound sources that may be measured to be constant over a configurable specified period of time, have a predetermined amplitude response, have configurable frequency and time domain attributes, specific spectral signatures, and/or any audio sounds that have amplitude, power, phase, frequency and time characteristics that can be measured and/or identified such that a microphone might be erroneously focused on the undesired sound source. These undesired sources encompass, but are not limited to, Heating, Ventilation, Air Conditioning (HVAC) fans and vents; projector and display fans and electronic components; white noise generators; any other types of persistent or semi-persistent electronic or mechanical sound sources; external sound source such as traffic, trains, trucks, etc.; and any combination of these. An undesired sound source can radiate sound in an omni-polar pattern and/or in any one or combination of directions from the center of origin of the sound source.

A "system processor" is preferably a computing platform composed of standard or proprietary hardware and associated software or firmware processing audio and control signals. An example of a standard hardware/software system processor would be a Windows-based computer. An example of a proprietary hardware/software/firmware system processor would be a Digital Signal Processor (DSP).

A "communication connection interface" is preferably a standard networking hardware and software processing stack for providing connectivity between physically separated audio-conferencing systems. A primary example would be a physical Ethernet connection providing TCPIP network protocol connections.

A "UCC or Unified Communication Client" is preferably a program that performs the functions of but not limited to messaging, voice and video calling, team collaboration, video conferencing and file sharing between teams and or individuals using devices deployed at each remote end to support the session. Sessions can be in the same building and/or they can be located anywhere in the world that a connection can be establish through a communications framework such but not limited to Wi-Fi, LAN, Intranet, telephony, wireless or other standard forms of communication protocols. The term "Unified Communications" may refer to systems that allow companies to access the tools they need for communication through a single application or service (e.g., a single user interface). Increasingly, Unified Communications have been offered as a service, which is a category of "as a service" or "cloud" delivery mechanisms for enterprise communications ("UCaaS"). Examples of prominent UCaaS providers include Dialpad, Cisco, Mitel, RingCentral, Twilio, Voxbone, 8×8, and Zoom Video Communications.

An "engine" is preferably a program that performs a core function for other programs. An engine can be a central or focal program in an operating system, subsystem, or application program that coordinates the overall operation of other programs. It is also used to describe a special-purpose program containing an algorithm that can sometimes be changed. The best-known usage is the term search engine which uses an algorithm to search an index of topics given a search argument. An engine is preferably designed so that its approach to searching an index, for example, can be changed to reflect new rules for finding and prioritizing matches in the index. In artificial intelligence, for another example, the program that uses rules of logic to derive output from a knowledge base is called an inference engine.

As used herein, a "server" may comprise one or more processors, one or more Random Access Memories (RAM), one or more Read Only Memories (ROM), one or more user interfaces, such as display(s), keyboard(s), mouse/mice, etc. A server is preferably apparatus that provides functionality for other computer programs or devices, called "clients." This architecture is called the client-server model, and a single overall computation is typically distributed across multiple processes or devices. Servers can provide various functionalities, often called "services", such as sharing data or resources among multiple clients, or performing computation for a client. A single server can serve multiple clients, and a single client can use multiple servers. A client process may run on the same device or may connect over a network to a server on a different device. Typical servers are database servers, file servers, mail servers, print servers, web servers, game servers, application servers, and chat servers. The servers discussed in this specification may include one or more of the above, sharing functionality as appropriate. Client-server systems are most frequently implemented by (and often identified with) the request-response model: a client sends a request to the server, which performs some action and sends a response back to the client, typically with a result or acknowledgement. Designating a computer as "server-class hardware" implies that it is specialized for running servers on it. This often implies that it is more powerful and reliable than standard personal computers, but alternatively, large computing clusters may be composed of many relatively simple, replaceable server components.

The servers and devices in this specification typically use the one or more processors to run one or more stored "computer programs" and/or non-transitory "computer-readable media" to cause the device and/or server(s) to perform the functions recited herein. The media may include Compact Discs, DVDs, ROM, RAM, solid-state memory, or any other storage device capable of storing the one or more computer programs.

With reference to FIG. 1*a*, shown is illustrative of a typical audio conference scenario in the current art, where a remote user 101 is communicating with a shared space conference room 112 via headphone (or speaker and microphone) 102 and computer 104. Room, shared space, environment, free space, conference room and 3D space can be construed to mean the same thing and will be used interchangeably throughout the specification. The purpose of this illustration is to portray a typical audio conference system 110 in the current art in which there is sufficient system complexity due to either room size and/or multiple installed microphones 106 and speakers 105 that the microphone 106 and speaker 105 system may require custom microphone 106 coverage pattern calibration and configuration setup. Microphone 106 coverage pattern setup is typically required in all but the simplest audio conference system 110 installations where the microphones 106 are static in location and their coverage patterns limited, well understood and fixed in design such as a simple table-top 108 units and/or as illustrated in FIG. 1B simple wall mounted microphone and speaker bar arrays 114.

For clarity purposes, a single remote user 101 is illustrated. However, it should be noted that there may be a plurality of remote users 101 connected to the conference system 110 which can be located anywhere a communication connection 123 is available. The number of remote users is not germane to the preferred embodiment of the invention and is included for the purpose of illustrating the context of how the audio conference system 110 is intended to be used once it has been installed and calibrated. The room 112 is configured with examples of, but not limited to, ceiling, wall, and desk mounted microphones 106 and examples of, but not limited to, ceiling and wall mounted speakers 105 which are connected to the audio conference system 110 via audio interface connections 122. In-room participants 107 may be located around a table 108 or moving about the room 112 to interact with various devices such as the touch screen monitor 111. A touch screen/flat screen monitor 111 is located on the long wall. A microphone 106 enabled webcam 109 is located on the wall beside the touch screen 111 aiming towards the in-room participants 107. The microphone 106 enabled web cam 109 is connected to the audio conference system 110 through common industry standard audio/video interfaces 122. The complete audio conference system 110 as shown is sufficiently complex that a manual setup for the microphone system is most likely required for the purpose of establishing coverage zone areas between microphones, gain structure and microphone gating levels of the microphones 106, including feedback and echo calibration of the system 110 before it can be used by the participants 107 in the room 112. As the participants 107 move around the room 112, the audio conference system 110 will need to determine the microphone 106 with the best audio pickup performance in real-time and adjust or switch to that microphone 106. Problems can occur when microphone coverage zones overlap between the physically spaced microphones 106. This can create microphone 106 selection confusion especially in systems relying on gain detection and level gate thresholding to determine the most appropriate microphone 106 to activate for the talking participant at any one time during the conference call. Some systems in the current art will try to blend individual microphones through post processing means, which is also a compromise trying to balance the signal levels appropriately across separate microphone elements 106 and can create a comb filtering effect if the microphones 106 are not properly aligned and summed in the time domain. Conference systems 110 that do not have properly configured coverage zones can never really be optimized for all dynamic situations in the room 112.

For this type of system, the specific 3D location (x, y, z) of each microphone element in space is not known, nor is it determined through the manual calibration procedure. Signal levels and thresholds are measured and adjusted for based on a manual setup procedure using computer 103 connected to Audio Conference Enabled System 110 through 119 running calibration software by a trained audio technician (not shown). If the microphones 106 or speakers 105 are relocated in the room, removed or more devices are added the audio conference, manual calibration will need to be redone by the audio technician.

The size, shape, construction materials and the usage scenario of the room 112 dictates situations in which equipment can or cannot be installed in the room 112. In many situations the installer is not able to install the microphone system 106 in optimal locations in the room 112 and compromises must be made. To further complicate the system 110 installation as the room 112 increases in size, an increase in the number of speakers 105 and microphones 106 is typically required to ensure adequate audio pickup and sound coverage throughout the room 112 and thus increases the complexity of the installation, setup, and calibration of the audio conference system 110.

The speaker system 105 and the microphone system 106 may be installed in any number of locations and anywhere in the room 112. The number of devices 105, 106 required is typically dictated by the size of the room and the specific layout and intended usages. Trying to optimize all devices 105, 106 and specifically the microphones 106 for all potential room scenarios can be problematic.

It should be noted that microphone 106 and speaker 105 systems can be integrated in the same device such as tabletop devices and/or wall mounted integrated enclosures or any combination thereof and is within the scope of this disclosure as illustrated in FIG. 1B.

FIG. 1B illustrates a microphone 106 and speaker 105 bar combination unit 114. It is common for these units 114 to contain multiple microphone 106 elements in what is known as a microphone array 124. A microphone array 124 is a method of organizing more than one microphone 106 into a common array 124 of microphones 106 which consists of two or more and most likely five (5) or more physical microphones 106 ganged together to form a microphone array 114 element in the same enclosure 114. The microphone array 124 acts like a single microphone 106 but typically has more gain, wider coverage, fixed or configurable directional coverage patterns to try and optimize microphone 106 pickup in the room 112. It should be noted that a microphone array 124 is not limited to a single enclosure and can be formed out of separately located microphones 106 if the microphone 106 geometry and locations are known, designed for and configured appropriately during the manual installation and calibration process.

FIG. 1*c* illustrates the use of two microphone 106 and speaker 105 bar units (bar units) 114 mounted on separate walls. The location of the bar units 114 for example may be mounted on the same wall, opposite walls or ninety degrees to each other as illustrated. Both bar units 114 contain microphone arrays 124 with their own unique and independent coverage patterns. If the room 112 requirements are sufficiently large, any number of microphone 106 and speaker 105 bar units 114 can be mounted to meet the room 112 coverage needs and is only limited by the specific audio conference system 110 limitations for scalability. This is a typical deployment strategy in the industry and coordination and hand off between the separate microphone array 124 coverage patterns needs to be managed and calibrated for, and/or dealt with in firmware to allow the bar units 114 to determine which unit 114 is utilized based on the active speaking participant 107 location in the room, and to automatically switch to the correct bar unit 114. Mounting multiple units 114 to increase microphone 106 coverage in larger rooms 112 is common. It should be noted that each microphone array 124 operates independently of each other, as each array 124 is not aware of the other array 124 in any way plus each array 124 has its own specific microphone coverage configuration patterns. The management of multiple arrays 124 is typically performed by a separate system processor 117 and/or DSP module 113 connected through 118. Because the arrays 124 operate independently the advantage of combined the arrays and creating a single intelligent coverage pattern strategy is not possible.

FIG. 2*a* contains representative examples, but not an exhaustive list, of microphone array and microphone speaker bar layouts 114*a*, 114*b*, 114*c*, 114*d*, 114*e*, 114*f*, 114*g*, 114*h*, 114*i*, 114*j* to demonstrate the types of microphones 124 and speaker 105 arrangements that are supported within the context of the invention. The microphone array 124 and speaker 105 layout configurations are not critical and can be laid out in a linear, offset or any geometric pattern that can be described to a reference set of coordinates within the microphone and speaker bar layouts 114*a*, 114*b*, 114*c*, 114*d*, 114*e*, 114*f*, 114*g*, 114*h*, 114*i*, 114*j*. It should be noted that certain configurations where microphone elements are closely spaced relative to each other (for example, 114*a*, 114*c*, 114*e*) may require higher sampling rates to provide required accuracy. At low frequencies, the wavelengths of audio signals become much larger. To differentiate between two points of a wavelength, a larger distance is required. Therefore, if a low-frequency wavelength hits two microphones that are very close to each other, they will both show the same data. At higher frequencies, the wavelengths become shorter and the two near microphones can properly differentiate between two signals. Therefore, in order to get the benefit of having multiple microphones that are very close to each other, higher frequencies must be supported. To support higher frequencies, a higher sampling rate must be used. FIG. 2*a* also illustrates the different microphone arrangements that are supported within the context of the invention. Examples of microphone arrangements 114*a*, 114*b*, 114*c*, 114*d* and 114*e* are considered to be "microphone axis" 201 arrangements. All microphones 106 are arranged on a 1D axis. The m-axis 201 arrangement has a direct impact on the type and shape of the virtual microphone 301 coverage pattern that can be obtained from the combined microphone array as illustrated in FIG. 3*d* diagrams. Microphone arrangements 114*f*, 114*g*, 114*h*, 114*i* and 114*j* are examples of "microphone plane" 202 arrangements where the microphones have multiple m-axis 201 arrangements that can be confined to form a 2D plane. It should be noted that a microphone bar 124 can be anyone of i) m-axis 201, ii) m-plane 202 or iii) m-hyperplane 203 arrangement which is an arrangement of m-axis 201 or m-plane 202 microphones arranged to form a hyperplane 203 arrangement as illustrated in FIG. 3 series of drawings. Individual microphone bars 114 can have any one of the microphone arrangements m-axis 201, m-plane 202 or m-hyperplane 203 and/or groups or layouts of microphone bars 114 can be combined to form any one of the three microphone arrangements m-axis 201, m-plane 202 or an m-hyperplane 203.

FIG. 2*b* extends the support for speaker 105*a*, 105*b* and microphone array grid 124 to individual wall mounting scenarios. The microphones 106 can share the same mounting plane which would be considered an m-plane 202 arrangement and/or be distributed across multiple planes which would be considered an m-hyperplane 203 arrangement. The speakers 105*a*, 105*b* and microphone array grid 124 can be dispersed on any wall (plane) A, B, C, D or E and be within scope of the invention.

With reference to FIGS. 3*a*, 3*b*, 3*c*, 3*d*, 3*e*, 3*f*, 3*g*, 3*h*, 3*i*, 3*j*, 3*k*, 31, 3*m*, 3*n*, 3*o*, 3*p*, 3*q* and 3*r*, shown are illustrative examples of an m-axis 201, m-plane 202 and m-hyperplane 203 microphone 106 arrangements including the effective impact on virtual microphone 301 shape and size and coverage pattern dispersion of the virtual microphones 301 and mirrored virtual microphones 302 in a space 112. For details of how virtual microphones 301 are formed and positioned in the 3D space 112, refer to U.S. Pat. No. 10,063,987. For forming a combined array from ad-hoc arrays and discrete microphones, refer to U.S. patent application Ser. No. 18/116,632 filed Mar. 2, 2023, which is incorporated herein by reference.

It is important for the combined microphone system to be able to determine its microphone arrangement during the building of the combined microphone array. The microphone arrangement determines how the virtual microphones 301 can be arranged, placed, and dimensioned in the 3D space 112. The preferred embodiment of the invention will be able to utilize the automatically determined microphone arrangement for each unique combined microphone array 124 to dynamically optimize the virtual microphone 301 coverage pattern for the particular microphone 106 arrangement of the combined microphone array 124 installation. As more microphone elements 106 and/or arrays 124 also known as boundary devices 1302 are incrementally added to the system, the combined microphone system can further optimize the coverage dimensions of the virtual microphone 301 bubble map to the specific room dimensions and/or boundary device 1302 locations relative to each other thus creating an extremely flexible and scalable array architecture that can automatically determine and adjust its coverage area, eliminating the need for manual configuration and the usage of independent microphone arrays with overlapping coverage areas and complex handoff and cover zone mappings. The microphone arrangement of the combined array allows for a continuous virtual microphone 301 map across all the installed devices 106, 124. It is important to understand the various microphone arrangements and the coverage zone specifics that the preferred embodiment of the invention uses.

Figure 3A:
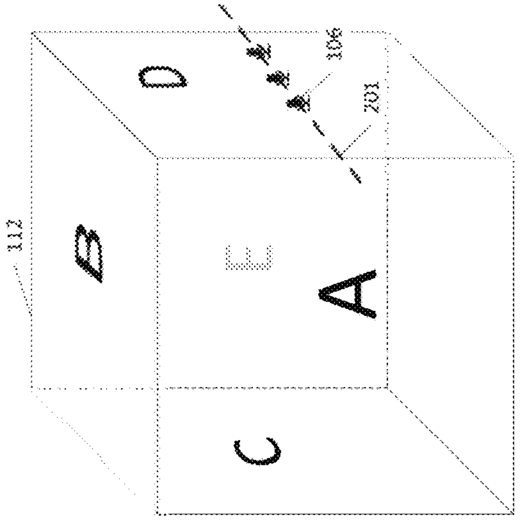
Figure 3B:
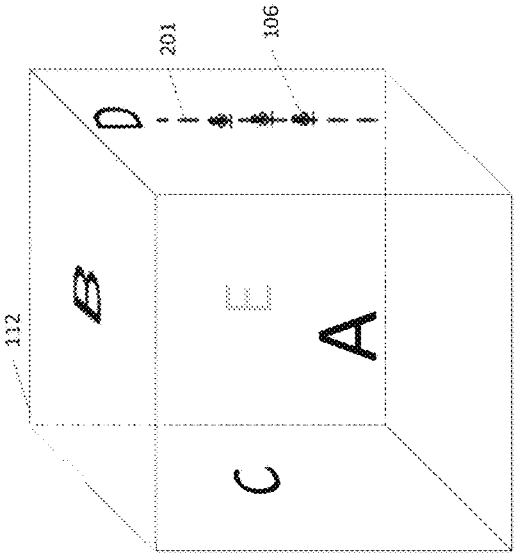
Figure 3C:
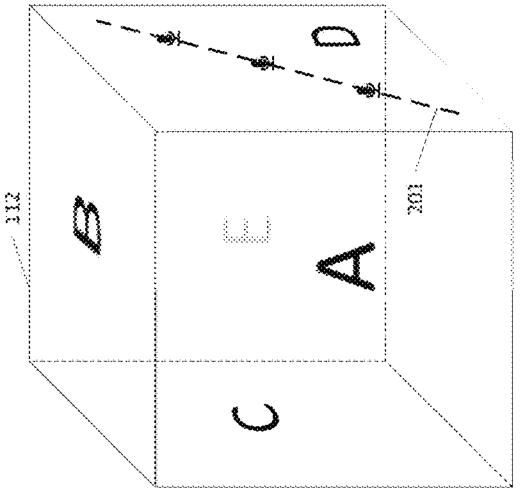
Figures 3L, 3M, 3N, 3O, 3P, 3Q:
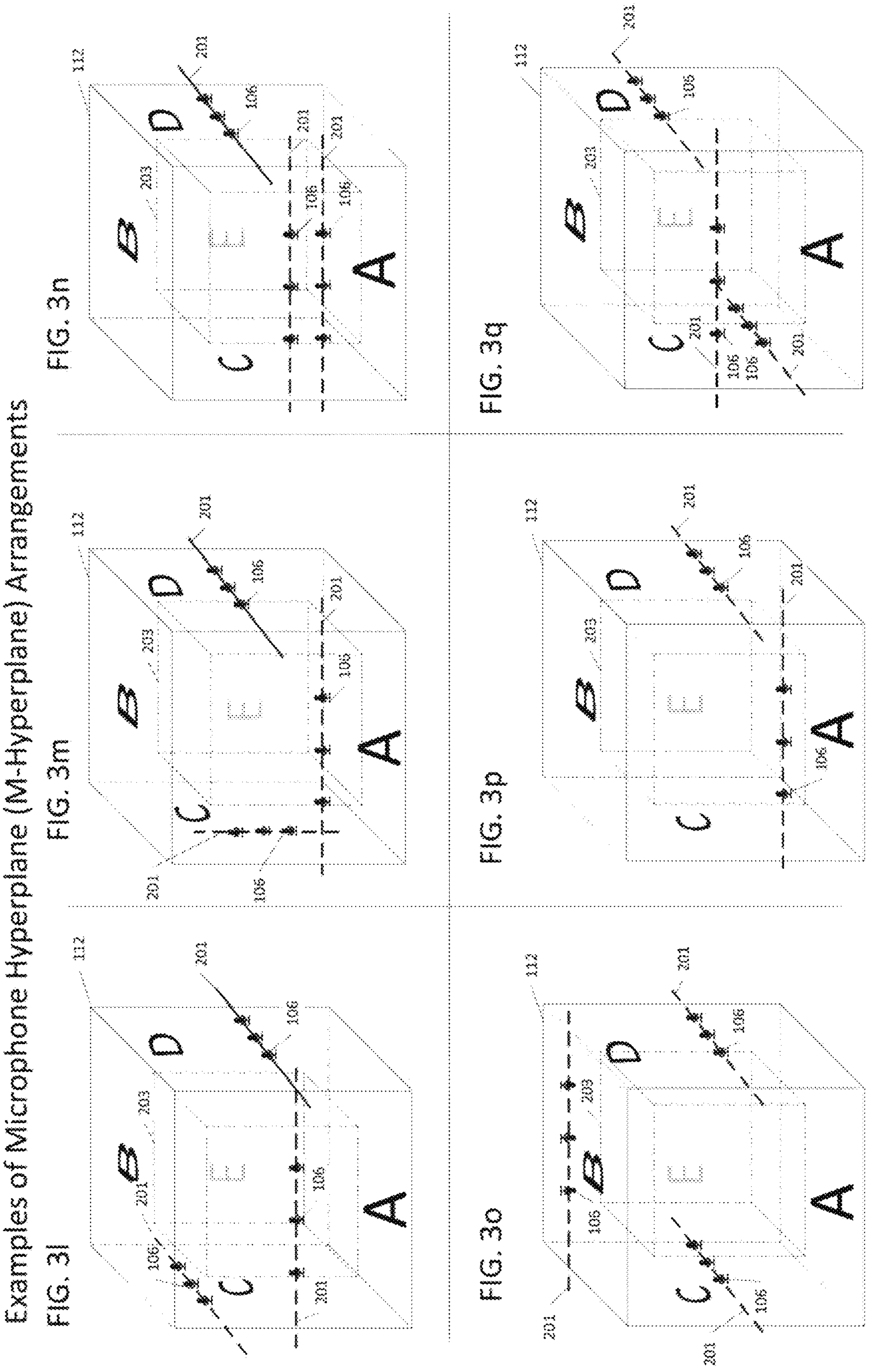

FIGS. 3*a*, 3*b* and 3*c* illustrate the layout of microphones 106 which forms an m-axis 201 arrangement. The Microphones 106 can be located on any plane A, B, C, D, and E and form an m-axis 201 arrangement. The m-axis 201 can be in any orientation; horizontal (FIG. 3*a*), vertical (FIG. 3*b*) or diagonal (FIG. 3*c*). As long as the all microphones 106 in the combined array are constrained to a 1D axis the microphones 106 will form an m-axis 201 arrangement.

FIG. 3*d* is an illustrative diagram of the virtual microphone 301 shape that is formed from an m-axis 201 arrangement and the distribution of the virtual microphones along the mounting axis of the microphone array. In this case, the mounting axis of 201 corresponds to the x-axis. Each virtual microphone 301 is drawn as a circle (bubble) to illustrate its relative position to the microphone array 124. The number of virtual microphones 301 that can be created is a direct function of the setup and hardware limitations of the system processor 117. In the case of an m-axis 201 arrangement the virtual microphone 301 cannot be resolved specifically to a point in space and instead is represented as a toroid in the 3D space. The toroid 306 is centered on the microphone axis 201 as illustrated in the side view illustration. The effect of this virtual microphone 301 toroid shape 306 is that there are always many points within the toroid 306 geometry that the m-axis 201 arrangement will be seen as equal and cannot be differentiated. The impact of this is a real virtual microphone 301 and a mirrored virtual microphone 302 on the same plane. Due to this toroid geometry, the virtual microphones cannot differentiate between spots in the z-axis. Therefore, the virtual microphones are aligned in a single x-y plane. Allocating virtual microphones in the z-dimension is not possible due to symmetry imposed by the linear array configuration. Note that each toroid will intersect with the x-y plane in two different spots. One of these is the true virtual mic location 301 and the other is a mirrored location 302 at the same distance on the opposite side of the microphone array 124. The microphone array 124 cannot distinguish between the two virtual microphone 301, 302 positions (or any along the path of the toroid). As a result of this, it is a recommended constraint that an m-axis 201 arrangement be positioned on a solid boundary layer such as wall or ceiling so the mirrored virtual microphone 302 can be ignored as sound behind the boundary (wall). Using this mounting constraint, any sound source 107 found by the array 124 will be considered to be in the room 112 in front of the front wall.

The geometric layout of the virtual microphones 301 will be equally represented in the mirrored virtual microphone plane behind the wall. The virtual microphone distribution geometries are symmetrical as represented by front of wall 307*a* and behind the wall 307*b*. The number of virtual microphones 301 can be configured to the y-axis dimensions, front of wall depth 307*a* and the horizontal-axis, width across the front of wall 307*a*. As stated previously, the same dimensions will be mirrored behind the wall. For example, the y-axis coverage pattern configuration limit 308*a* will be equally mirrored behind the wall in the y-axis in the opposite direction 308*b*. The z-axis cannot be configured due to the toroid 308 shape of the virtual microphone geometry. In other words, the number of virtual microphones 301 can be configured in the y-axis and x-axis but not in the z-axis for the m-axis 201 arrangement. As mentioned previously the m-axis 201 arrangement is well suited to a boundary mounting scenario where the mirrored virtual microphones 302 can be ignored and the z-axis is not critical for the function of the array 124 in the room 112. The preferred embodiment of the invention can position the virtual microphone 301 map in relative position to the m-axis 201 orientation and can be configured to constrain the width (x-axis) and depth (y-axis) of the virtual microphone 301 map if the room boundary dimensions are known relative to the m-axis 201 position in the room 112.

FIGS. 3*e*, 3*f*, 3*g*, 3*h*, 3*i*, and 3*j* are illustrative examples of an m-plane 202 arrangement of microphones in a space 112. To form an m-plane 202 configuration two or more m-axis 201 arrangements are required. The constraint is that the m-axis 201 arrangement must be constrained to forming only a single geometric plane which is referred to as an m-plane 202 arrangement. FIG. 3*e* illustrates two m-axis 201 arrangements, one installed on the wall "A" and one installed on wall "D" in such a manner that they are constrained to a 2D plane and forming an m-plane 202 microphone geometry. FIG. 3*f* takes the same two m-axis 201 arrangement and places it on a single wall or boundary "A". The plane orientation of the m-plane 202 is changed from horizontal to vertical and this affects the distribution of the virtual microphones 301 and mirrored virtual microphones 302 on either side of the plane and illustrated in more detail in FIG. 3*k*. FIG. 3*g* is a rearrangement of the m-axis 201 microphones 106 and puts them stacked on top of each other separated by some distance. The distance separation is not important as long as the separation from the first m-axis 201 to the second m-axis 201 ends up creating a geometric plane which is an m-plane 202 arrangement. FIG. 3*h* puts the m-axes 201 on opposite walls "C" and ""D" which will still maintain an m-plane 202 arrangement through the center axis of the microphones 106. A third m-axis 201 arrangement is added on wall "A" in FIG. 3*i* and because the m-axis 201 are distributed along the same plane the m-plane 202 arrangement is maintained. Two m-axis 201 arrangements installed at different z-axis heights opposite each other, will form a plane geometry and form an m-plane 202 arrangement. An example of this is shown in FIG. 3*j*.

FIG. 3*k* is an illustrative example of the distribution and shape of the virtual microphones 301 across the coverage area resulting from an m-plane 202 arrangement. As per an m-axis 201 arrangement there will be two virtual microphones, a real virtual microphone 301 and a mirrored virtual microphone 302 that will be represented on either side of the m-plane 202. The array 124 cannot distinguish a sound source 107 as being different from the front of the m-plane 202 to the back of the m-plane 202 as there will be a virtual microphone 301 that will share the same time difference of arrival values with a mirrored virtual microphone 302 on the other side of the m-plane 202. As per the m-axis 201 it is best to mount an m-plane 202 arrangement on a physical boundary such as a wall or ceiling for example so the mirrored virtual microphones 302 can be ignored in the space 112. Unlike an m-axis 201 arrangement the shape of the virtual microphone (bubble) 301, 302 can now be considered as a point source in the 3D space 112 and not as a toroid 306. This has the distinct advantage of being able to distribute virtual microphones 301 in the x-axis, y-axis and z-axis in a configuration based on the microphone 106, 124 locations and room boundary conditions to be further explained in detail. It is important to mount the m-plane 202 to utilize the virtual microphone 301 in front of the plane to the best advantage for the usage of the space 112. The virtual microphone 301 coverage dimensions can be configured and bounded in any axis. The number of virtual microphones 301 can be determined by hardware constraints or a configuration setting by the user or automatically determined and optimized based on the installed combined microphone array 124 location and number of boundary devices 1302 in FIG. 13*b* allowing for a per room installed configuration. An m-plane 202 arrangement allows for the automatic and dynamic creation of a specific and optimized virtual microphone 301 coverage map over and above an m-axis 201 arrangement. The m-plane 202 has at least one boundary device 1302 on the plane and perhaps two or more boundary devices 1302 depending on the number of boundary devices 1302 installed and their orientation to each other. Note that in an m-plane 202 arrangement, due to the mirrored virtual microphones 302, all virtual microphones 301 must be placed on one side of the m-plane 202. Therefore, the m-plane 202 acts as a boundary for the coverage zone dimensions. This means at least one dimension will be restrained by the plane. If there are boundary devices 1302 within the plane, further dimensions could also be restrained, depending on the nature of the boundary device 1302. As a result, a further preferred embodiment of the invention can specifically optimize the virtual microphone 301 coverage map to room boundaries and/or boundary device placement 1302. This is further detailed later in the specification.

FIGS. 3*l*, 3*m*, 3*n*, 3*o*, 3*p* and 3*q* are illustrative examples of an m-axis 201 and m-planes 202 arranged to form an m-hyperplane 203 arrangement of microphones 106 resulting in a virtual microphone 301 distribution that is not mirrored on either side of an m-plane 202 nor is it rotated around the m-axis 201 forming a toroid 306 shape. The hyperplane 203 arrangement is the most preferable microphone 106 arrangement as it affords the most configuration flexibility in the x-axis, y-axis and z-axis and eliminates the mirrored virtual microphone 302 geometry. This means that although the microphones 106 are illustrated as being shown as mounted to a boundary they are not constrained to a boundary mounting location and can be offset, suspended and/or even table mounted, and optimal performance is maintained as there is no mirrored virtual microphones 302 to be accounted for. As per the m-plane 202 arrangement all virtual microphones 301 are considered to be a point source in space.

For simplicity the illustration of the m-hyperplane 203 is shown as cubic however it is not constrained to a cubic geometry for virtual microphone 301 coverage map form factor and instead is meant to represent that the virtual microphones 301 are not distributed on an axis or a plane and thus incurring the limitations of those geometries. The virtual microphones 301 can be distributed in any geometry and pattern supported by the hardware and mounting locations of the individual arrays 124 within the combined array and be considered within the scope of the invention.

FIG. 3*r* illustrates a potential virtual microphone 301 coverage pattern that is obtained from an m-hyperplane 203 arrangement. There are no mirrored virtual microphones 302 to be accounted for as the 3rd mounting axis of the m-hyperplane 203 arrangement eliminates any duplicate time of arrival values to the combined microphone array from the sound source in the 3D space 112. The hyperplane 203 arrangement supports any distribution, size and position of virtual microphones 301 in the space 112 that the hardware and mounting locations of the microphone array 124 can support thus making it the most flexible, specific and optimized arrangement for automatically generating and placing the virtual microphone 301 coverage map in the 3D space 112.

With reference to FIGS. 4*a*, 4*b*, 4*c*, 4*d*, 4*e* and 4*f*, shown are current art illustrations showing common microphone deployment locations and the effects on microphone bar 114*a* coverage area overlapping 403, resulting in issues that can arise when the microphones are not treated as a single physical microphone array with one coverage area. It is important to understand how current systems in the art are not able to form a combined microphone array and thus are not able to dynamically create a specific coverage pattern that is optimized for each space 112 that the array system is installed in.

FIG. 4*a* illustrates a top-down view of a single microphone and speaker bar 114*a* mounted on a short wall of the room 112. The microphone and speaker bar array 114*a* provides sufficient coverage 401 to most of the room 112, and since a single microphone and speaker bar 114*a* is present, there are no coverage conflicts with other microphones 106 in the room 112.

FIG. 4*b* illustrates the addition of a second microphone and speaker bar 114*b* in the room 112 on the wall opposite of the microphone and speaker bar 114*a* unit. Since the two units 114*a*, 114*b* are operating independently of each other, their coverage patterns 401, 402 are significantly overlapped in 403. This can create issues as both devices could be tracking different sound sources and/or the same sound source making it difficult for the system processor 117 to combine the signals into a single, high-quality audio stream. The depicted configuration is not optimal but none-the-less is often used to get full room coverage and participants 101, 107 will most likely deal with inconsistent audio quality. The coverage problem still exists if the second unit 114*b* is moved to a perpendicular side wall as shown in FIG. 4*c*. The overlap of the coverage patterns changes but system performance has not improved. FIG. 4*d* shows the two devices 114*a* and 114*b* on opposite long walls. Again, the overlap of the coverage patterns has changed but the core problem of the units 114*a*, 114*b* tracking of individual and/or more than one sounds sources remains. FIG. 4*e* depicts both units 114*a*, 114*b* on the same long wall with essentially the same coverage zone 401, 402 overlap with no improvement in overall system performance. Rearranging the units 114*a*, 114*b* does not address the core issues of having independent microphones covering a common space 112.

FIG. 4*f* further illustrates the problem in the current art if we use discrete individual microphones 106*a*, 106*b* installed in the ceiling to fill gaps in coverage. Microphone 106*a* has coverage pattern 404 and microphone 106*b* has coverage pattern 405. Microphone array 114*a* is still using coverage pattern 401. All three (3) microphones 114*a*, 106*a*, 106*b* overlap to varying degrees 407 causing coverage conflicts with certain participants at one section of the table 108. All microphones are effectively independent devices that are switched in and out of the audio conference system 110, either through complex logic or even manual switching resulting in a suboptimal audio conference experience for the participants 101, 107.

With reference to FIGS. 5*a*, 5*b*, 5*c*, 5*d*, 5*e*, 5*f*, and 5*g*, illustrated are the result of a combined array (see U.S. patent application Ser. No. 18/116,632 filed Mar. 2, 2023) to overcoming limitations of independent units 114*a*, 114*b*, 106*a*, 106*b* with disparate coverage patterns from individual microphone elements or arrays 114*a*, 114*b*, 106*a*, 106*b*, regardless of mounting location, which can be calibrated and configured to perform as a single cohesive physical array system with a consolidated coverage area 501 thus eliminating the complex issues of switching, managing and optimizing individual microphone elements 114*a*, 114*b*, 106*a*, 106*b* in a room 112. When combined the microphone arrangements being m-axis 201, m-plane 202 or m-hyperplane 203 can be utilized by the preferred embodiment of the invention to create optimal coverage patterns which can be automatically derived for each unique room installation of the combined microphone array.

FIG. 5*a* illustrates a room 112 with two microphone and speaker bar units 114*a* and 114*b* installed on the same wall. Before auto-calibration, the two units 114*a*, 114*b* are operating as independent microphone arrays 114*a*, 114*b* in the room with disparate 401, 402 and overlapping 403 coverage patterns leading to inconsistent audio microphone pickup throughout the room 112. The same challenges are present when participants 107 are moving about the room 112 and crossing through the independent coverage areas 401, 402 and the overlapped coverage area 403. After auto-calibration is performed, the two units 114*a* and 114*b* will be integrated and operate as a single physical microphone array system 124 with one overall coverage pattern 501 as shown in FIG. 5*b* that the audio conference system 110 can now transparently utilize as a single microphone array 124 installation in the room 112. Because all microphones 114*a*, 114*b* are utilized in the combined array 124, optimization decisions and selection of gain structures, microphone on/off, echo cancellation and audio processing can be maximized as if the audio conference system 110 was using a single microphone array system 124. The auto-calibration procedure run by the system processor 117 allows for the system to know the location (x, y, z) of each speaker 105 and microphone 106 element in the room 112. This gives the system processor 117 the ability to perform system optimization, setup and configuration that would not be practical in an independent device system. As previously described, current art systems primarily tune speaker and microphone levels to reduce feedback and speaker echo signals with tradeoffs being made to reduce either the speaker level or microphone gain. These tradeoffs will impact either the local conference participants with a lower speaker signal or remote participants with a lower microphone gain level. Through the auto-calibration procedure in the described invention knowing the relative location of every speaker and microphone element, the system processor can better synchronize and optimize the audio processing algorithms to improve echo cancelation performance while boosting both speakers 105 and microphones 106 to more desirable levels for all participants 107.

FIGS. 5*c* and 5*d* further illustrate how any number of microphone and speaker bars 114*a*, 114*b*, 114*c*, 114*d* (four units are shown but any number is within scope of the invention) with independent coverage areas 401, 402, 404, 405 can be calibrated to form a single microphone array 124 and coverage zone 501. FIG. 5*e* shows four examples of preferred configurations for mounting units 114*a*, 114*b*, 114*c* in the same room space 112 in various fully supported mounting orientations. Although the bars 114*a*, 114*b*, 114*c* are shown mounted in a horizontal orientation, the mounting orientation is not critical to the calibration process meaning that the microphones 106 can be located (x, y, z) in any orientation and on any surface plane and be within scope of the preferred embodiment of the invention. The system processor 117 is not limited to these configurations as any microphone arrangement can be calibrated to define a single microphone array 124 and operate with all the benefits of location detection, coverage zone configurations and gain structure control.

FIGS. 5*f* and 5*g* extend the examples to show how a discrete microphone 106, if desired, can be placed on the table 108. Without auto-calibration, microphone 106 has its own unique and separate coverage zone 404. After auto-calibration of the microphone systems 114*a*, 114*b*, 106, all microphone elements, are configured to operate as a single physical microphone array 124 with a consolidated coverage area 501. Once the combined array is formed the preferred embodiment of the invention can automatically determine virtual microphone 301 distribution, placement and coverage zone dimensions and size can be determined and optimized for each individual and unique room 112 installation without requiring the need for complex configuration management.

With reference to FIG. 6, shown is an example of the basic coordinate layout with respect to the room 112. The x-axis represents the horizontal placement of the microphone system 124 along the side wall. The y-axis represents the depth coordinate in the room 112 and the z-axis is a coordinate representation of the height in the room 112. The axes will be referenced for both microphone array 124 installation location and virtual microphone 301 distribution throughout the room 112 in the specification. Optimizing the placement of a combined array can be done by knowing the microphone arrangement of m-axis 201, m-plane 202 and m-hyperplane 203. The installer can optimize the placement of the combined array to maximize the benefit of the microphone arrangement geometry while minimizing the impact of the mirrored virtual microphones 302. The optimization of the combined array can be further enhanced by knowing the installation location of the boundary devices 1302 relative to each other and relative to the room 112 boundaries such as the walls, floor or ceiling.

With reference to FIGS. 7*a*, 7*b* and 7*c*, illustrated are the effect of placement of an m-plane 202 arrangement in a 3D space and how preferably thorough placement of the virtual microphones 301 can be positionally optimized while the mirrored virtual microphones 302 are positionally minimized.

FIG. 7*a* illustrates an m-plane 202 arrangement of microphones 106 installed halfway up the room 112 on the z-axis 701 dimension. There is an equal number of virtual microphones 301 and mirrored virtual microphones 302 allocated in the room 112. This would not be considered an ideal placement of the m-plane 202 arrangement since a sound source could not be distinguished in the (x, y, z) as being above or below the center axis of the m-plane 202. FIG. 7*b* (side view) illustrates a preferred placement of the m-plane 202 closer to the ceiling of the room 122, As a result of the close proximity placement to the physical room boundary, almost all the mirrored virtual microphones 302 can be ignored and the system processor 117 can use the virtual microphones 301 only for sound source detection and (x, y, z) determination in the space 112. FIG. 7*c* illustrates the same concept, positioning the m-plane 202 in proximity to the floor.

With reference to FIGS. 8*a* and 8*b*, illustrated are how the virtual microphones 301, 302 are distributed when the m-plane 202 forms a diagonal plane. The distribution of virtual microphones 301 and mirrored virtual microphones 302 are the same as any m-plane 202 arrangement; however, the virtual microphone 301 grid will be tilted to be parallel to the m-plane 202 slope. Because the combined microphone array is aware of the relative location of microphone array 124 to a reference point and the orientation of the individual microphone arrays 124 are known within the combined microphone array, the slope of the m-plane 202 formed between the arrays 124 will be accounted for as part of the automatic virtual microphone 301 map creation. In FIG. 8*c* a third m-axis 201 has been added to the combined array and as a result the m-plane 202 arrangement is replaced with an m-hyperplane 203 arrangement. The impact is that the mirrored virtual microphones 302 are eliminated and the m-plane 202 virtual microphones 301 constraints are removed resulting in an optimized virtual microphone 301 coverage zone for the room 112 by the virtual microphone (bubble map) position processor 1121.

With reference to FIGS. 9*a* and 9*b*, shown are illustrative drawings further outlining a few more variations on the m-hyperplane 203 virtual microphone 301 coverage. As long as an m-hyperplane 203 is established, the virtual microphone 301 coverage pattern can be the same. As more m-axis 201 and m-plane 202 arrangements are added there is a corresponding improvement in sound source 107 targeting accuracy and in the ability to more precisely configure the virtual microphone 301 map density, dimensions and placement.

With reference to FIGS. 10*a* and 10*b*, shown are illustrations placing the m-plane 202 plane on the appropriate z-axis to account for noise sources 1001 and coverage pattern configurations. In FIG. 10*a* a noise source 1001 is installed in the ceiling of the room. An m-plane 202 arrangement of microphones 106 are installed in the room 112 such that the plane of the m-plane 202 is sufficiently high on the z-axis that the noise source 1001 is situated in a row of mirrored virtual microphones 302 that correspond to the virtual microphones 301 that are not used below the m-plane 202. The result of this placement of the m-plane 202 is that the virtual microphones 301 above 1003*a* and as a result the corresponding mirrored virtual microphones 302 below 1003*b* in the ignored window zone can be switched off or ignored by the system processor 117 as they are not required to support the needed room 112 coverage. Alternatively, those virtual microphones 301 could be reallocated inside of the primary virtual microphone 301 coverage zone 1002 to provide higher-resolution coverage. The virtual microphones 301 in region 1002 which approximately corresponds to the standing head height of the participant 107 and the start of the ignored window 1003*a* on the z-axis can be switched on. Since the corresponding mirrored virtual microphones 302 will be effectively above the ceiling, the noise source 1001 will not be targeted and will be ignored, improving the targeting and audio performance of the microphone array in the room 112 substantially. This is a prime example of the combined array knowing its relative location in the room 112 to the room boundaries and automatically adjusting the virtual microphone 301 coverage map to optimize the rejection of noise sources 1001 while optimizing and prioritizing the participants 107 space in the room 112.

FIG. 10*b* further optimizes the virtual microphone 301 coverage pattern by not only accounting for the noise source 1001 but also accounting for the height of a table 108 in the room 112. Since the height of the table 108 is a known dimension in the z-axis the bubble map positioner processor 1121 can limit the extent of the virtual microphone 301 bubble map in the z-axis direction by not distributing or allocating any virtual microphone 301 below the z-axis dimension of the table 108 height. This optimization helps to eliminate unwanted pickup of sounds at or below the table 108 and thus reducing distractions for the far-end remote user 101.

FIG. 10*c* illustrates the same concept and principals with an m-hyperplane 203 arrangement installed in the room 112. The added benefit of the m-hyperplane 203 is that the virtual microphone 301 bubble map is not constrained to a plane and the virtual microphone 301 bubble map 1005 distribution can be configured preferably to the m-hyperplane 203 placement in the room 112. The lower virtual microphone 301 z-axis limit 1004*a* and the upper z-axis limit 1004*b* can configured as input parameters or derived based on the m-hyperplane 203 installation and calibration procedure.

With reference to FIG. 11*a*, shown is a block diagram showing a subset of high-level system components related to a preferred embodiment of the invention. The three major processing blocks are the Array Configuration and Calibration 1101, the Targeting Processor 1102, and Audio Processor 1103. The invention described herein involves the Array Configuration and Calibration block 1101 which finds the location of physical microphones 106 throughout the room and uses various configuration constraints 1120 to create coverage zone dimensions 1122 which are then used by the Targeting Processor 1102. The physical microphone 106 location can be found by injecting a known signal 1119 to the speakers 105 and measuring the delays to each microphone 106. This process is described in more details in U.S. patent application Ser. No. 18/116,632 filed Mar. 2, 2023. Once the location of all physical microphones 106 has been determined, the next step is to create coverage zone dimensions and populate the coverage zone dimensions with virtual microphones 301. Herein, populating the coverage zone dimensions with the virtual microphones includes densely or non-densely (or sparsely) filling the coverage zone dimensions with the virtual microphones and uniformly or non-uniformly placing the virtual microphones in the coverage zone dimensions. Any number of virtual microphones can be contained in the coverage zone dimensions. The Targeting Processor 1102 utilizes the generated coverage zone dimensions to track potential sound sources 107 in the room 112 and, based on the location of the selected target, sends additional information 1111 to the Audio Processor 1103 specifying how the microphone elements 106 are to be combined and how to apply the appropriate gain 1116 for the selected location. The Audio Processor 1103 performs a set of standard audio processing functions including but not limited to echo cancellation, de-reverberation, echo reduction, and noise reduction prior to combining the microphone 106 signals and applying gain; however, certain operations may be undertaken in a different sequence as necessary. For example, with a less powerful System Processor 117, it may be desirable to combine the microphone 106 signals and apply gain prior to echo and noise reduction or the gain may be applied after the noise reduction step. This invention regards the creation of the coverage zone dimensions and virtual microphones 301 based on the known physical location of the microphones 106. FIGS. 11*b* and 11*c* are modifications of the bubble processor figures FIGS. 3*a* and 3*b* in U.S. Pat. No. 10,063,987. FIG. 11*b* describes the target processor 1102. A sound source is picked up by a microphone array 124 of many (M) physical microphones 106. The microphone signals 1118 are inputs to the mic element processors 1101 as described in FIG. 11*c*. This returns an N*M*Time 3D array of each 2D mic element processor output 1120 that then sums all (M) microphones 106 for each bubble n=1 . . . N in 1104. This is a sum of sound pressure that is then converted to power in 1105 by squaring each sample. The power signals are then preferably summed over a given time window such as 50-100 ms by the N accumulators at node 1107. The sum represents the signal energy over that given time period. The processing gain for each bubble 301 is preferably calculated at node 1108 by dividing the energy of each bubble 301 by the energy of an ideal unfocused signal 1122. The unfocused signal energy is preferably calculated by summing in 1119 the energies of each microphone signal 1118 over the given time window, weighted by the maximum ratio combining weight squared. This is the energy that we would expect if all the signals were uncorrelated. The processing gain 1108 is then preferably calculated for each virtual microphone bubble 301 by dividing the microphone array signal energy by the unfocused signal energy 1122. Node 1106 searches through the output of the processing gain unit 1108 for the bubble 301 with the highest processing gain. This will correspond to the active sound source. FIG. 11*c* shows the Mic Element Processor 1101. Individual microphone signals 1118 are passed through a precondition process 1117 that can filter off undesired frequencies such as frequencies below 100 Hz that are not found in typical voice bands from the signal before being stored in a delay line 1111. The Mic Element Processor 1101 uses the delay 1112 and weight 1114 from each bubble 301 (*n*) to create the N*Time 2D output array 1120. Each entry is created by multiplying the delayed microphone by the weight in 1123. The weight and delay of each entry are based on the bubble position 1115 and the delay 1116 from the microphone 106 to that bubble 301. The position of all N bubbles 301 gets populated by the Bubble Map Positioner Processor 1121 based on the location of the available physical microphones 106 as described in FIG. 12*a*.

With reference to FIG. 12*a*, shown is a flowchart detailing the process involved in the Bubble Map Positioner Processor 1121 presented in FIG. 11*c*. The first step S1201 is to determine the coverage dimensions. They can be entered manually to specify a desired coverage zone or preferably, the coverage dimensions can be assumed from the positions of various boundary devices 1302 throughout the room 112 such as wall-mounted microphones, ceiling microphones and table-top microphones. This is represented by step S1202 and is further described in FIGS. 13*a* to 19*b*. In any practical implementation of the Bubble Map Positioner Processor 1121, three different parameters will be restrained by the processing resources available to the algorithm. More specifically, this can be defined by, but not limited to, the memory and processing time available to a hardware platform. The constraints from the bubble processor 1102 may include one or more of hardware/memory resources (e.g. the buffer length of a physical microphone 106), the number of physical microphones 106 that can be supported and the number of virtual microphones 301 that can be allocated. The bubble map positioner processor 1121 will optimize the placement of virtual microphones 301 based on these constraints. The first constraint that must be satisfied is the buffer length of each microphone 106. Step S1203 finds the maximum distance difference $d_{max}$ between any pair of microphones 106 in the coverage zone. The two microphones 106 this corresponds to are named $m_i$ and $m_j$. An example of this is shown in FIG. 21*a*. Here, assuming coverage zone dimensions that cover the entire room 112, distance 2101 between physical microphones 106*a* and 106*b* corresponds to the maximum distance difference $d_{max}$ between any pair of microphones 106 in the system. Hence, microphone 106*a* and 106*b* are $m_i$ and $m_j$ for this configuration. This is also shown with distance 2102 in FIG. 21*b*. Alternatively, the coverage zone dimensions are not restrained to encompass all physical microphones 106. In such a case, the maximum distance difference $d_{max}$ between any two microphones 106 can be smaller than the distance between those two microphones 106. This is shown in FIG. 21*d*. Here, the distance 2104 is smaller than the distance between microphones 106*b* and 106*a* but still corresponds to $d_{max}$ for this configuration. S1204 describes how $d_{max}$ can be converted to a delay of $t_{max}$ and S1205 describes how $t_{max}$ can then be converted to a buffer length L. L is then checked to see if it meets the hardware constraint in S1206. If not, one of the two physical microphones 106 $m_i$ and $m_j$ must be removed from the system. First, microphone 106 priorities are assigned in S1227. This process is described in more detail in FIG. 12*b*. Then, the lowest priority microphone out of $m_i$ and $m_j$ is removed in S1213. An example of this can be found in FIG. 21*c*. Here, the distance between physical microphones 106*b* and 106*a* is found to exceed the hardware constrain so lower-priority microphone 106*b* is removed from the system. S1203, S1204, S1205, S1227 and S1213 are repeated until L for all remaining microphones 106 to satisfy the hardware constraints. Note that this involves re-assigning $m_i$ and $m_j$ every time. For example, in FIG. 21*c*, after microphone 106*b* is removed, the new distance to check would become 2103 and $m_i$ and $m_j$ would become microphones 106*c* and 106*a*. The next step S1207 is to check the hardware constraints against the remaining number of microphones 106. If the remaining number of microphones 106 exceeds the constraints, lower-priority microphones 106 must be removed using S1227 and S1208 until this constraint is met. After this, the virtual microphones 301 can be aligned throughout the coverage dimensions. S1209 checks the alignment of the remaining physical microphones 106 to determine the optimal alignment strategy. If all remaining physical microphones 106 form a microphone axis 201, the virtual microphones 301 are aligned by S1210 in a single plane on one side of the microphone axis 201. An example of this configuration can be found in FIG. 3*d*. Alternatively, if the remaining physical microphones 106 form a microphone plane 202, the virtual microphones 301 are aligned by S1211 in a 3-dimensional pattern on one side of the microphone plane 202. An example of this can be seen in FIG. 3*k*. Lastly, if the remaining physical microphones 106 form a microphone hyperplane 203, the virtual microphones 301 can be aligned by S1212 in a 3-dimensional pattern throughout the space 112. An example of this can be found in FIG. 3*r*. For S1210-S1212, preferably the maximum number of virtual microphones 301 allowed by the hardware constraint should be allocated to populate the coverage dimensions as thoroughly as possible.

FIG. 12*b* depicts S1227 in more detail. More specifically, this is a flowchart describing the process of assigning individual microphone 106 priorities to all microphones 106 in the system. This can be done differently based on what optimization criteria are selected in S1222. For example, three different criteria are presented here, however, the invention is not limited to these three and other optimization criteria should be considered to be within scope of the invention. The first is dimensionality, which affects the layout options that are available. Greater dimensionality removes the issues associated with mirrored virtual microphones 302 presented in FIGS. 10*a* and 10*b* and the toroid-shaped virtual microphones 306 presented in FIG. 3*d*. This process S1223 is described in more details in FIG. 12*c*. The second criteria presented is coverage. Optimizing for coverage means that the physical microphones 106 will be distributed more widely throughout the coverage space 112, giving more consistent pickup across all virtual microphones 301. This is shown in S1224 and described in more detail in FIG. 12*d*. The third criteria presented here is to optimize for echo-cancellation. In the case where microphones 106 and speakers 105 are both present in the room 112, the microphones 106 that are closest to the speakers 105 will experience more echo. Therefore, they should be given lower priority. This is shown in S1225 and described in more detail in FIG. 12*e*. Lastly, S1226 describes any other optimization criteria desired. For example, this could be any combination of the three other criteria described in S1223, S1224 and S1225. Once all microphone 106 priorities are set in S1229, this process exits in S1230 by returning to step S1227 in FIG. 12*a*.

FIG. 12*c* describes the process of assigning microphone 106 priority to optimize for dimensionality. In S1210, this first checks if all microphones 106 form an m-hyperplane 203. If so, 51215 checks if removing an individual microphones 106 will cause the other microphones 106 to still form an m-hyperplane 203. If so, this individual microphone 106 can have its priority reduced in S1216. If not, priority should be raised in S1217. If the microphones 106 do not form an m-hyperplane 203, the next step in S1221 is to check if they form an m-axis 201. If so, each microphone 106 should have the same priority so individual priority can be reduced. If not, by definition, the microphones 106 must form an m-plane 202. In that case, S1214 checks to see if removing an individual microphone 106 will cause the remaining microphones 106 to form an m-axis 201. If so, this individual microphone 106 should be preserved, and its priority is raised in S1217. If not, the priority of this microphone 106 can be reduced in S1216. This process exits in step S1228 by returning to step S1223 in FIG. 12*b*.

FIG. 12*d* describes the process of assigning microphone 106 priority to optimize coverage. This consists of two steps. The first, shown in S1218, is to see if the microphone 106 is close to the intended coverage dimensions. If not, the microphone 106 has its priority lowered in S1216. If the microphone 106 is close to the coverage zone, the next step in S1219 is to check how close it is to other microphones 106. If it is far from the other microphones 106, this individual microphone 106 has its priority raised in S1217. If not, its priority can be reduced. This will distribute the physical microphones 106 as evenly as possible throughout the intended coverage dimensions to give the best coverage possible. This process exits in step S1231 by returning to step S1224 in FIG. 12*b*.

FIG. 12*e* describes the process of assigning microphone 106 priority to optimize echo-cancellation. This will attempt to place the microphones 106 as far away from the speakers 105 as possible. This is a simple matter of reducing priority for microphones 106 that are close to speakers 105 in S1216 and raising priorities for the rest in S1217 as determined in S1220. This process exits in step S1232 by returning to step S1225 in FIG. 12*b*.

FIGS. 13*a* and 13*c* show a space 112 where the coverage zone dimensions are unknown and all physical microphones 106 are found to be in one single-boundary device 1302. Since the coverage zone dimensions are unknown, it is assumed that the entirety of room 112 is the optimal coverage space. FIG. 13*b* is an example of a boundary device 1302 that will be used in the 3D space 112 to define x-axis, y-axis and z-axis coverage zone dimension constraints based on configuration parameters. A boundary device can contain any microphone arrangement such as m-axis 201, m-plane 202, or an m-hyperplane 203 and would be considered within scope of the invention. An example of the boundary device 1302 configuration parameters is contained in TABLE 1. Boundary device 1302 has the following configuration settings; x-boundary=0 (off), y-boundary=1 (on), z-boundary=0 (off) and since is it the only device 1302 the Reference=1 (on). By enabling the boundary device 1302 settings in each axis the coverage zone can be constrained in that axis to not exceed that axis plane. In this example boundary device 1302 is limiting the y-axis. For simplicity, the boundary device 1302 is assumed to be a wall-mounted m-plane 1302 also referred to as a boundary device as shown in FIG. 13*b*. In this case, this wall-mounted m-plane 1302 array is identified as a single-boundary device with a y-axis boundary of one. This means that 1302 represents a boundary in the y-axis. Since 1302 is the only boundary device 1302 in the system, this is also by default assigned to be the reference device. This means that the axes defined in FIG. 6 are placed in reference to 1302. In other words, the y-axis extends in direction 1301*c*, and the x-axis extend in directions 1301*b* and 1301*a*. The z-axis extends above and below the device 1302. This is equivalent to placing the m-plane 202 in an x-z plane. Note that in this case, since 1302 is a y-axis boundary device, the coverage zone dimensions only extend in the positive y-axis 1301*c*. This is equivalent to placing a y-axis boundary at the location of 1302. For example, if 1302 was assigned to be the origin with a y-axis coordinate of 0, the y-axis boundary would exist at y=0. For illustration simplicity, 1302 was drawn as an m-plane 202. Note that this setup could be extended to other cases to fit the m-axis 201 scenario described in FIG. 3*d*. This would require adjustment of virtual microphones 301 in the z-axis dimensions to be in a single layer. It could also be represented to use a ceiling-mounted array 124 instead of a wall-mounted one. For illustrative purposes, only the case of a wall-mounted m-plane array 1302 is shown, however, all other microphone arrangements are supported and considered in scope of the invention. In this configuration, the virtual microphones 301 are arbitrarily placed in front of the m-plane 202 of 1302 with the physical microphones 106 set in the middle. This is equivalent to spreading the virtual microphones 301 in directions 1301*a*, 1301*b* and 1301*c* arbitrarily with directions 1301*a* and 1301*b* having equal distribution. Since the rest of the room 112 dimensions are unknown, placing the coverage zone dimensions in the middle of this space maximizes the efficiency of the microphones 106. Note that in this case, all microphones 106 in the system form an m-plane 202 and the mirrored virtual microphones 302 are mirrored on the other side of the m-plane 202 plane as described in FIG. 3*k*, outside of the zone boundary. If the zone boundary is a wall-mounted array 124 such as is the case illustrated here, the mirrored virtual microphones 302 are placed behind the wall, which minimizes their impact on the system. This is because the wall should already attenuate most sounds coming from that region anyways. FIG. 13*a* is the top-down view and FIG. 13*c* is the side-view of the same diagram.

FIGS. 14*a* and 14*b* show a space 112 where the coverage zone dimensions are unknown, and all physical microphones 106 are found to be in two single-boundary devices 1302*a* and 1302*b*. Since the coverage zone dimensions are unknown, it is assumed that the entirety of room 112 is the optimal coverage space. In this case, there are two boundary devices 1302*a*, 1302*b* that could each serve as the reference device. For this illustration, 1302*a* is assigned to be the reference device. This means the x, y and z axes will be placed in reference to 1302*a*. 1302*a* is also designated as a y-axis boundary, meaning that virtual microphones 301 will only extend in direction 1301*c* from the boundary of 1302*a*. Likewise, 1302*b* is designated as an x-axis boundary so the virtual microphones 301 will only extend in direction 1301*a* from device 1302*b*. This is equivalent to extending the m-planes 202 of 1302*a* and 1302*b* along lines 1403 and 1401 respectively until the intersection point 1402 is reached. 1402 is assumed to represent a corner of the room 112 so the microphones 106 are aligned arbitrarily along directions 1301*c* and 1301*a* from point 1402. In this configuration, the boundary devices 1302*a*, 1302*b* are spread out across different heights. Since the height of the room 112 is unknown, the coverage zone z-axis dimensions are centered around the average of the microphone 106 heights. This illustration is shown to use two m-plane 202 boundary devices 1302*a*, 1302*b* as defined in FIG. 13B. Here, since the mounting heights and orientation of the two devices 1302*a*, 1302*b* are different, the devices could be represented as m-axis 101 arrays and the combination of all microphones 106 would remain an m-hyperplane 203. Therefore, the illustrated virtual microphones 301 would remain the same. If they were two m-axis 201 devices of the same height, this would place all physical microphones 106 on one m-plane 202 and the virtual microphones 301 would have to be allocated as shown in FIG. 3*k*. FIGS. 14*c* and 14*d* show the same layout as FIGS. 14*a* and 14*b* but with 1302*b* representing a y-axis boundary instead of an x-axis boundary. In this case, the virtual microphones 301 are limited in the y-axis direction to stop at the highest y-axis value point of 1302*b*. In the x-axis direction, the virtual microphones 301 are now centered around the average of the two devices 1302*a*, 1302*b*. FIGS. 14*e* and 14*f* show the same layout again but this time with 1302*b* representing a z-axis boundary. Here, the virtual microphones 301 are limited in the z-axis direction to the upper edge of 1302*b*.

FIGS. 15*a* and 15*b* represent an extension of FIGS. 14*a* and 14*b* where a third boundary device 1302*c* has been found. Here, the new device 1302*c* represents a y-axis boundary. As before, the m-plane 202 of 1302*c* and 1302*b* can be extended along lines 1503 and 1501 to find the intersection point of 1502. This point, along with 1402, correspond to two corners of the coverage zone dimensions. Therefore, the virtual microphones 301 are aligned from point 1402 in direction 1301*c* until point 1502 is reached and then in direction 1301*a* arbitrarily. FIGS. 15*c* and 15*d* represent another extension of FIGS. 14*a* and 14*b*. Here, a third boundary device 1504 has been found as defined in FIG. 15*e* as a multi-boundary device consisting of a single microphone 106 that can be hung from the ceiling. 1504 is used to limit the x, y, and z axes in the coverage zone to 1505, 1503 and 1506 respectively. The x-axis and y-axis boundaries can be limited by the location of microphone 106 in 1504. However, the z-axis boundary is not limited to the microphone 106 location but rather to the location of the ceiling mount 1507. This can be done by adding a fixed offset to the z-axis boundary from the location of microphone 106. Therefore, 1504 represents a multi-boundary device where the z-axis boundary is offset from the location of the microphone 106. Since the location of microphone 106 can be found in space, the z-axis boundary can also be derived by adding this fixed offset. Alternatively, the z-axis boundary of device 1504 could be set lower than the ceiling mount or even lower than the microphone 106 if desired.

FIGS. 16*a* and 16*b* represent an extension of FIGS. 15*a* and 15*b* where a fourth boundary device 1302*d* has been found. Here, the new device 1302*d* represents an x-axis boundary. As before, the m-plane 202 of 1302*c* and 1302*d* can be extended along lines 1601 and 1603 to find the intersection point of 1602. Additionally, the m-plane of 1302*a* and 1302*d* can be extended along lines 1606 and 1604 to find the intersection point of 1605. This provides the full 2-dimensional area of the desired range. In this case, the virtual microphones 301 can be spread out to cover the desired space 112 evenly. If there are more virtual microphones 301 available per z-axis layer 1607 than required to cover the space 112 with the desired virtual microphone 301 spacing, the unused virtual microphones 301 can be redistributed to allow for more layers in the z-axis direction. Alternatively, virtual microphone 301 spacing could be reduced to create a higher resolution in the x-y axis dimensions. If there are too few virtual microphones 301 per z-axis layer to cover the desired spacing, more virtual microphones 301 can be taken from the z-axis layers and redistributed to the x-y axis dimensions. Alternatively, virtual microphone 301 spacing could be increased to create a lower resolution in the x-y axis dimensions. This concept is described in more details in figures FIGS. 23*a* to 24*f*. In this configuration, the m-planes 202 are spread out across different heights. Since the height of the room 112 is unknown, the virtual microphone 301 coverage zone is centered around the average of the microphone 106 heights.

FIGS. 17*a* and 17*b* represents an extension of FIGS. 16*a* and 16*b* where the room dimensions 112 are unknown and another boundary device 1703 has been detected on the ceiling of the room. 1703 represents a z-axis boundary device. Here, the x and y dimensions of the coverage zone remain the same as in FIG. 16*a*. The new ceiling microphone array 1703 is extended along the x-y plane of 1701 to add one more dimension to the room. Now, the virtual microphone 301 bubble map can also be limited in the z-axis direction to prevent from going above this ceiling dimension. Additionally, an offset 1702 can be specified from the ceiling to the start of the coverage zone. This prevents the virtual microphones 301 from covering unnecessary space and picking up undesired noise sources 1001 such as ceiling-mounted HVAC fans (as presented in FIG. 10*c*). Note that for this illustration, this was shown as an extension of the 4-dimensional room configuration shown in FIGS. 16*a* and 16*b*, but this z-axis layer adjustment can be applied to any configuration from FIGS. 13*a* to 15*b* in the same way. Note also that the ceiling microphone array 1703 in this case could be any number of microphones 106 in any arrangement.

FIGS. 18*a* and 18*b* represent another extension of FIGS. 16*a* and 16*b* where the room dimensions 112 are unknown and a table-top microphone 106 has been found in the room 112. This represents a z-axis boundary device 1302. Here, the x and y dimensions of the coverage zone remain the same as in FIG. 16*a*. In this case, the table-top 108 microphone 106 can be used to estimate the distance to the floor. Since table-height 108 is generally in a range between 28 and 32 inches, the floor 1801 can be assumed to be 30 inches lower than the table 108. With this, the virtual microphone 301 bubble map can be limited in the z-axis direction to start no lower than the floor. Additionally, an offset 1802 can be specified from the floor to the start of the virtual microphone 301 bubble map. In a conference room environment, there are no desired sound sources 107 along the floor of the room 112 so adding an offset prevents the virtual microphone 301 bubble map from placing virtual microphones 301 in this location and picking up undesired sound sources 1001, such as floor HVACs 1001. In an environment where it is advantageous to have virtual microphones 301 extending to the floor of the room 112 the virtual microphone map can be adjusted accordingly. This illustration is an extension of the 4-dimensional room configuration shown in FIGS. 16*a* and 16*b*, but this z-axis layer adjustment can be applied to any configuration from FIGS. 13*a* to 15*b* in the same way.

FIGS. 19*a* and 19*b* show the ideal preferred embodiment of the invention, in which all six (6) room dimensions can be found. In this case, the virtual microphones 301 can all be placed inside of the room dimensions and adjusted to fit the desired space accordingly. This will give a very close estimate to the true room dimensions 112. As in FIGS. 17*b* and 18*b*, distances 1903 and 1902 can be specified to limit the z-axis range of the virtual microphone 301 bubble map. Additionally, the virtual microphone 301 spacing can be adjusted to cover the entire desired space with the number of virtual microphones 301 available. This maximizes the efficiency of the virtual microphone 301 bubble map and prevents any virtual microphones 301 from being allocated to unnecessary or undesired zones or regions of the space 112.

FIGS. 20*a*, 20*b* and 20*c* show three different room 112 configurations where the room dimensions 112 are known. FIG. 20*a* shows a microphone plane 1302*a* on a room boundary. This is comparable to FIG. 13*a* except that the room 112 dimensions are now known. Therefore, the virtual microphones 301 can be correctly allocated throughout the room 112. FIG. 20*b* has another microphone plane 1302*b* on a separate room boundary. Likewise, FIG. 20*c* has a third microphone plane 1302*c* on another separate room boundary as well. Here, with all three configurations, the room 112 can be completely covered since the room dimensions are known. Note that in this case, it is unnecessary to analyze boundary devices 1302 since the coverage zone dimensions are already known. A reference point should still be used to derive the axes of the coverage zone dimensions. This could be one of the devices 1302 or a separate point such as a camera if desired.

FIGS. 21*a*, 21*b* and 21*d* show the measurement of $d_{max}$, the maximum distance difference between physical microphones 106 as described in FIG. 12*a*. FIG. 21*a* shows a 3-dimensional view of the measurement of $d_{max}$ in the room 112. Here, it is assumed that the entire room 112 is the intended coverage space. Microphone 106*a* on x-y plane 2105*a* and mic 106*b* on x-y plane 2105*b* are the furthest apart in this configuration. Therefore, the maximum distance difference between any pair of microphones 106 in the system is defined by 2101. FIG. 21*b* shows a 2-dimensional view of the $d_{max}$ measurement. Here, $d_{max}$ corresponds to distance 2102 between microphones 106*b* and 106*a*. The second largest distance between any pair of microphones 106 corresponds to distance 2103 between microphones 106*a* and 106*c*. In FIG. 21*b*, it is assumed that for an arbitrary hardware platform, 2102 represents a delay that exceeds the buffer length constraint as defined in FIG. 12*a*. 2103 is within the constraint. One method to solve this is to remove one of microphones 106*b* and 106*a* from the microphone arrangement. This is shown in FIG. 21*c*. Here, 106*b* is determined to be of lower priority than 106*a* using the logic outlined in FIG. 12*b*. Therefore, 106*b* is removed from the system. The new maximum distance difference is now 2103, which is within the hardware constraints. FIG. 21*d* shows another 2-dimensional view of the measurement of $d_{max}$. Here, the coverage space does not encompass all microphones 106. Therefore, in this configuration $d_{max}$ is smaller than the distance between microphones 106*b* and 106*a*. 2104 corresponds to $d_{max}$ for this configuration.

FIG. 22 shows the microphone delay table of a single virtual microphone 301 bubble. In practical implementations, each virtual microphone 301 delay in diagram 2201 corresponds to a delay line that is required in hardware. The buffer size of the delay line as presented in FIG. 12*a* will correspond to the length of 2204. 2202 represents the constant minimum delay that is added across all microphones 106. This will correspond to the delay added to the farthest microphone 106. For memory efficiency considerations, 2202 can be set to as close to zero as possible. 2205 refers to the inserted delay 2203 added to each microphone 106 to get them to sum coherently for a given virtual microphone 301. For example, if a microphone 106 is very close to the virtual microphone 301, its signal will need to be delayed greatly to sum coherently with the signal of another microphone 106 that is very far away. In this example, microphone 106*b* is found to require a larger delay 2206 than is available according to the limit of 2204. Therefore, a microphone 106 must be removed from the system. Note that this could correspond to microphone 106*b*, or whichever microphone 106 had the shortest delay 2203, in this case 106*g*. In this example, microphone 106*b* is found to have had lower priority than 106*g* using the criteria presented in FIG. 13*a*. Therefore, microphone 106*b* is removed from the system.

FIGS. 23*a* and 23*b* show an example use-case where the room dimensions 112 are unknown and can only be assumed using boundary devices 1302*a* and 1302*b*. In this case, the virtual microphones 301 are arranged in an arbitrary area 2301 with default x y, and z spacing between each virtual microphone 301 described by 2303, 2304 and 2305 respectively. In this case, 2301 is much larger than the room 112 so many virtual microphones 301 are allocated outside of the room 112 which is not optimal. These virtual microphones 301 are represented in area 2302.

FIGS. 23*c* and 23*d* represent the same room 112 as FIGS. 23*a* and 23*b* with the addition of boundary devices 1302*c* and 1302*d* that provide the location of all four walls in the room 112. This preferably enables many possible optimizations on FIGS. 23*a* and 23*b*. One such optimization is presented here. In this case, the extra virtual microphones 301 2306 have been reallocated from area 2302 into extra z-axis layers 2308 below and 2307 above the previous coverage zone optimizing the placement of the available virtual microphones 301. In this case, the x-axis spacing and y-axis spacing of virtual microphones 2303 and 2304 respectively remains consistent with FIGS. 23*a* and 23*b* to provide the exact same x-y resolution. In the z-axis direction, extra layers of virtual microphones 301 have been added to the coverage zone. In this particular case, the height and floor of the room remain unknown so the extra virtual microphones 301 are added both above and below the previous map. This gives a larger coverage area in the z-axis dimensions. Alternatively, the coverage zone in the z-axis dimension could be kept the same and the distance between each layer 2305 could be reduced to keep the same area as before. This would grant higher resolution in the z-axis direction. It is also possible to do a combination of these by extending both the coverage area and z-axis resolution if desired.

FIGS. 23*e* and 23*f* represent another possible optimization on FIGS. 23*a* and 23*b*. Once again, the location of each wall has been found by 1302*a*, 1302*b*, 1302*c* and 1302*d* but the location of the ceiling and floor remain unknown. In this case, the extra virtual microphones 2306 from area 2302 have been reallocated inside of the room 112. Here, the number of z-axis layers and the resolution of those layers remains the same. Instead, the extra virtual microphones 2306 are reallocated in the x and y directions to provide a higher x-y resolution in the coverage area. This is equivalent to reducing the x-axis spacing 2303 and y-axis spacing 2304 between virtual microphones 301. Note that this method can also be used in combination with the method presented in FIGS. 23*c* and 23*d* to optimize virtual microphone 301 allocation and placement as desired.

FIGS. 24*a* and 24*b* show an example configuration where the room dimensions 112 are unknown and can only be assumed using boundary devices 1302*a* and 1302*b*. In this case, the virtual microphone 301 bubble map is arranged in an arbitrary area 2301 with default x, y, and z spacing between each virtual microphone 301 described by 2303, 2304 and 2305 respectively. In this case, 2301 is much smaller than room 112 so the room is not adequately covered by the default configuration. FIGS. 24*c* and 24*d* represent the same room as FIGS. 24*a* and 24*b* with the addition of boundary devices 1302*c* and 1302*d* that provide the location of all four walls in the room 112. This enables many possible optimizations on FIGS. 24*a* and 24*b*. One such optimization is presented here. In this case, the extra virtual microphones 301 2306 have been reallocated from the outer z-axis layers 2401 and 2402 into the vacant space 2403. In this case, the x-axis spacing and y-axis spacing of virtual microphones 2303 and 2304 respectively remains consistent with FIGS. 24*a* and 24*b* to provide the exact same x-y resolution. In the z-axis direction, outer layers 2401 and 2402 of virtual microphones 301 have been removed from the coverage zone. In this particular case, the height and floor of the room remain unknown so the extra virtual microphones 301 are removed from both above and below the previous map. This gives a smaller coverage area in the z-axis dimensions. Alternatively, the coverage zone in the z-axis dimension could be kept the same and the distance between each layer 2305 could be increased to keep the same area as before. This would lower resolution in the z-axis direction.

FIGS. 24*e* and 24*f* represent another possible optimization on FIGS. 24*a* and 24*b*. Once again, the location of each wall has been found by 1302*a*, 1302*b*, 1302*c* and 1302*d* but the location of the ceiling and floor remain unknown. In this case, the number of virtual microphones 301 per z-axis layer is kept the same but the x-axis spacing 2303 and y-axis spacing 2304 between virtual microphones 301 is increased so that the entire room 112 is covered. This is equivalent to decreasing the x-y resolution of the configuration. Note that this method can also be used in combination with the method presented in FIGS. 24*c* and 24*d* to optimize virtual microphone 301 allocation and placement as desired.

With reference to FIG. 25, shown is a configuration in which the spacing of virtual microphones 301 is irregular. All diagrams so far have shown the virtual microphones 301 to have regular spacing, but this is not a requirement of the invention. In some cases, it might be preferable to have a higher density of virtual microphones 301 in certain key areas. It is also possible to have different types of spacing for different areas. For example, area 2501 here shows a different virtual microphone 301 layout than area 2502.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system for automatically dynamically forming a virtual microphone coverage map in a shared 3D space, comprising:

one or more microphone arrays comprising a plurality of microphones, wherein the microphones in each microphone array are arranged along one or more microphone axes; and a system processor communicating with the one or more microphone arrays, wherein the system processor is configured to perform operations comprising:

obtaining, in real-time, locations of microphone elements of the one or more microphone arrays throughout the shared 3D space and integrating, in real-time, the one or more microphone arrays, by measuring delays to each microphone element of the one or more microphone arrays, to build a single cohesive microphone element comprising the microphone elements of the one or more microphone arrays, wherein the single cohesive microphone element is capable of generating a consolidated coverage zone dimension based on the single cohesive microphone element to distribute virtual microphones in the consolidated coverage zone dimension;

determining coverage zone dimensions based on configuration parameters comprising positions of one or more boundary devices in the shared 3D space and/or predetermined boundary configuration data of the shared 3D space; and aligning and distributing the virtual microphones in the determined coverage zone dimensions based on parameters comprising geometric patterns of the one or more boundary devices and/or the predetermined boundary configuration data of the shared 3D space.

2. The system of claim 1 wherein the geometric patterns of the boundary devices include a 2D microphone plane in the shared 3D space.

3. The system of claim 1 wherein the geometric patterns of the boundary devices include a microphone hyperplane in the shared 3D space.

4. The system of claim 1 where the single cohesive microphone element is built by further integrating one or more discrete microphones not collocated within the one or more microphone arrays.

5. The system of claim 1 where the single cohesive microphone element comprises one or more discrete microphones and the microphone elements of the one or more microphone arrays.

6. The system of claim 1 wherein the boundary devices comprise one or more selected from the group consisting of wall-mounted microphones, ceiling microphones, suspended microphones, table-top microphones and free-standing microphones.

7. The system of claim 1 wherein the aligning and distributing the virtual microphones in the determined coverage zone dimensions comprises incorporating constraints to optimize placement of the virtual microphones.

8. The system of claim 7 wherein the constraints include one or more selected from the group consisting of hardware/memory resources, a number of physical microphones that can be supported, and a number of virtual microphones that can be allocated.

9. The system of claim 1 wherein the predetermined boundary configuration data of the shared 3D space include one or more selected from the group consisting of dimensions of the shared 3D space and offsets in the dimensions of the shared 3D space.

10. A method for automatically dynamically forming a virtual microphone coverage map in a shared 3D space, comprising:

obtaining locations of microphone elements of one or more microphone arrays throughout the shared 3D space and integrating, in real-time, the one or more microphone arrays, by measuring delays to each microphone element of the one or more microphone arrays, to build a single cohesive microphone element comprising the microphone elements of the one or more microphone arrays, wherein the single cohesive microphone element is capable of generating a consolidated coverage zone dimension based on the single cohesive microphone element to distribute virtual microphones in the consolidated coverage zone dimension, wherein the microphone arrays comprise a plurality of microphones and the microphones in each microphone array are arranged along one or more microphone axes;

determining coverage zone dimensions based on configuration parameters comprising positions of one or more boundary devices in the shared 3D space and/or predetermined boundary configuration data of the shared 3D space; and aligning and distributing the virtual microphones in the determined coverage zone dimensions based on parameters comprising geometric patterns of the one or more boundary devices and/or the predetermined boundary configuration data of the shared 3D space.

11. The method of claim 10 wherein the geometric patterns of the boundary devices include a 2D microphone plane in the shared 3D space.

12. The method of claim 10 wherein the geometric patterns of the boundary devices include a microphone hyperplane in the shared 3D space.

13. The method of claim 10 wherein the single cohesive microphone element is built by further integrating one or more discrete microphones not collocated within the one or more microphone arrays.

14. The method of claim 10 where the single cohesive microphone element comprises one or more discrete microphones and the microphone elements of the one or more microphone arrays.

15. The method of claim 10 wherein the boundary devices comprise one or more selected from the group consisting of wall-mounted microphones, ceiling microphones, suspended microphones, table-top microphones and free-standing microphones.

16. The method of claim 10 wherein the aligning and distributing the virtual microphones in the determined coverage zone dimensions comprises incorporating constraints to optimize placement of the virtual microphones.

17. The method of claim 16 wherein the constraints comprise one or more selected from the group consisting of hardware/memory resources, a number of microphones that can be supported, and a number of virtual microphones that can be allocated.

18. The method of claim 10 wherein the predetermined boundary configuration data of the shared 3D space include one or more selected from the group consisting of dimensions of the shared 3D space and offsets in the dimensions of the shared 3D space.

19. One or more non-transitory computer-readable media for automatically dynamically forming a virtual microphone coverage map in a shared 3D space, the computer-readable media comprising instructions configured to cause a system processor to perform operations comprising:

obtaining locations of microphone elements of one or more microphone arrays throughout the shared 3D space and integrating, in real-time, the one or more microphone arrays, by measuring delays to each microphone element of the one or more microphone arrays, to build a single cohesive microphone element comprising the microphone elements of the one or more microphone arrays, wherein the single cohesive microphone element is capable of generating a consolidated coverage zone dimension based on the single cohesive microphone element to distribute virtual microphones in the consolidated coverage zone dimension, wherein the microphone arrays comprise a plurality of microphones and the microphones in the combined each microphone array are arranged along one or more microphone axes;

determining coverage zone dimensions based on configuration parameters comprising positions of one or more boundary devices in the shared 3D space and/or predetermined boundary configuration data of the shared 3D space; and aligning and distributing the virtual microphones in the determined coverage zone dimensions based on parameters comprising geometric patterns of the one or more boundary devices and/or the predetermined boundary configuration data of the shared 3D space.

20. The one or more non-transitory computer-readable media of claim 19 wherein the geometric patterns of the boundary devices include a 2D microphone plane in the shared 3D space.

21. The one or more non-transitory computer-readable media of claim 19 wherein the geometric patterns of the boundary devices include a microphone hyperplane in the shared 3D space.

22. The one or more non-transitory computer-readable media of claim 19 wherein the single cohesive microphone element is built by further integrating one or more discrete microphones not collocated within microphone array structures.

23. The one or more non-transitory computer-readable media of claim 19 where the single cohesive microphone element one or more discrete microphones and the microphone elements of the one or more microphone arrays.

24. The one or more non-transitory computer-readable media of claim 19 wherein the boundary devices comprise one or more selected from the group consisting of wall-mounted microphones, ceiling microphones, suspended microphones, table-top microphones and free-standing microphones.

25. The one or more non-transitory computer-readable media of claim 19 wherein the aligning and distributing the virtual microphones in the determined coverage zone dimensions comprises incorporating constraints to optimize placement of the virtual microphones.

26. The one or more non-transitory computer-readable media of claim 25 wherein the constraints comprise one or more selected from the group consisting of hardware/memory resources, a number of microphones that can be supported, and a number of virtual microphones that can be allocated.

27. The one or more non-transitory computer-readable media of claim 19 wherein the predetermined boundary configuration data of the shared 3D space include one or more selected from the group consisting of dimensions of the shared 3D space and offsets in the dimensions of the shared 3D space.

* * * * *